(12) United States Patent
Heit et al.

(10) Patent No.: US 7,857,116 B2
(45) Date of Patent: Dec. 28, 2010

(54) SORTATION SYSTEM

(75) Inventors: Martin Albert Heit, Mason, OH (US);
Matthew John Tefend, Mason, OH (US); Justin Zimmer, Mason, OH (US)

(73) Assignee: Intelligrated Headquarters LLC, Mason, OH (US)

( * ) Notice: Subject to any disclaimer, the term of this patent is extended or adjusted under 35 U.S.C. 154(b) by 161 days.

(21) Appl. No.: 11/981,752

(22) Filed: Oct. 31, 2007

(65) Prior Publication Data

US 2009/0032374 A1 Feb. 5, 2009

(51) Int. Cl.
*B65G 47/46* (2006.01)
(52) U.S. Cl. .............................. 198/370.02; 198/370.07
(58) Field of Classification Search ............ 198/370.02, 198/370.07, 890.1
See application file for complete search history.

(56) References Cited

U.S. PATENT DOCUMENTS

| 4,896,760 | A | | 1/1990 | Triantafilou et al. |
|---|---|---|---|---|
| 5,127,510 | A | * | 7/1992 | Cotter et al. ............ 198/370.02 |
| 5,595,279 | A | | 1/1997 | Koeninger et al. |
| 5,909,797 | A | | 6/1999 | Van Den Goor |
| 2004/0089513 | A1 | * | 5/2004 | Van Den Goor ....... 198/370.02 |
| 2004/0089514 | A1 | * | 5/2004 | Henson et al. ......... 198/370.02 |
| 2005/0011725 | A1 | * | 1/2005 | Lapeyre et al. ......... 198/370.02 |

FOREIGN PATENT DOCUMENTS

| CA | 2 431 737 | 6/2003 |
|---|---|---|
| EP | 0 792 824 | 9/1997 |
| JP | 06-048555 | 7/1992 |
| JP | 5-32309 | 2/1993 |
| JP | 3201795 | 8/2001 |

OTHER PUBLICATIONS

International Search Report dated Jul. 16, 2004 for Application No. PCT/US2004/003554.

* cited by examiner

*Primary Examiner*—James R Bidwell
(74) *Attorney, Agent, or Firm*—Frost Brown Todd LLC

(57) ABSTRACT

A sortation conveyor has a plurality of pairs of slats which are generally aligned with each other and which define a portion of an upper conveying surface. A gap is defined between the slats of the pair which extends laterally. The gap may have an offset portion.

4 Claims, 48 Drawing Sheets

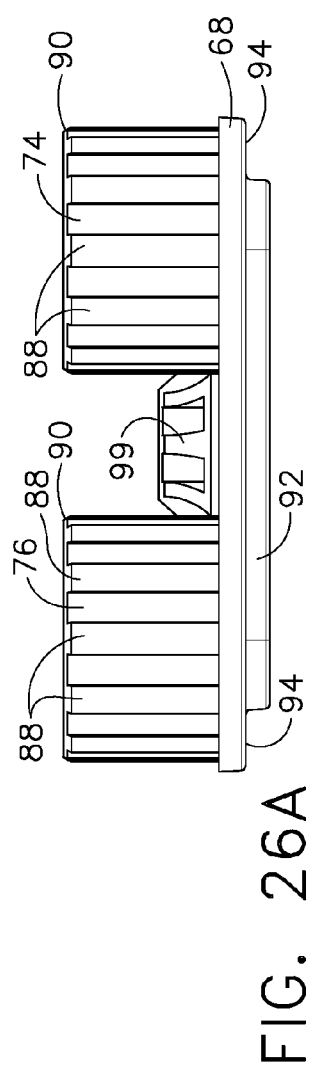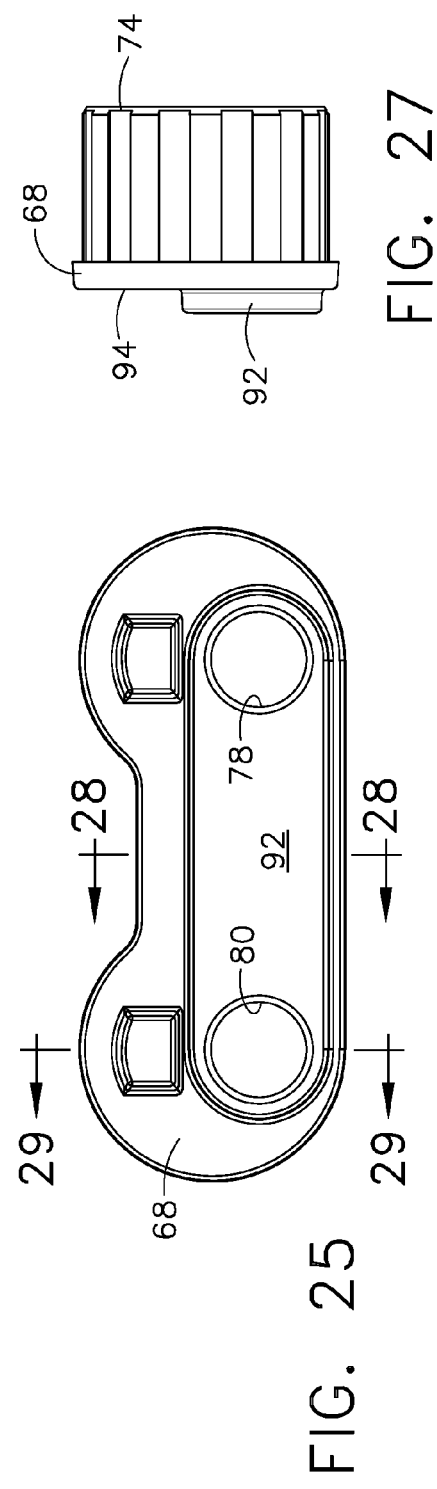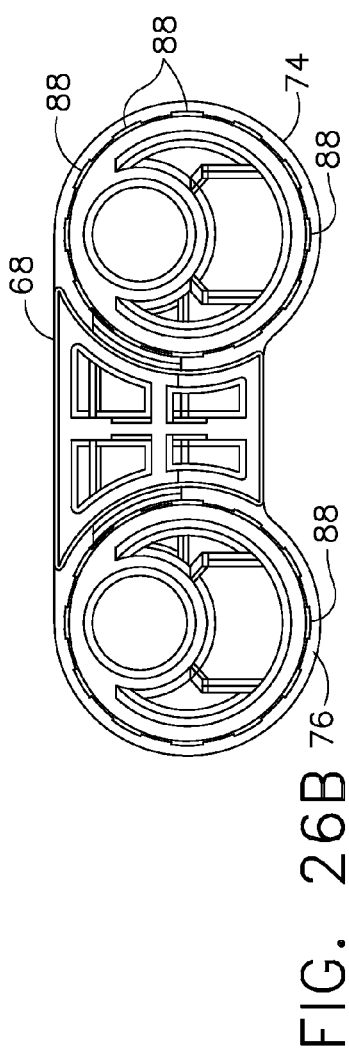

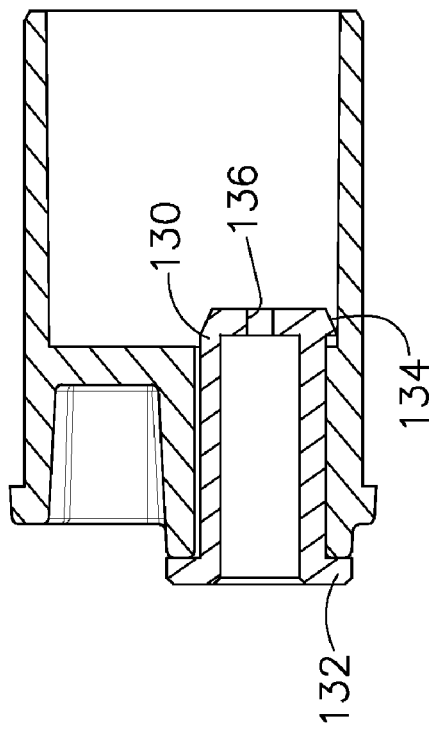
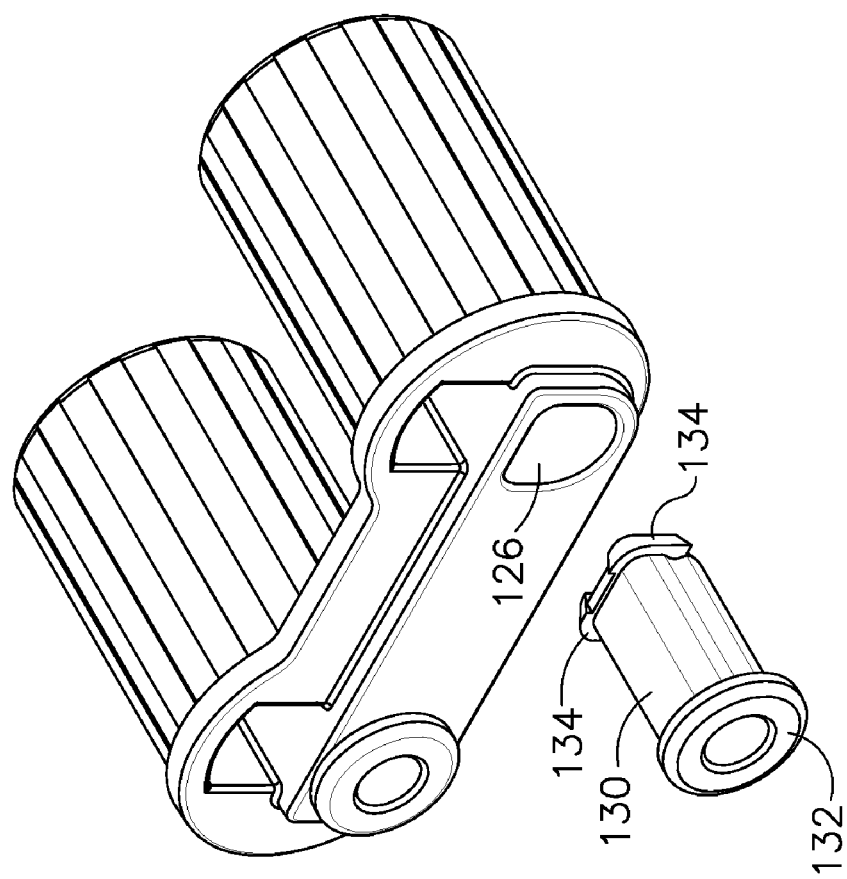

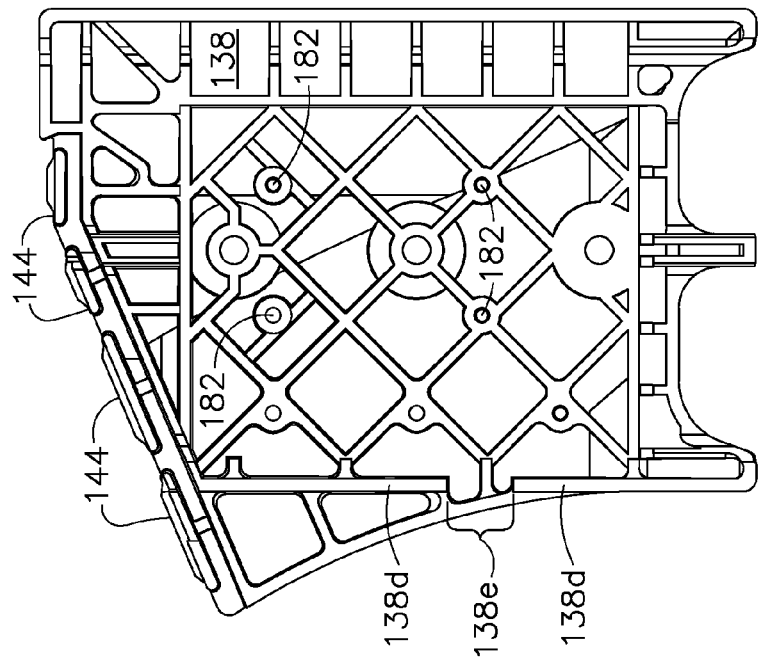
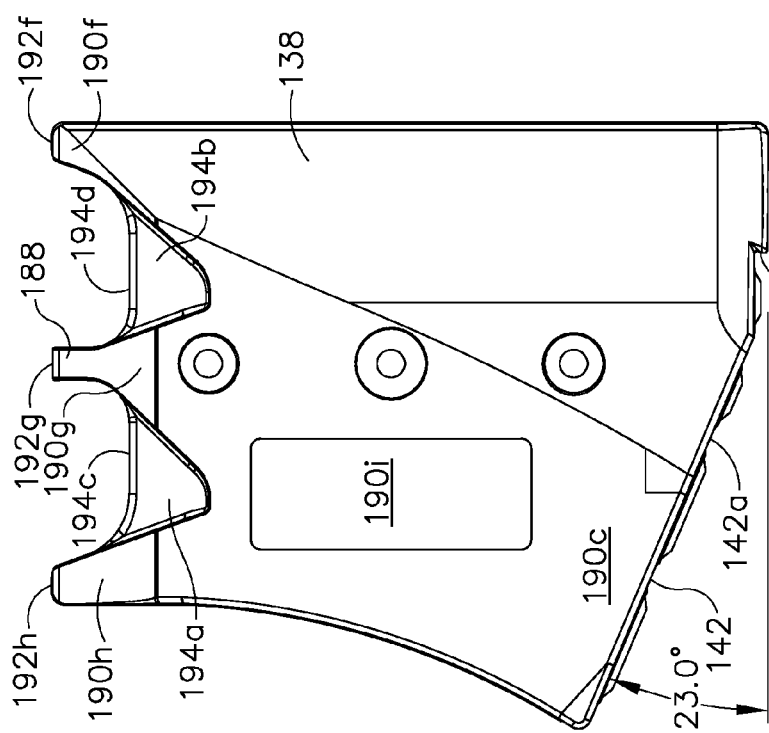
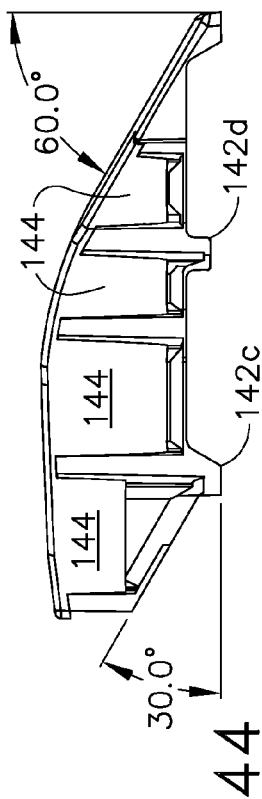
FIG. 45
FIG. 43
FIG. 44

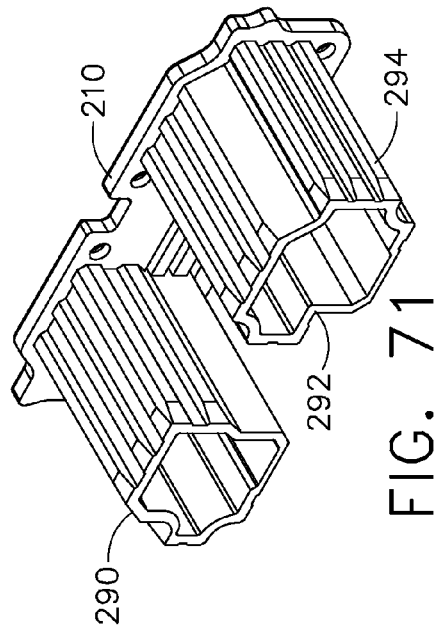
FIG. 71
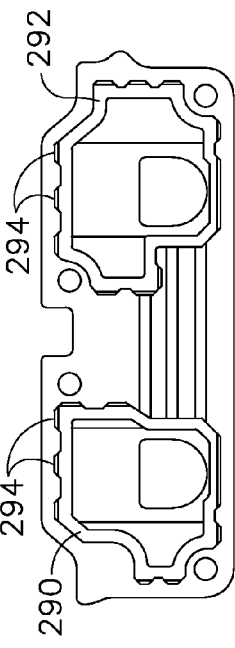
FIG. 73
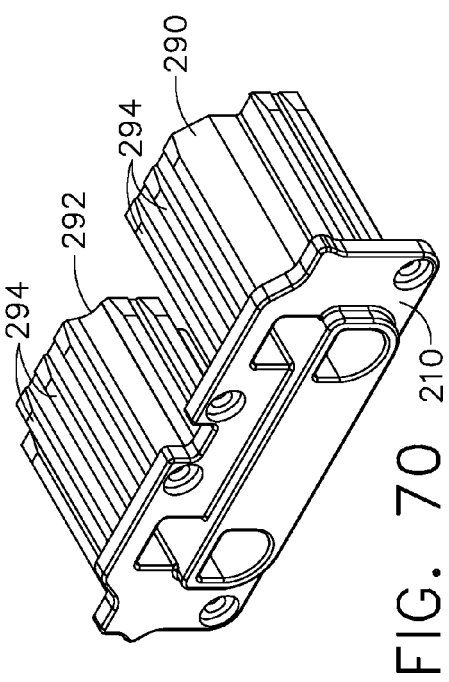
FIG. 70
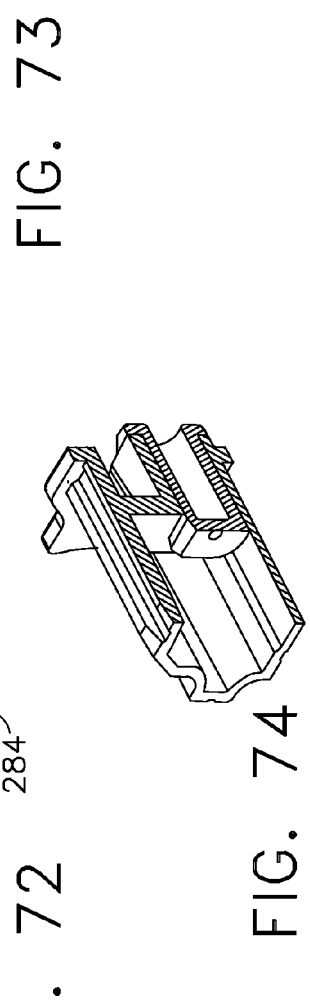
FIG. 72
FIG. 74

SORTATION SYSTEM

This application claims priority benefit of and incorporates by reference the disclosures of U.S. provisional patent application 60/370,954 for End Cap For Sortation System Conveyor, filed Apr. 8, 2002, U.S. provisional patent application 60/371,251 for Pusher For Sortation System, filed Apr. 8, 2002, U.S. provisional patent application 60/428,366 for Pusher For Sortation System, filed Nov. 22, 2002, and U.S. provisional patent application 60/445,974 for Slat Sortation Conveyor filed Feb. 7, 2003.

BACKGROUND OF THE INVENTION

The present invention relates generally to sortation conveyors, also known as sorters, and their components, and is particularly directed to pusher caps, pusher bases, pusher pads, conveyor slats and end caps for conveyor slats.

Sortation conveyors are used to sort items carried on a conveying surface by selectively diverting individual items on to laterally extending spurs at the appropriate time. To accomplish this, pusher shoes travel laterally (relative to the direction of travel of the sortation conveyor) to divert packages carried by the upper surface of the sortation conveyor to spurs. Pusher shoes are called by many names, including diverters, divert elements, pushers, and pusher elements.

A pusher shoe comprises an upper element, sometimes known as a pusher cap, which is typically disposed above the upper surface of the sortation conveyor so as to divert packages located thereon, a pusher pad carried by the pusher cap to contact the packages, and a pusher base which carries the pusher cap and guides it along transverse slats which comprise the sortation conveyor The transverse slats are typically arranged parallel to each other, perpendicular to the direction of travel. They are typically carried at each end by a moving element, such as an endless chain. Frequently the chain will include alternately disposed extended pins which engage the slats, directly or indirectly so as to carry them.

BRIEF DESCRIPTION OF THE DRAWING

The accompanying drawings incorporated in and forming a part of the specification illustrate several aspects of the present invention, and together with the description serve to explain the principles of the invention. In the drawings:

FIG. 25 is a front view of the end cap of FIG. 24.

FIG. 26A is a top view of the end cap of FIG. 24.

FIG. 26B is a rear, upside down view of the end cap of FIG. 24.

FIG. 27 is a side view of the end cap of FIG. 24.

FIG. 37 is an exploded front perspective view of the end cap of FIG. 33 and bushing.

FIG. 38 is a cross-section of the bushing and end cap of FIG. 37 taken along the mid line of the bushing.

FIG. 43 is a top view of the pusher cap shown in FIGS. 39 and 41.

FIG. 44 is a side view of the pusher cap of FIG. 43.

FIG. 45 is a bottom view of the pusher cap of FIG. 43.

FIG. 70 is a front perspective view of the end cap of the sortation conveyor of FIG. 58.

FIG. 71 is a rear perspective view of the end cap shown in FIG. 70.

FIG. 72 is a front view of the end cap shown in FIG. 70.

FIG. 73 is a rear view of the end cap shown in FIG. 70.

FIG. 74 is an cross-sectional perspective view of the end cap shown in FIG. 71, taken along line 74-74 of FIG. 73, and including a bushing not shown in FIG. 73.

Table 1 is a list of the material properties of Super Tough Nylon from which the pusher caps and base may be made.

Table 2 is a list of the material properties of DuPont Dehrin Acetal from which the pusher bases may be made.

Table 3 is a list of the material properties of Santoprene® from which the pusher pads may be made.

Reference will now be made in detail to the present preferred embodiment of the invention, an example of which is illustrated in the accompanying drawings.

DETAILED DESCRIPTION OF AN EMBODIMENT OF THE INVENTION

Figure 1A:
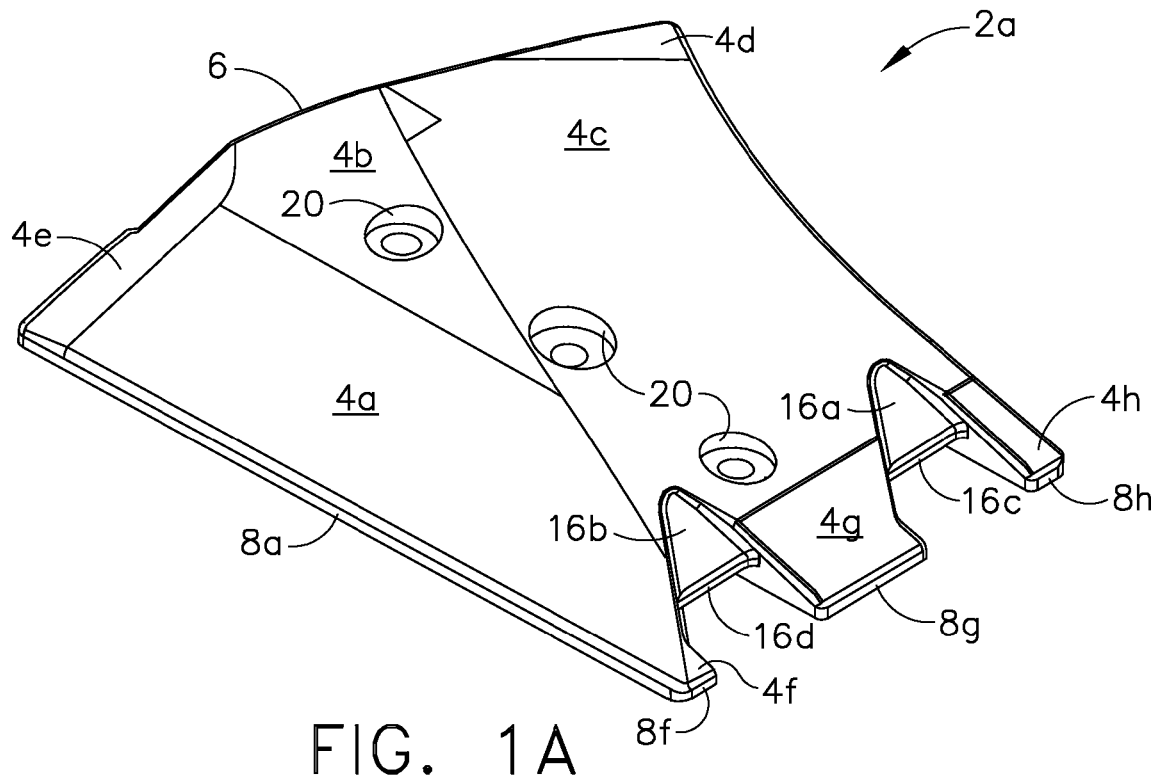
FIGS. 1A and 1B are perspective views of a pusher cap for a flat slat type sortation conveyor and a round tube type sortation conveyor, respectively, constructed in accordance with one aspect of the present invention.
Figure 1B:
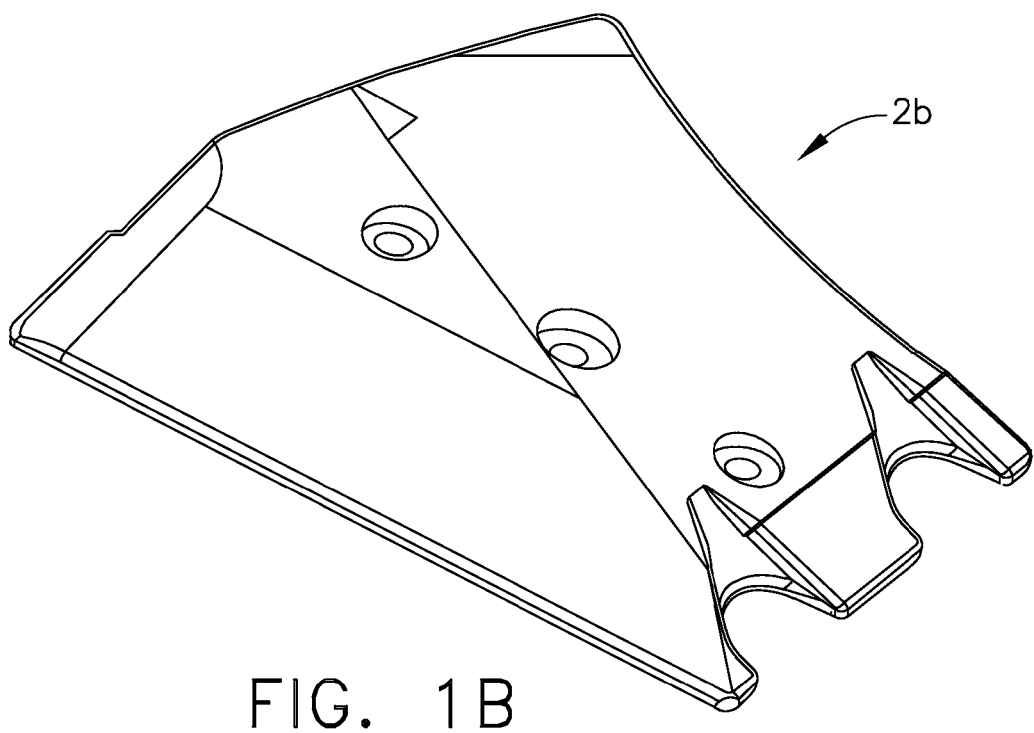

Referring now to the drawings in detail, wherein like numerals indicate the same elements throughout the views, FIG. 1A is a perspective view of one embodiment of a pusher cap 2a constructed in accordance with one aspect of the present invention, configured for use on a flat slat type sortation conveyor. FIG. 1B is a perspective view of another embodiment of a pusher cap 2b, similar to pusher cap 2b but configured for use on a round tube type sortation conveyor. Since both pusher caps 2a and 2b are illustrated as right hand, 20° pusher caps, although it will be understood that the pusher caps may also be left hand or double sided, and have any divert angle, such as 30°. It will be noted that pusher caps 2a and 2b are constructed the same, except for being configured for different type sortation conveyors, pusher cap 2a will be described in detail with respect the common features of the two.

Figure 1C:
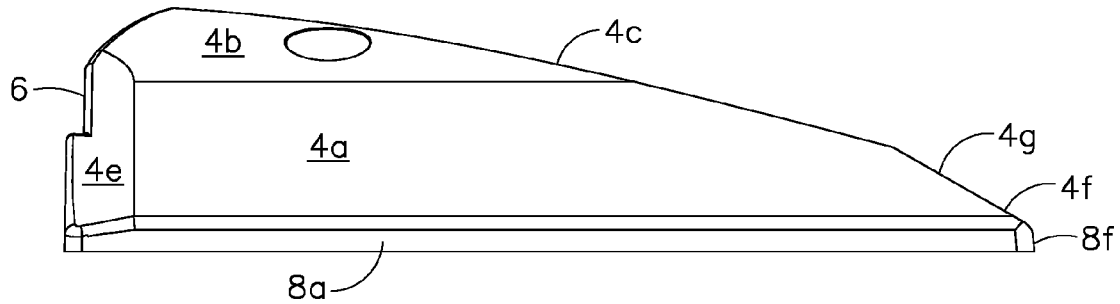
FIG. 1C is a front view of either pusher cap of FIGS. 1A and 1B.
Figure 2:
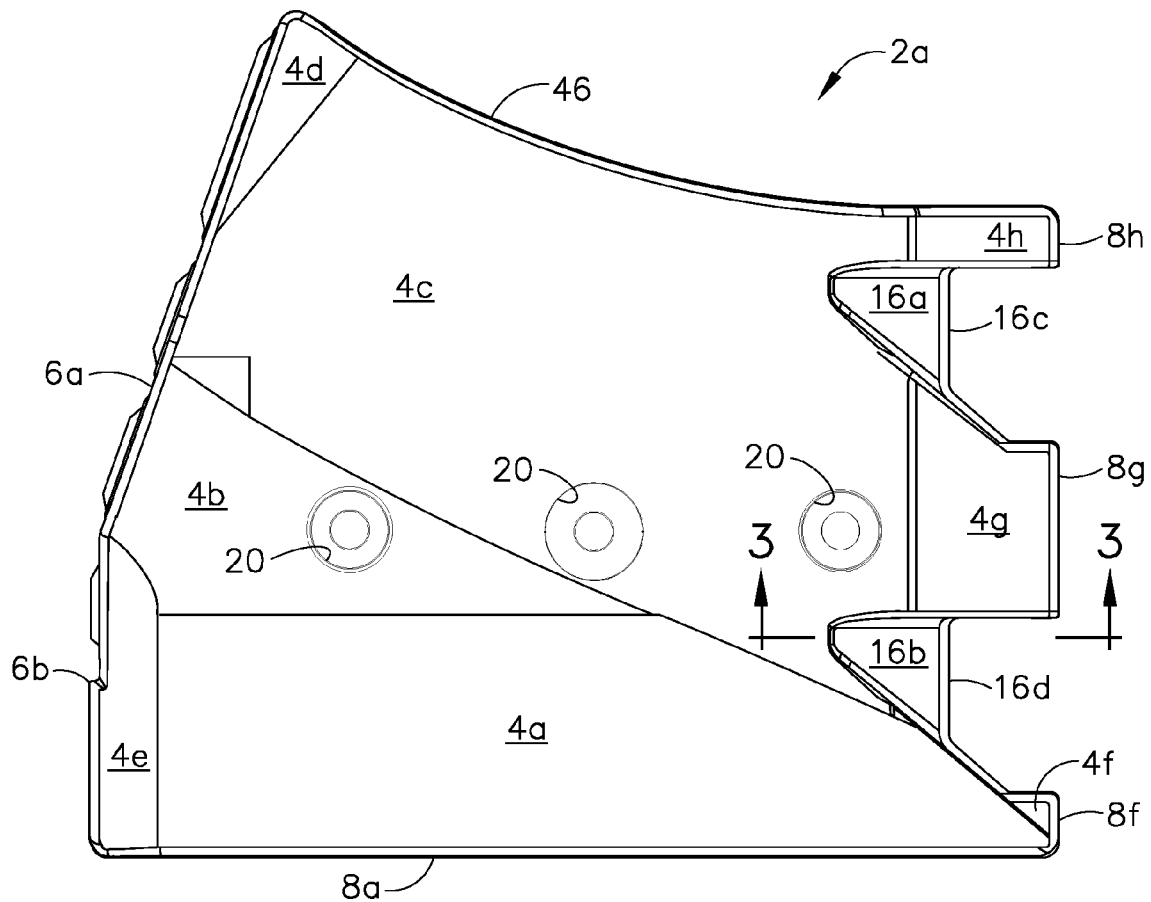
FIG. 2 is a top view of the pusher shoe shown in FIG. 1A.

Referring also to FIGS. 1C and 2, pusher cap 2a includes upper surface 4 which presents a low profile (also referred to as a stealth profile) continuous surface that gradually merges with the upper edge of generally vertical mounting surface 6. Pusher pad 38 (see FIG. 6) is secured to pusher cap 2a at mounting surface 6. When pusher shoe 2a is diverted by the guide tracks (not shown) of the sortation conveyor, pusher pad 38 contacts packages carried by the upper surface (also referred to as the conveying surface) of the sortation conveyor. Upper surface 4 includes leading surface 4a, center surface 4b, top surface 4c, clearance surface 4d and blend surface 4e. Leading surface 4a extends below the upper conveying surface of the sortation conveyor, merging into leading edge 8a. Upper surface also includes surfaces 4f, 4g and 4h, which are generally coplaner, located on the side opposite mounting surface 6. These three surfaces terminate below the upper conveying surface of the sortation conveyor, at respective, generally aligned edges 8f, 8g and 8h. In the embodiment depicted, surfaces 4f, 4g and 4h are approximately 60 degrees from vertical, an angle selected to slide under a package so as to direct any package which may encounter pusher cap 4a on that surface up and over the upper surface 4, so that there is not positive interference with the pusher shoe resulting from any such misplaced package.

As seen in FIG. 2, pusher cap 2a is depicted as a 20° divert, right hand cap, with portion 6a of mounting surface 6 being formed at an angle of about 20° relative to portion 6b and the cap's longitudinal direction of travel, thereby establishing the 20° angle of the divert wall (see FIGS. 4 and 5) when used with pusher pads of generally uniform thickness, as described below. Pusher caps 2a and 2b may be configured with a 30° divert angle, or any suitable divert angle, as well as left hand or double sided caps.

Figure 9:
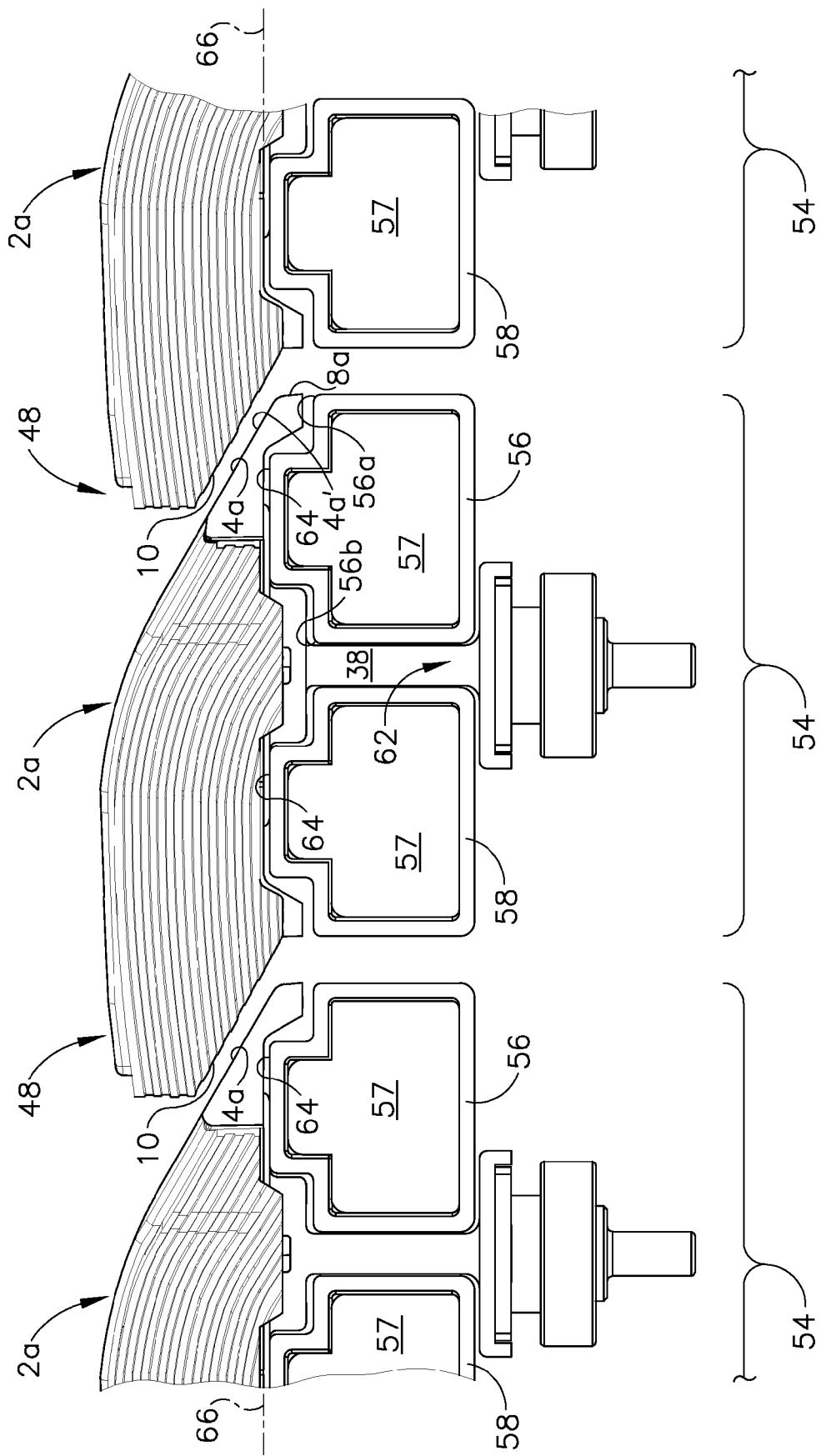
FIG. 9 is an enlarged fragmentary side view of a pusher shoe of FIG. 4, showing two overlapping pusher shoes mounted on a flat slat type conveyor.

The angle of leading surface 4a is dictated by the location of leading edge 8a As seen in FIG. 9, the location of leading edge 8a is set below the generally planar upper slat conveying surface 64 of the sortation conveyor. Leading surface 4a inclines back therefrom at about a 30 degree angle from horizontal. A corresponding angle is found on the trailing edge 10a to allow clearance between adjacent pushers where they overlap. The angle of leading surface 4a allows enough wall thickness at 4a' based on the projection of leading surface 4a up and back from leading edge 8a.

Relative to the direction of travel of the conveying surface, pushers basically have two longitudinal sides extending generally longitudinally (in the direction of conveyor travel) and two lateral sides extending generally perpendicular to the direction of travel of the conveyor and generally parallel to the members, such as slats or tubes, that comprise the conveying surface. Of the two longitudinal sides, one side is the divert side having the pusher pad and functioning to divert items to the desired locations. The other longitudinal side preferably is configured so that there is not positive interference with the pusher shoe resulting from any such misplaced package which contact the pusher on that side.

Figure 3:
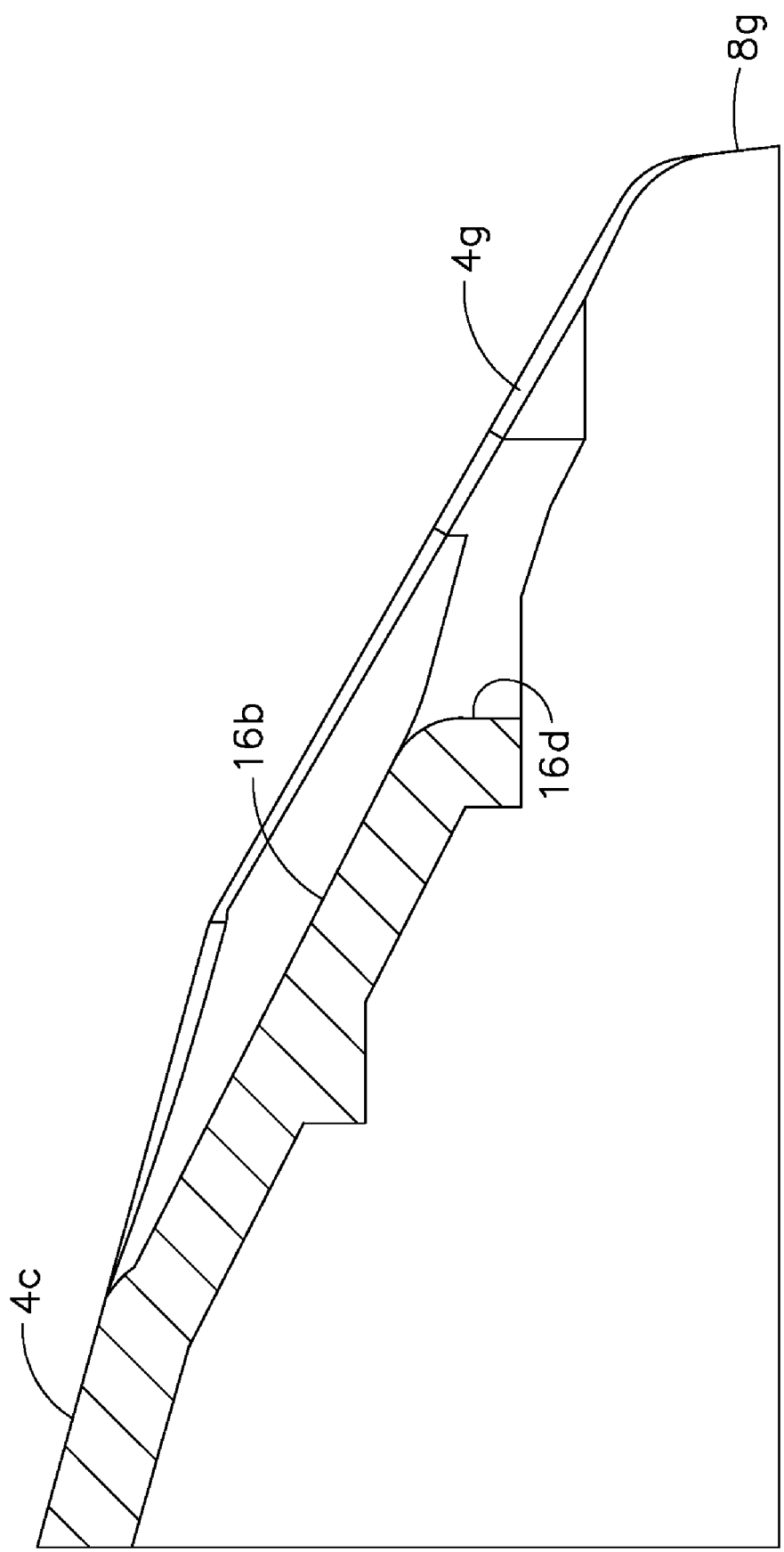
FIG. 3 is a cross-sectional view of the pusher cap of FIG. 1A taken along line 3-3 of FIG. 2.

Referring to FIGS. 1A, 1B and 3, recessed surfaces 16a and 16b are formed in top surface 4 in between surfaces 4f, 4g and 4h. Recessed surfaces are steeper than the adjacent portion of surface 4c from which recessed surfaces 16a and 16b extend, and than surfaces 4f-h. Recessed surfaces terminate at edges 16c and 16d, which are disposed adjacent respective upper slat conveying surfaces 64. The locations and relative angles of surfaces 16a-b, 4c and 4f-h place recessed surfaces 16a and 16b lower than adjacent portions of surfaces 4c and 4f-h, inboard of edges 8f-h, and inboard of the locations where surfaces 4f-h extend below the upper slat conveying surfaces 64 of the sortation conveyor. With this "cow catcher" configuration, any package which might encounter this longitudinal edge of a laterally moving pusher cap 2a will engage surfaces 4f-h, not edges 8f-h or edges 16c-d, and will ride up and over pusher cap 2a rather than pushed laterally.

Top surface 4c is generated from a polynomial curve, extending from the upper edges of surfaces 4f-h, to the highest portion of the upper edge of mounting surface 6. The only interruptions in the generally continuous upper surface, are the openings 20 in surface 4 for the bolts connecting the pusher cap 2a to the base (described below). The continuous upper surface 4 presents minimum locations of sharp edges or discontinuous surfaces which could catch a mislocated package as the shoe slide there-past.

The angle of surfaces 4b and 4c are also dependant on or dictate the location of the interface between top surface 4c and center surface 4b, which is located so as not to intersect any bolt holes 20.

Clearance surface 4d provides clearance to avoid adjacent components when the pusher shoe is at either end of the sortation conveyor, so that pusher shoe stays within the desired clearance circle as the pusher shoes travel around the drive or idler gear. Surface 4e blends the adjacent surfaces to merge with the upper edge of mounting surface 6.

Figure 4:
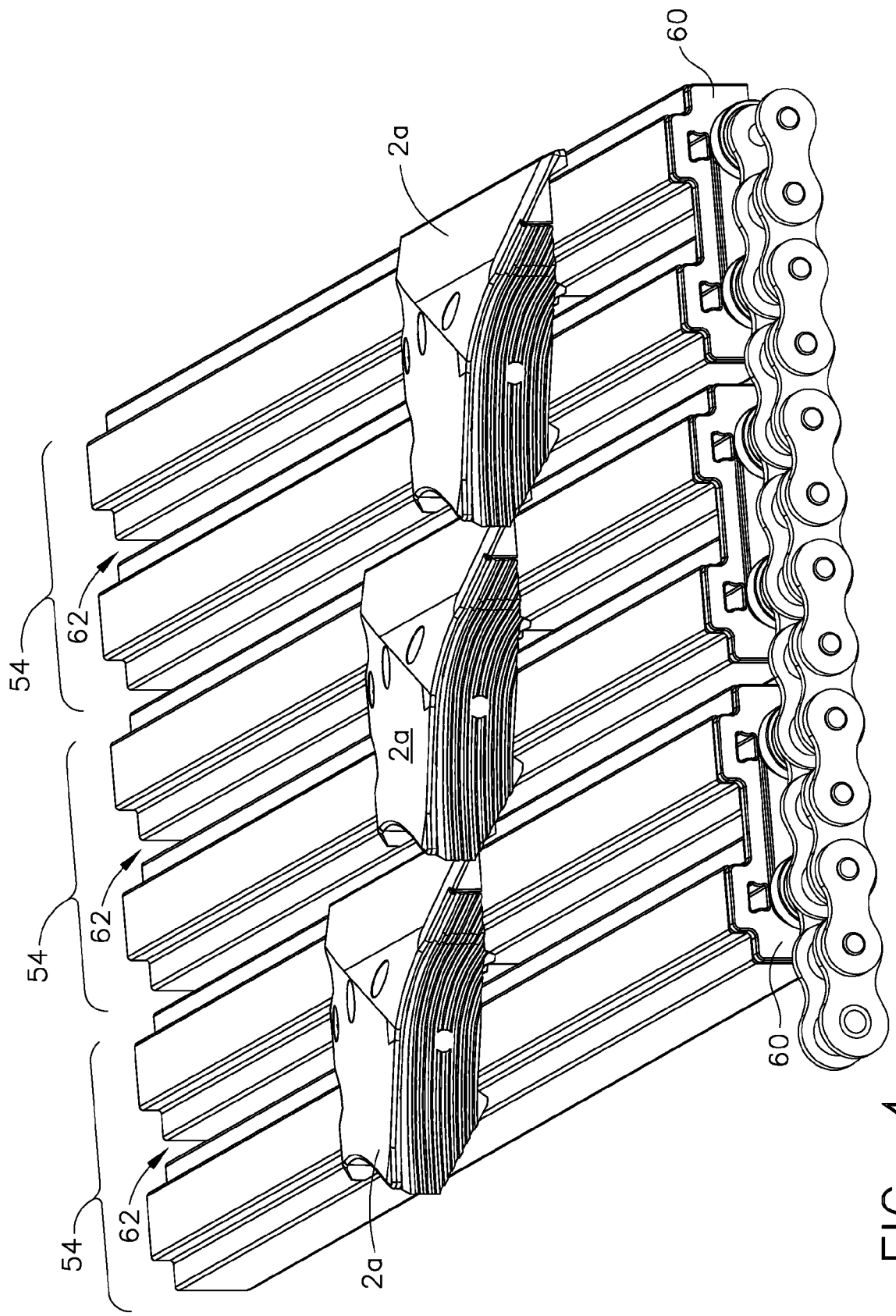
FIG. 4 is a fragmentary perspective view of a plurality of pusher shoes with the pusher cap of FIG. 1A, for a flat slat type sortation conveyor, shown aligned in a diverting arrangement.
Figure 5:
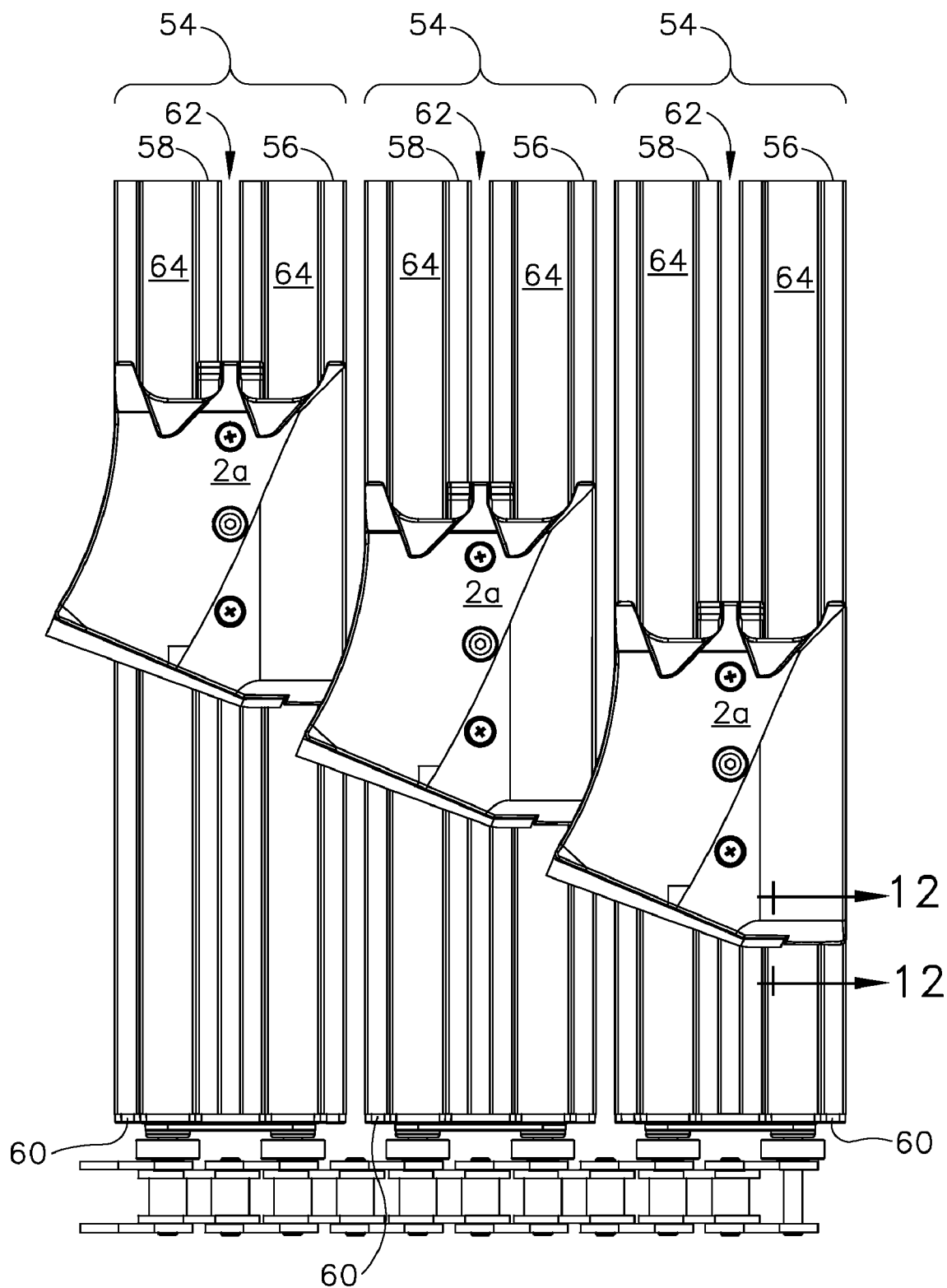
FIG. 5 is a fragmentary top view of the pusher shoes illustrated in FIG. 4.

Referring to FIGS. 4 and 5, a plurality of pusher shoes with pusher cap 2a are shown being diverted, aligned to present a substantially continuous divert wall formed from the plurality of overlapping, aligned pusher pads. As is well known, the pusher shoes are diverted by guide tracks (not shown) located under the sortation conveying bed, being diverted as appropriate to move packages to spur conveyors.

Figure 6:
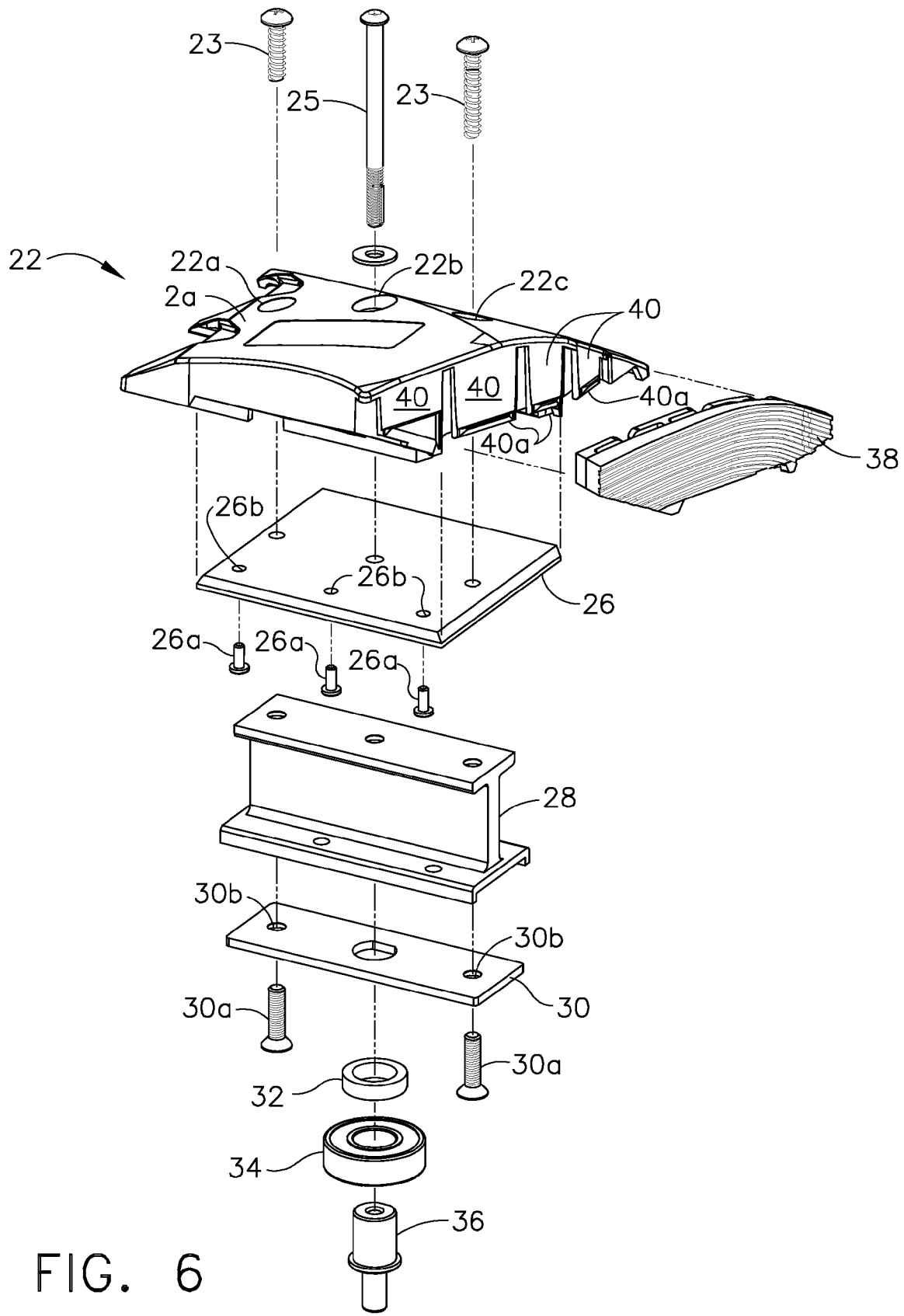
FIG. 6 is an exploded perspective view of a pusher shoe of FIG. 4.

Referring to FIG. 6, the depicted embodiment of pusher shoe 22 includes pusher cap 2a and pusher base assembly 24. Pusher base assembly 24 includes upper pusher base 26, lower pusher base 28, pusher base plate 30, spacer 32, bearing 34 and pin 36. Two threaded fasteners 23 respectively extend through holes 22a and 22c, aligned with respective openings 20, through base 26 and threadingly engage lower pusher base 28. A single bolt 25 extends through center hole 22b of pusher cap 2a, through bases 26 and 28, plate 30, through spacer 32 and bearing 34, threadingly engaging pin 36. Two additional screws 30a extend through the two holes 30b in plate 30, threadingly engaging lower base 28. Additional screws 26a are inserted from the bottom of plate 26 through holes 26b and into holes 26c (FIG. 9) in the underside of pusher cap 2a.

Pusher bases 26 and 28 may be made of any suitable material, such as DuPont Delrin Acetal, which provides low friction to accommodate the sliding motion of the pusher shoes, or super tough nylon. Bases 26 and 28 may be formed as a single piece. Pusher caps described herein can be made of any suitable material, such as super tough nylon. Pusher bases described herein may also be made of any suitable material, such as DuPont Delrin Acetal or super tough nylon.

Figure 11:
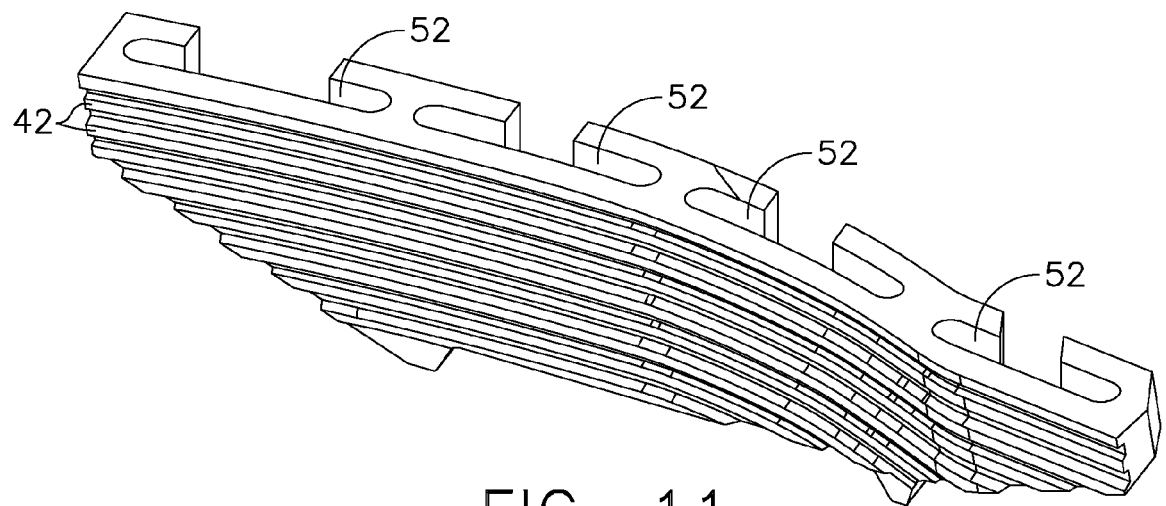
FIG. 11 is a perspective view of the ribbed side of the pusher pad shown in FIG. 10.
Figure 12:
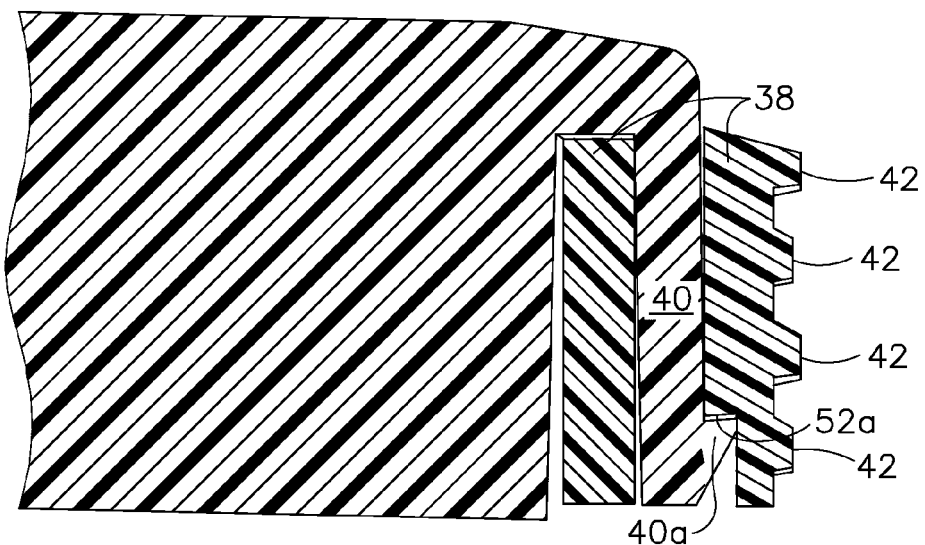
FIG. 12 is a fragmentary cross-sectional view of the pusher shoe of FIG. 4, taken along line 12-12 of FIG. 5.

Pusher pad 38 is secured to cap 2a by a plurality of tabs 40 which extend into vertical slots 52 formed in pusher pad 38 (see FIGS. 11-12). Each tab 40 includes a ridge 40a which engages a lip in the inner surface of the vertical slots of pusher pad 38 (see FIG. 12).

Figure 8:
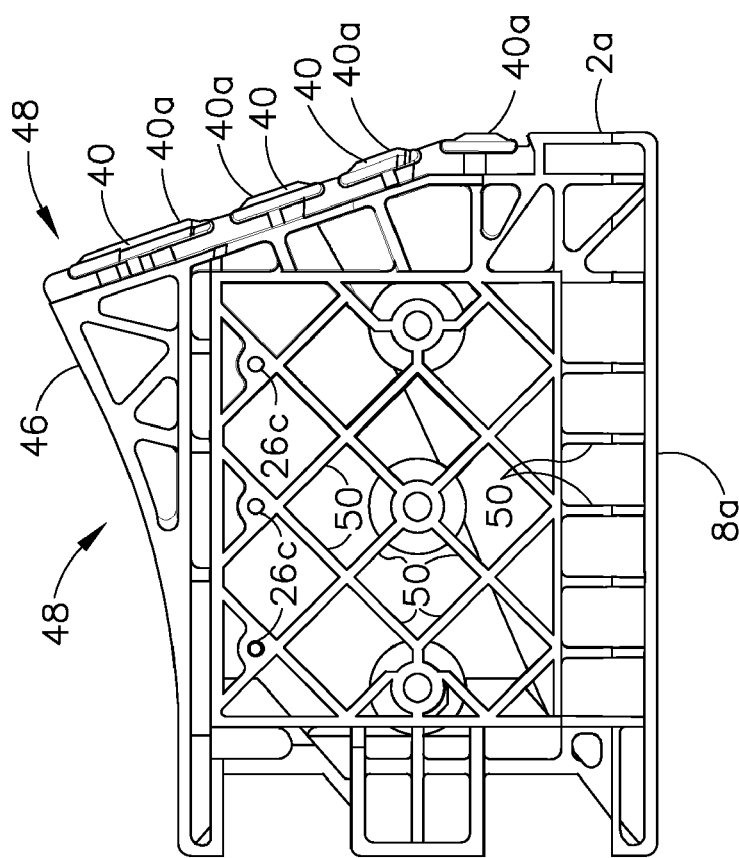
FIG. 8 is a bottom view of the pusher cap of FIG. 1A.
Figure 7:
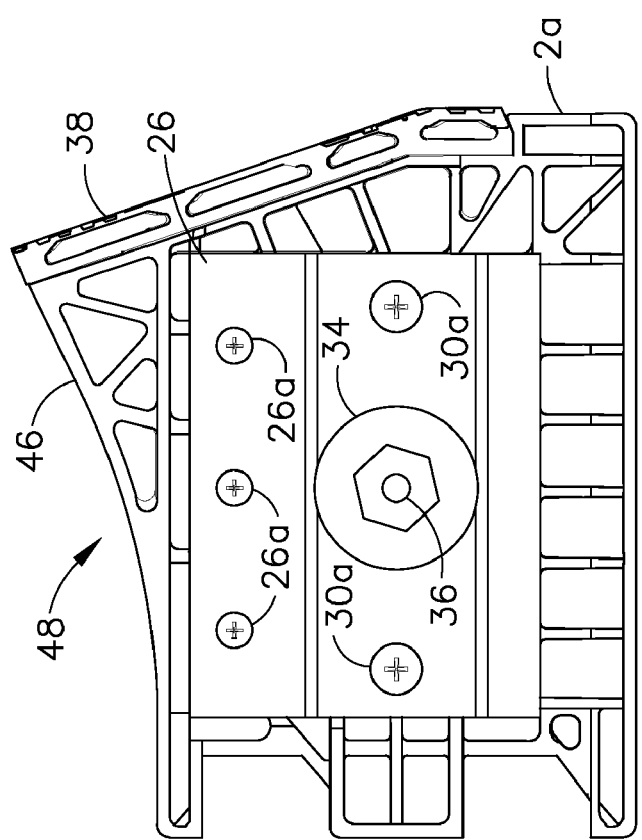
FIG. 7 is a bottom view of a pusher shoe of FIG. 4.

Referring to FIGS. 7 and 8, trailing surface 46 is an arcuate vertical wall, which comprises the rear edge of extension 48 of the pusher cap 2a which extends rearward beyond the edge of the trailing slat or tube. Extension 48 helps to control rotation of packages when engaged by the pusher during divert by providing a longer divert surface extending beyond the trailing edge of the flight of two slats, as can be seen in FIGS. 4, 5, 9 and 10.

As can be seen in FIGS. 7 and 8, a pattern of a plurality of ribs 50 are formed in the bottom of pusher cap 2a. In the depicted embodiment, ribs 50 have a wall thickness of approximately 0.100 inches, although they may be of any appropriate wall thickness. Ribs 50 are arranged in a rectangular pattern, approximately 90 degrees to each other. Ribs 50 are disposed at an angle of approximately 45 degrees relative to the direction of travel of the pusher shoe.

Figure 10:
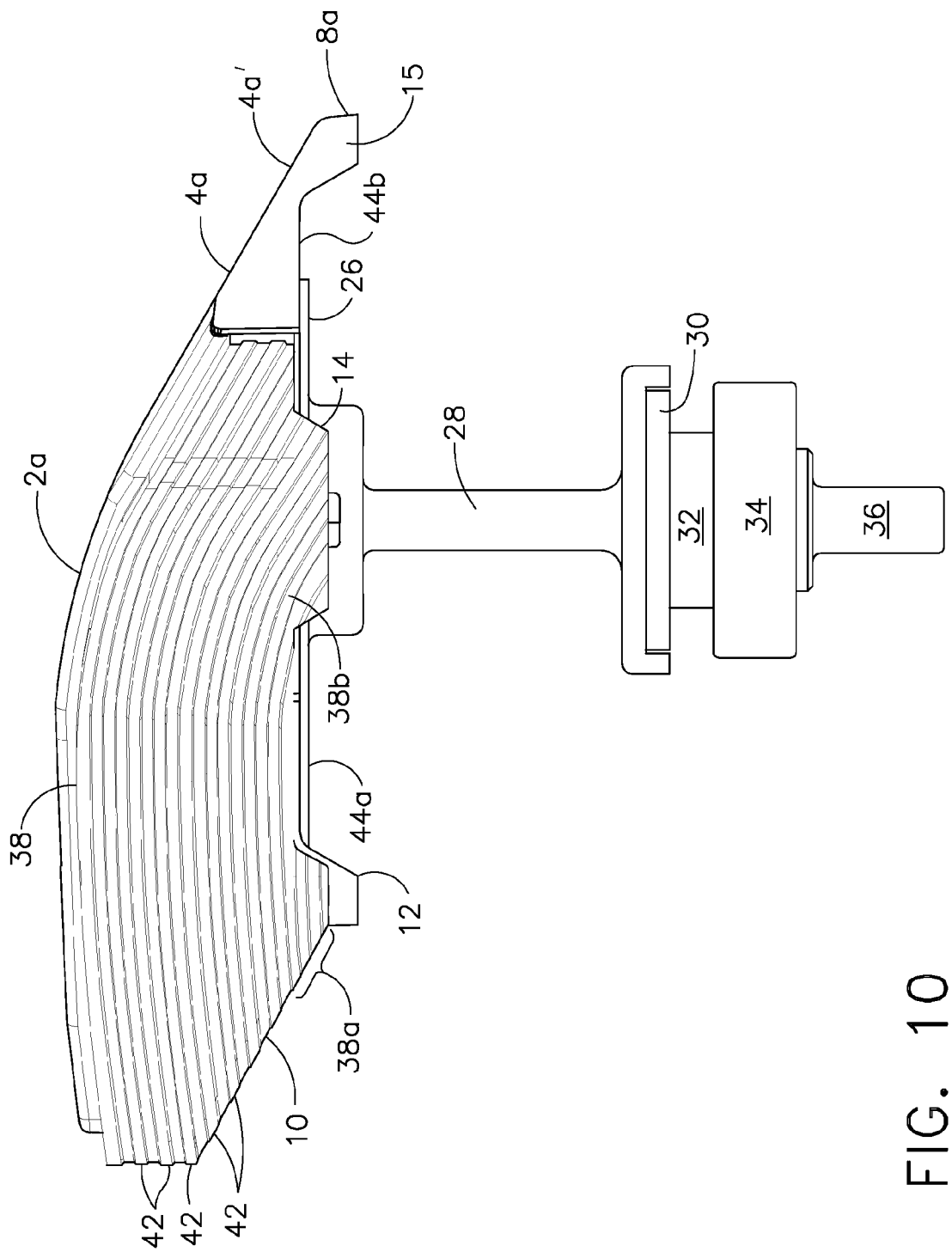
FIG. 10 is a side view of the pusher shoe shown in FIG. 4.

FIG. 9 illustrates adjacent pusher shoes with identical pusher caps 2a, respectively, each carried by a flight 54 comprising leading slat 56 and trailing slat 58. Slats 56 and 58 are connected together by end caps 60 (omitted in FIG. 9) in a spaced apart relationship, defining guide path 62 therebetween within which pusher base 28 travels. As can be seen in FIGS. 9 and 10, base 28 is shaped complementary to guide path 62. In this embodiment, slats 56 and 58 have identical shapes, being hollow and filled with foam 57 to reduce noise. Each slat 56 and 58 comprises a generally planar upper slat conveying surface 64 which, when disposed on the top run of the sortation conveyor, collectively define upper conveying plane of the sortation conveyor, generally indicated by line 66 in FIG. 9. Referring to slat 56 as an example, leading edge 56a and trailing edge 56b are recessed below slat conveying surface 64 and conveying plane 66.

Referring also to FIG. 10, pusher cap 2a includes portions 12, 14 and 15 which extend below slat conveying surface 64 and conveying plane 66. Pusher pad 38 includes portions 38a and 38b which extend below slat conveying surface 64 and conveying plane 66, adjacent, but not necessarily touching or coextensive with portions 12 and 14. Recesses 44a and 44b, formed between portions 12, 14 and 15, accommodate the configuration of slat conveying surface 64, aligned with edges 16c and 16d at the opposite side of pusher shoe 2a.

Locating the outer edges of the pusher shoe below slat conveying surface 64 and conveying plane 66 prevent pinching of flat items or the catching of a package edge by such pusher shoe edges. Although any appropriate height may be used, the overall height of pusher cap 2a, in the depicted embodiment, from the highest part of vertical mounting surface 6 to the bottom of extensions 12 and 14 is 1.6875. In the depicted embodiment, the highest part of vertical mounting surface 6 is 1.5 inches above slat conveying surface 64 and conveying plane 66. This height is selected to provide adequate engagement between packages and the pusher shoe, yet allow mislocated packages to slip up and over the shoe.

FIG. 9 illustrates the clearance between the overlapping portions of adjacent pusher shoes. Extension 48 of a leading pusher shoe extends rearward past the trailing edge of a flight and past the leading edge of the trailing flight, overlying a portion of edge 8a and surface 4a of the trailing pusher shoe.

Referring also to FIGS. 11 and 12, pusher pad 38 includes a plurality of spaced apart, raised ribs 42 configured to contact packages and other items on the conveying surface during divert. In the depicted embodiment, ribs 42 are illustrated as being generally uniformly and equally spaced, generally following the contour of upper surface 4 at mounting surface 6. Pusher pad 38 is made of a soft durable material, such as Santoprene, which cushions the contact between the pad 38 and articles on the conveying surface. Ribs 42 are a truncated pyramid, each having a tip approximately 1/32 inches wide and a base approximately 3/64 inches wide. The sides of the ribs 42 are inclined at between approximately five degrees to approximately fifteen degrees. The center to center spacing of the ribs ranges from approximately 0.14 inches to approximately 0.18 inches.

Although in the depicted embodiment ribs 42 are all of the same height, adjacent ribs could have differing heights such that a tall set of ribs would first contact a package during divert, deflecting until a shorter set of ribs also contacts the package during divert distributing the force over additional ribs. For example, the nominal variance between adjacent ribs could be 1/32 inches. This effects the acceleration of the packages, distributing the forces.

Figure 13:
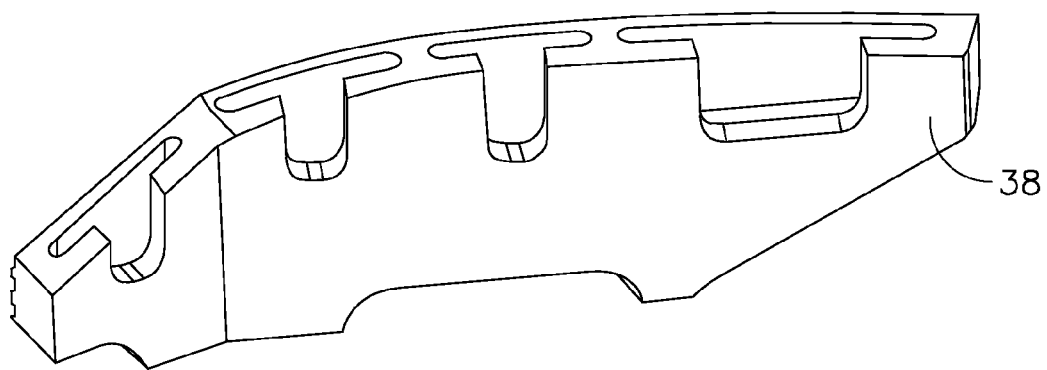
FIG. 13 is a perspective view of the back side of the pusher pad shown in FIG. 10.
Figure 14A:
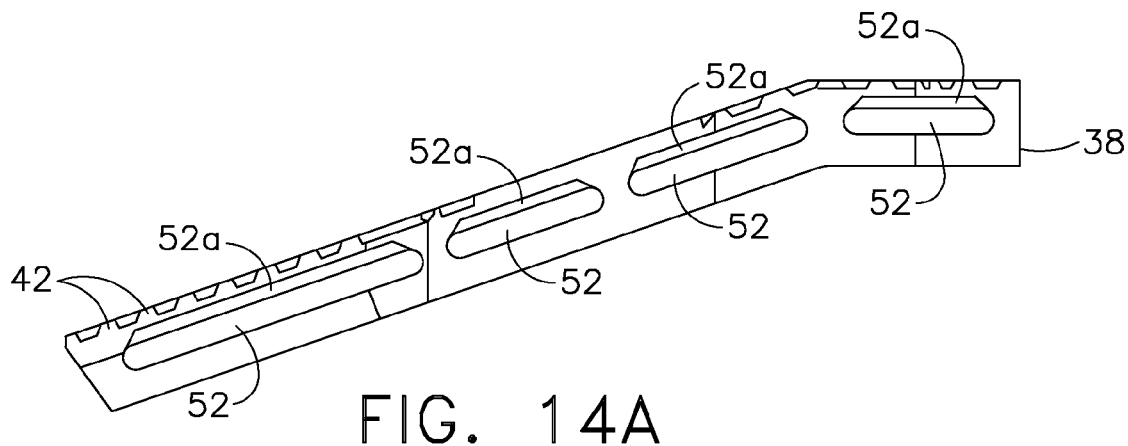
FIGS. 14A and 14B are bottom and top views, respectively, of the pusher pad.
Figure 14B:
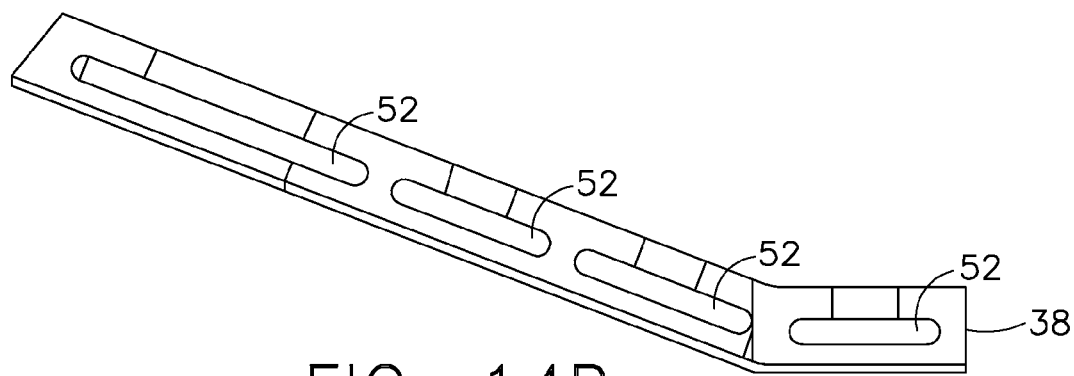
Figure 15:
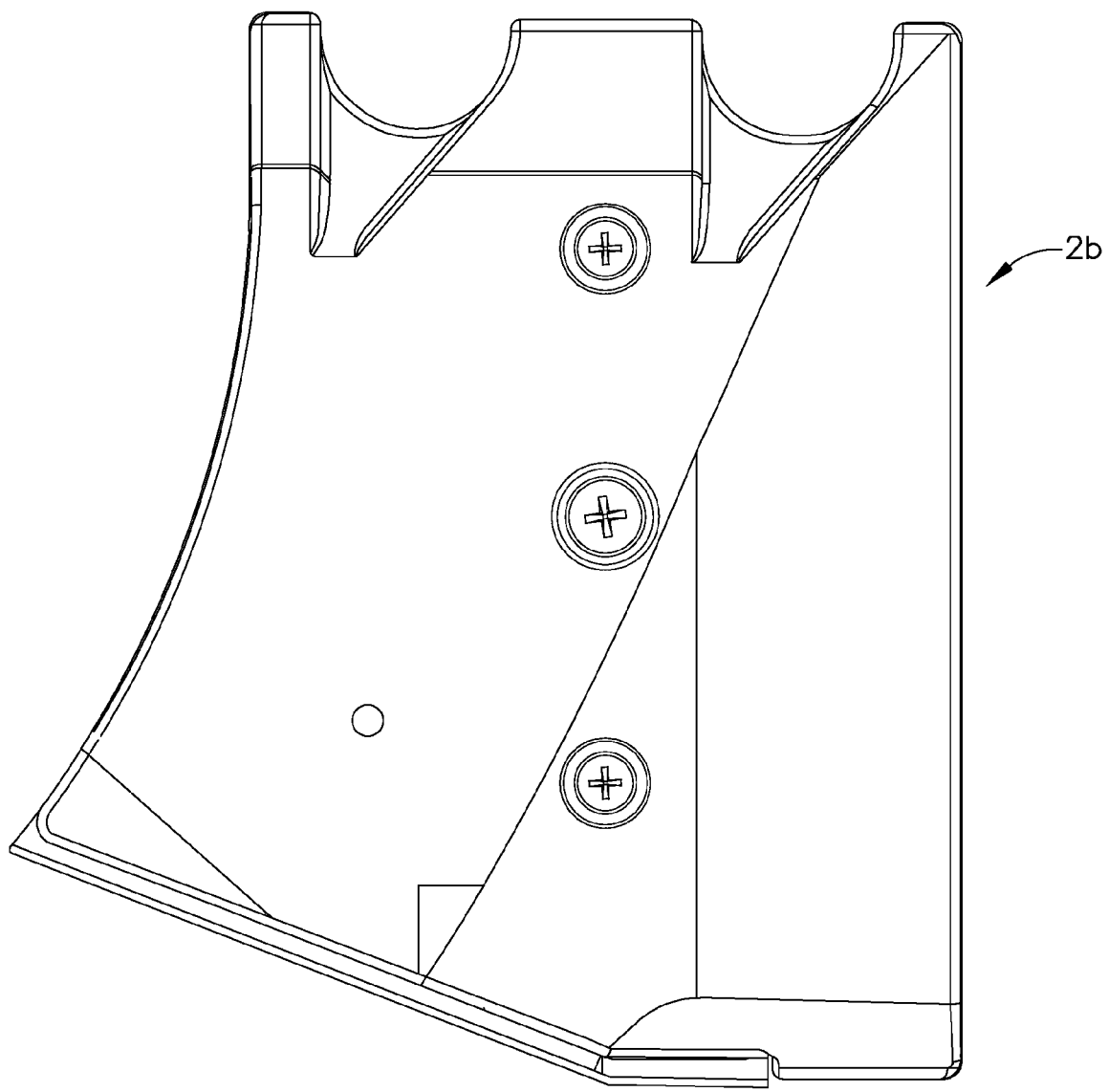
FIG. 15 is a top view of the pusher shoe shown in FIG. 1B.

As seen in FIG. 12, one of tabs 40 is illustrated in cross section. Each tab 40 has a respective ridge 40a which engages a complementarily shaped ridge 52a in a corresponding slot 52. The openings of slots 52 are shown in FIGS. 13, 14A and 14B. Of course, other configurations may be used to secure pad 38 to pusher cap 2a.

Figure 16:
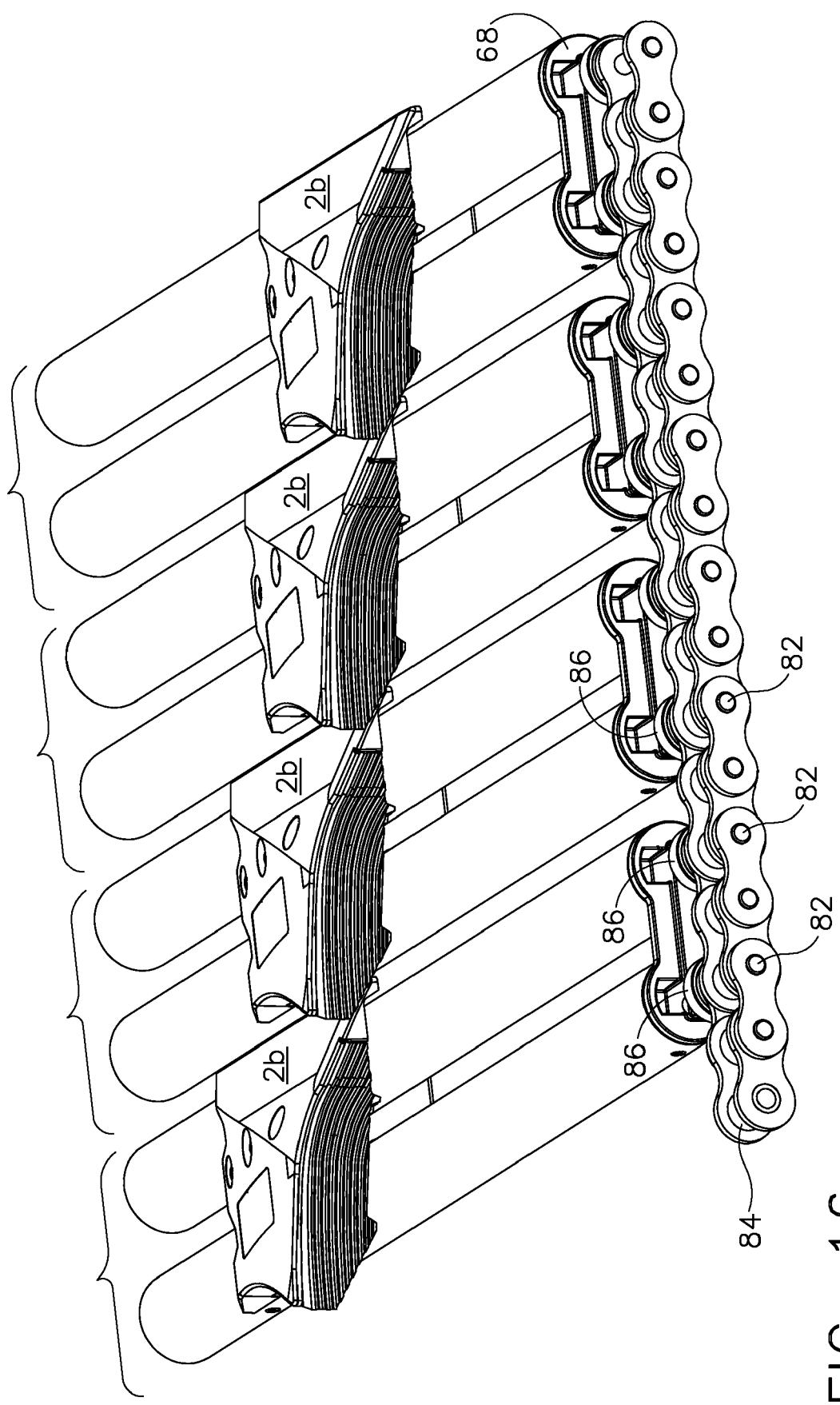
FIG. 16 is a fragmentary perspective view of a plurality of pusher shoes with the pusher cap of FIG. 1B, for a round tube type sortation conveyor, shown aligned in a diverting arrangement.
Figure 17:
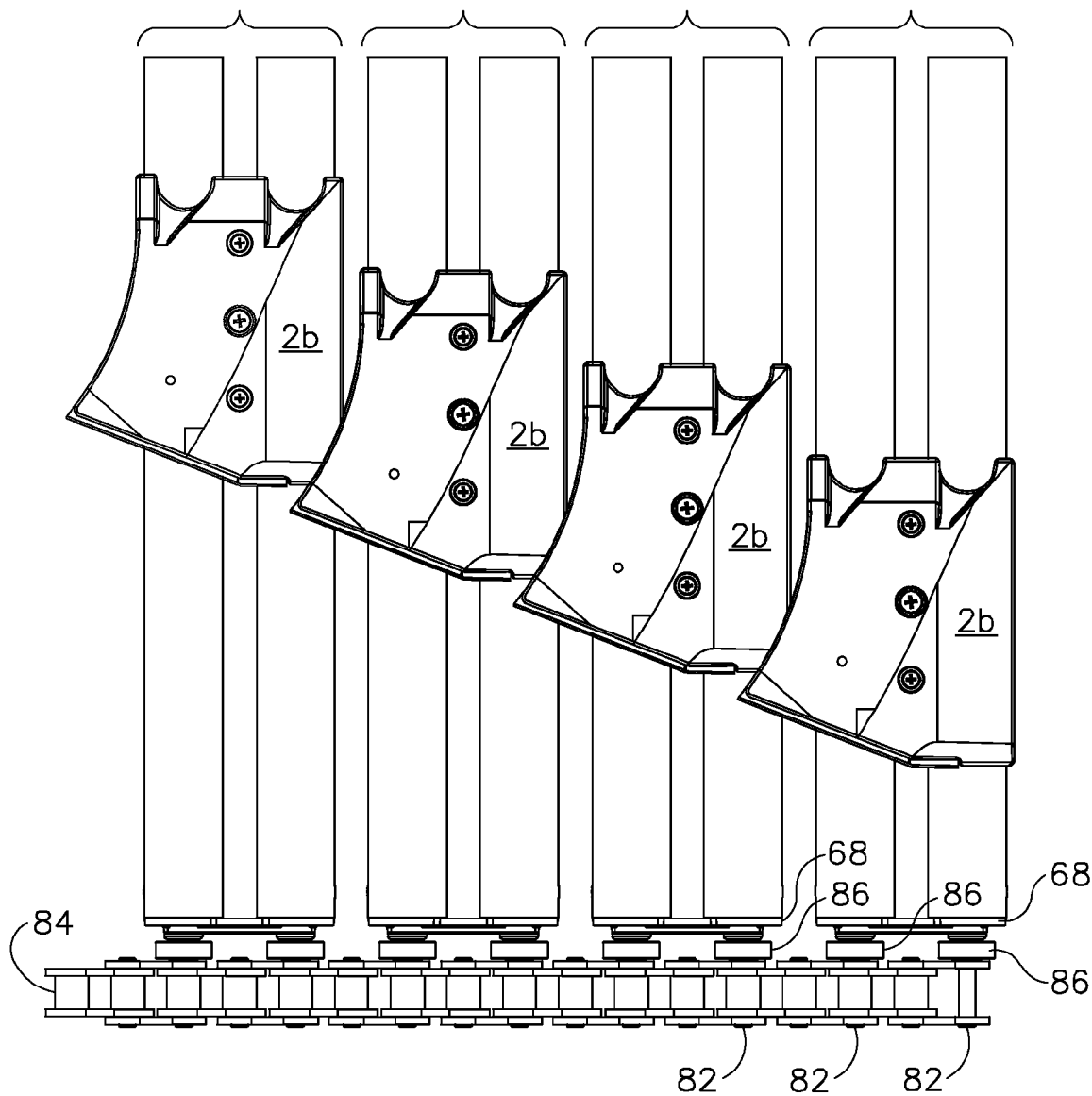
FIG. 17 is a fragmentary top view of the pusher shoes illustrated in FIG. 16.
Figure 18:
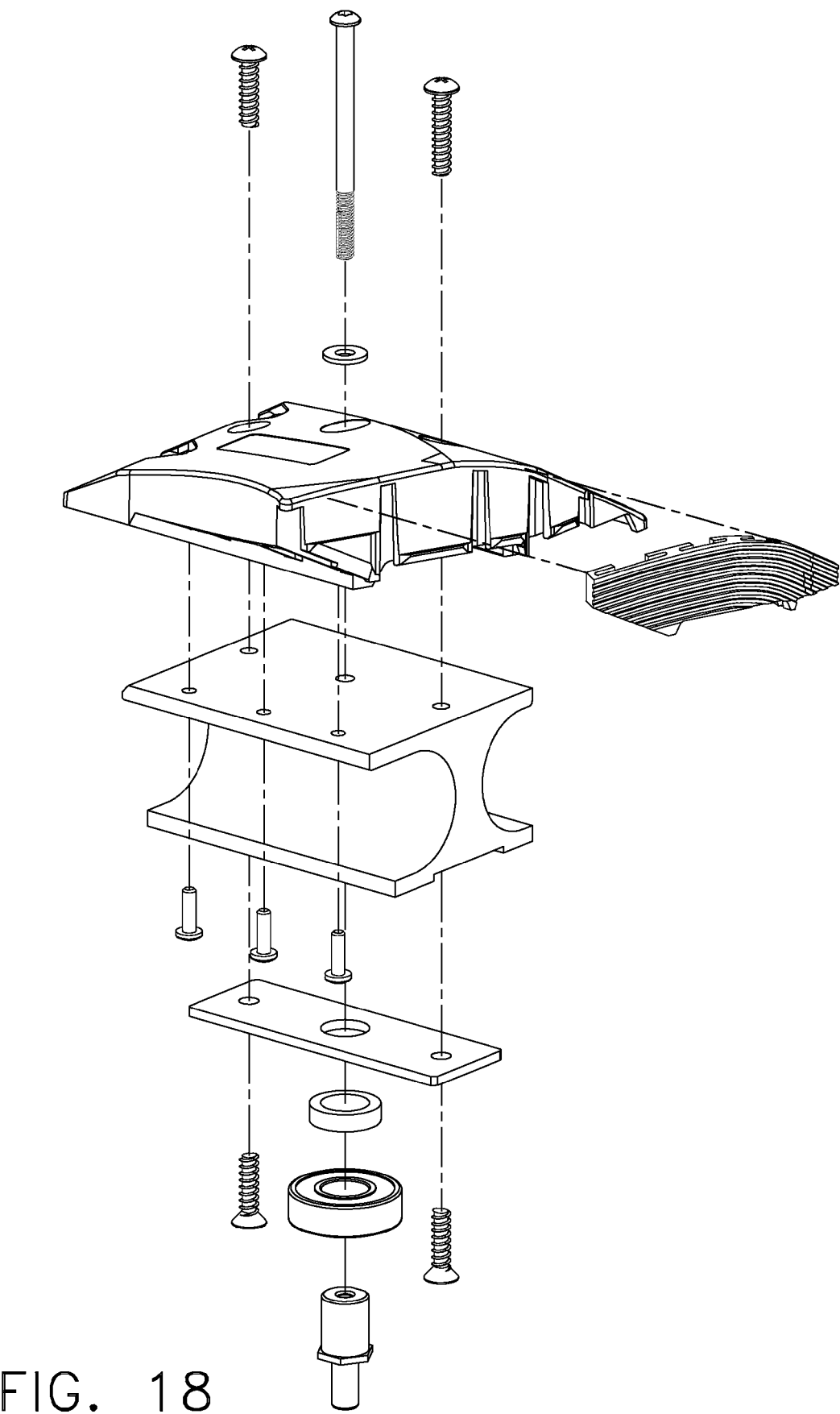
FIG. 18 is an exploded perspective view of a pusher shoe of FIG. 16.
Figure 19:
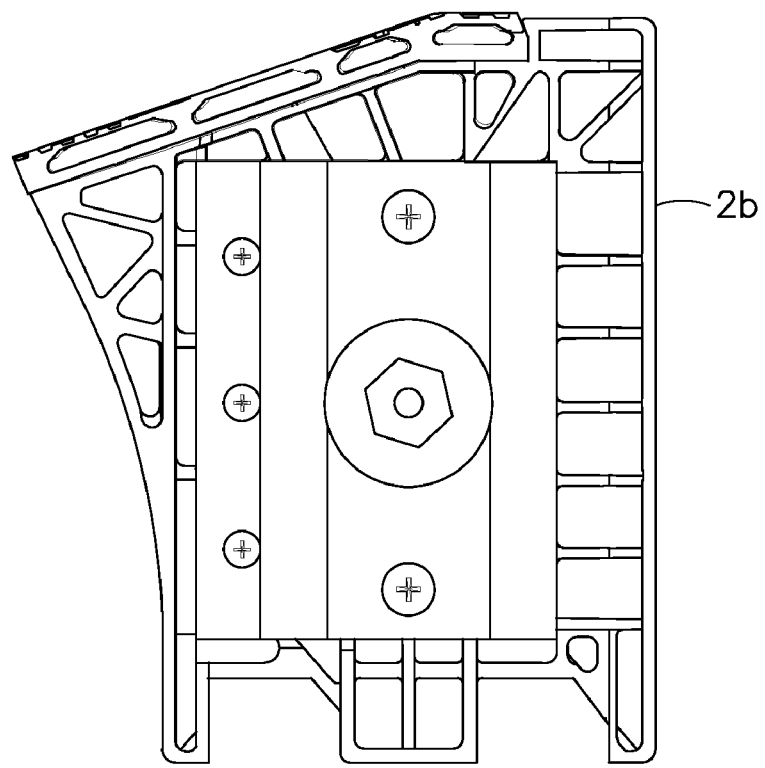
FIG. 19 is a bottom view of a pusher shoe of FIG. 16.
Figure 20:
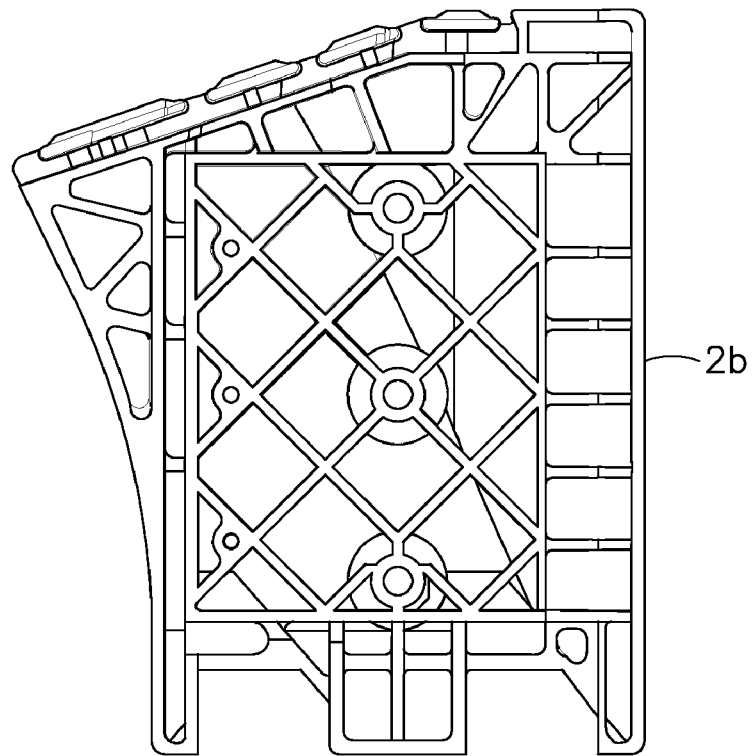
FIG. 20 is a bottom view of the pusher cap of FIG. 1B.
Figure 21:
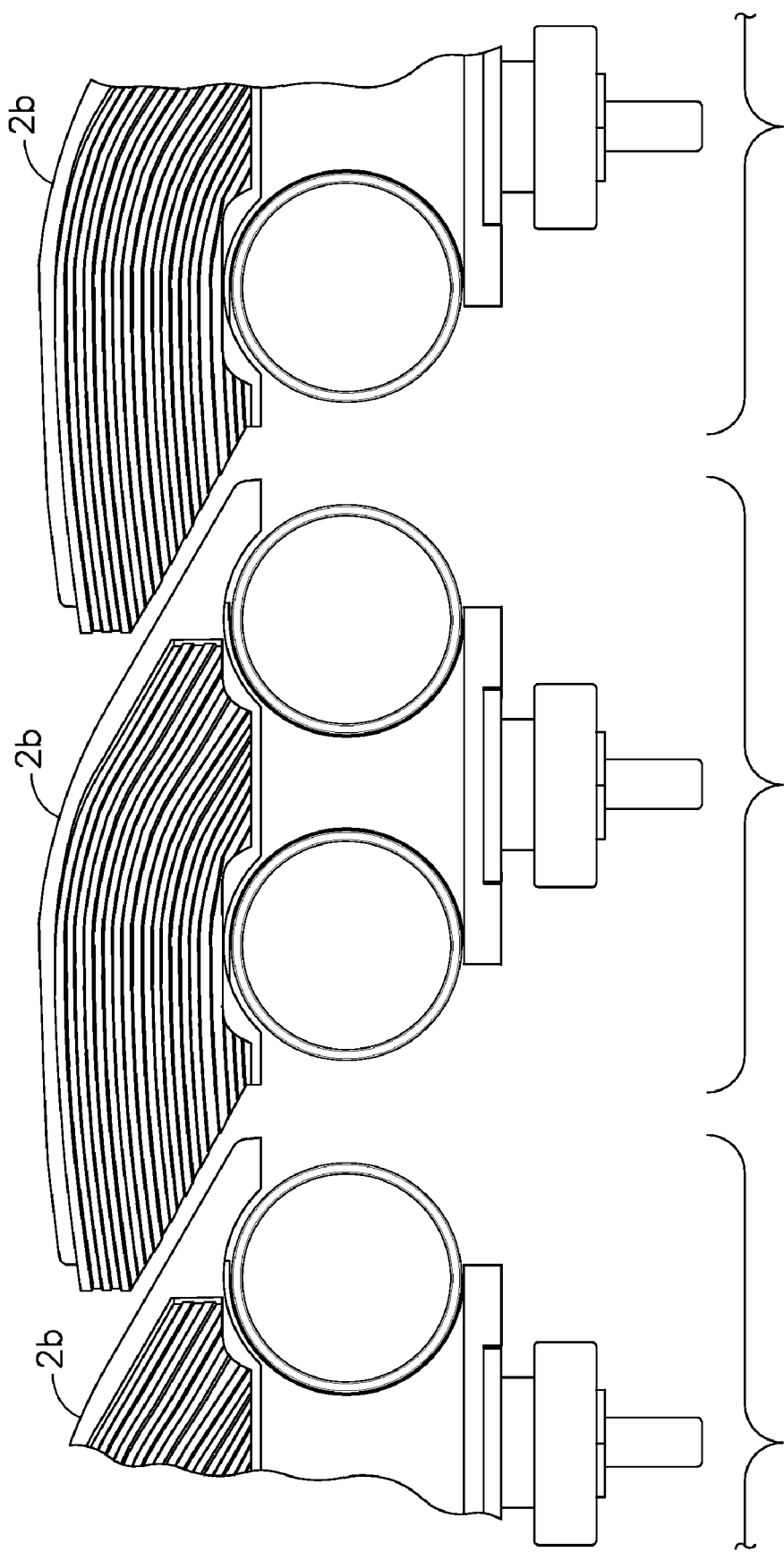
FIG. 21 is a fragmentary side view of the pusher shoes illustrated in FIG. 16.
Figure 22:
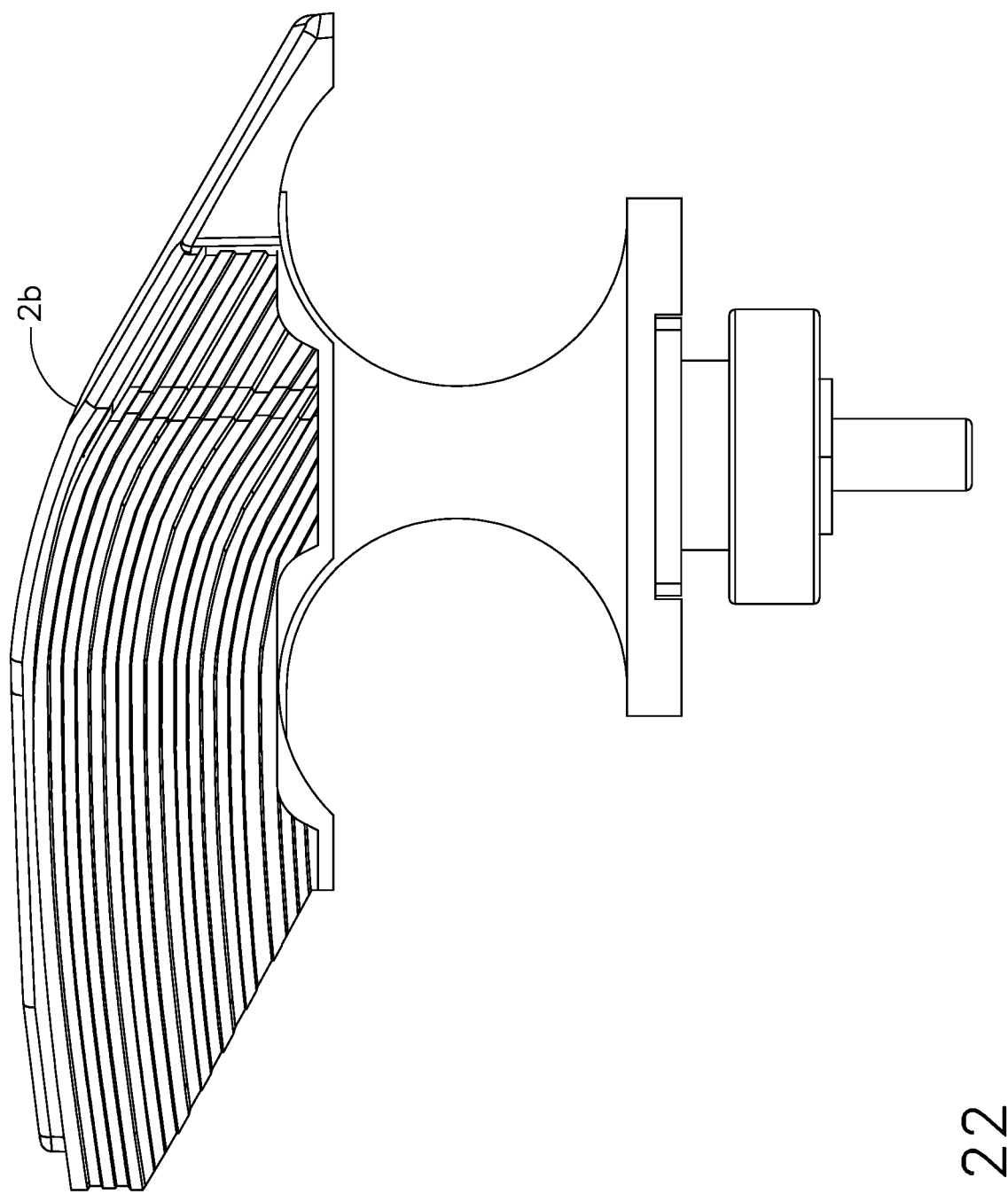
FIG. 22 is a side view of the pusher shoe shown in FIG. 16.
Figure 23:
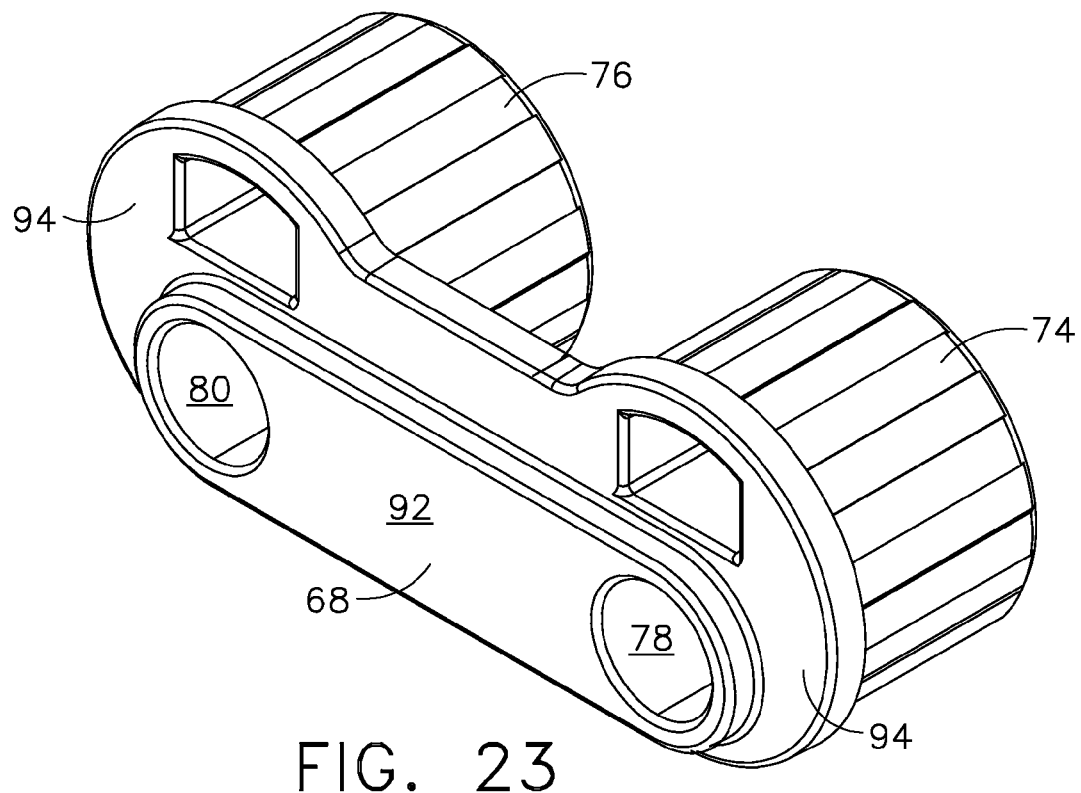
FIG. 23 is a front perspective view of the end cap of FIG. 23.

Referring to FIGS. 15-22, which correspond to FIGS. 4, 5 and 7-10, corresponding views of the pusher shoe are shown for a round tube type sortation conveyor. Since the construction between the two corresponds, with the differences being in the adaptation for the particular type of sortation conveyor involved, the round tube type sortation conveyor will not be discussed in as much detail as the flat slat type sortation conveyor. It is noted that the upper conveying plane of the round tube type sortation conveyor is defined by the generally planar upper edges of the round tubes. Additionally, as seen in FIG. 18, the pusher base is formed as a single piece.

Referring to FIGS. 23-32, round tube end cap 68 and bushings 70 are illustrated. Disposed in each end of hollow (filled with foam for noise abatement) tubes 72 are mounting portions 74 and 76 of respective end caps 68. Each mounting portion 74, 76 has a respective aligned opening 78, 80, which receives bushings 70. Referring also to FIGS. 16 and 17, every other pin 82 of endless chain 84 extends long enough to engage a respective bushing 70 carried by the end caps 68. Pins 82 also carry bearings 86, the outer raceway of which rides along a portion of the sortation conveyor frame, such as in a track, carrying the weight of the slats, pushers, and packages disposed on the conveying surface.

Mounting portions 74 and 76 include a plurality of spaced apart ribs 88 which extend above the nominal body exterior wall by approximately 0.015 inches, being sized to engage the interior walls of tubes 72 retain the end cap 68 thereto. Lead in chamfer 90 is provided at the distal ends of mounting portions 74 and 76 to guide mounting portions 74 and 76 into the respective tubes 72. The overall lengths of mounting portions 74 and 76 are preferably long enough to support tubes 72 and provide adequate retention of end cap 68 thereto.

The outer diameter defined by the outer surfaces of radially extending ribs 88 provides up to a nominal 0.010 diametrical interference fit with the inner diameter of the hollow cylindrical tubes 72.

As can be seen, cylindrical mounting portions 74 and 76 are not concentric with openings 78 and 80. The centers of mounting portions 74 and 76 are offset approximately 5/16 inch vertically above openings 78 and 80. This raises the upper surface of tubes 72 and the upper conveying plane to the same level as the slat conveying surfaces 64 and conveying plane 66. This provides the conveying surface at the same height relative to the chain pin centers for both the slat and the round tube sortation conveyors, allowing the commonality between pusher caps 2a and 2b.

Figure 29:
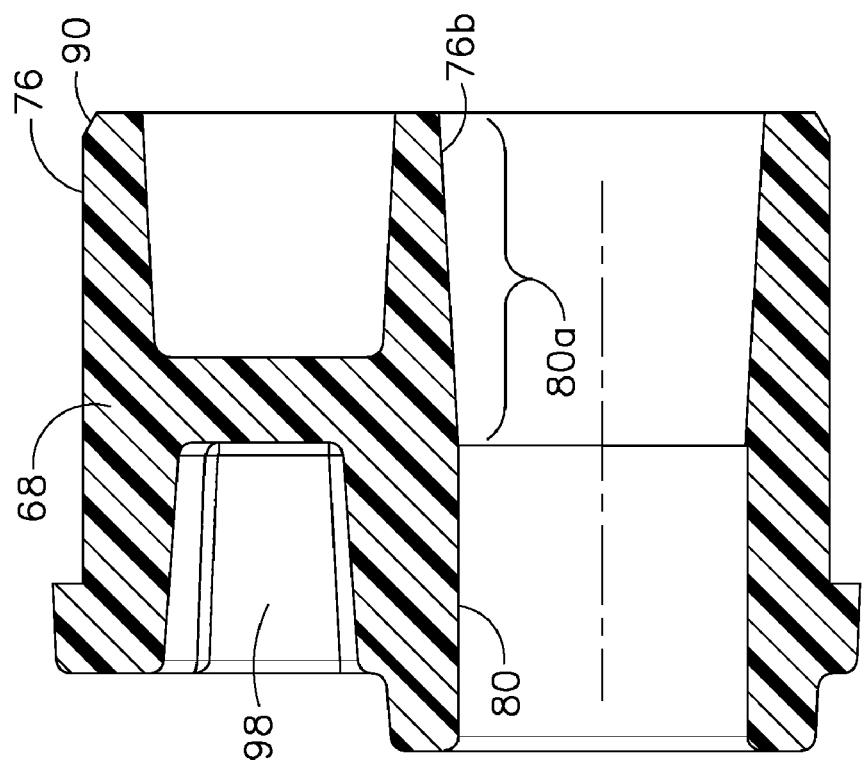
FIG. 29 is a cross-sectional view of the end cap of FIG. 23 taken along line 29-29 of FIG. 25.

End cap 68 includes a raised boss 92 extending forwardly from wall 94, with openings 78 and 80 therein. As seen in FIG. 29, opening 80 extends rearwardly for a portion of the length of mounting portion 76, opening up slightly 80a for the last portion which terminates adjacent distal end 76b.

Wall 94 also includes two spaced apart openings 96 and 98. These openings provide a location in which to locate a screw driver or other lever to raise end caps 68 when attached to tubes 72 for disassembly or to otherwise work on the sortation conveyor.

Figure 24:
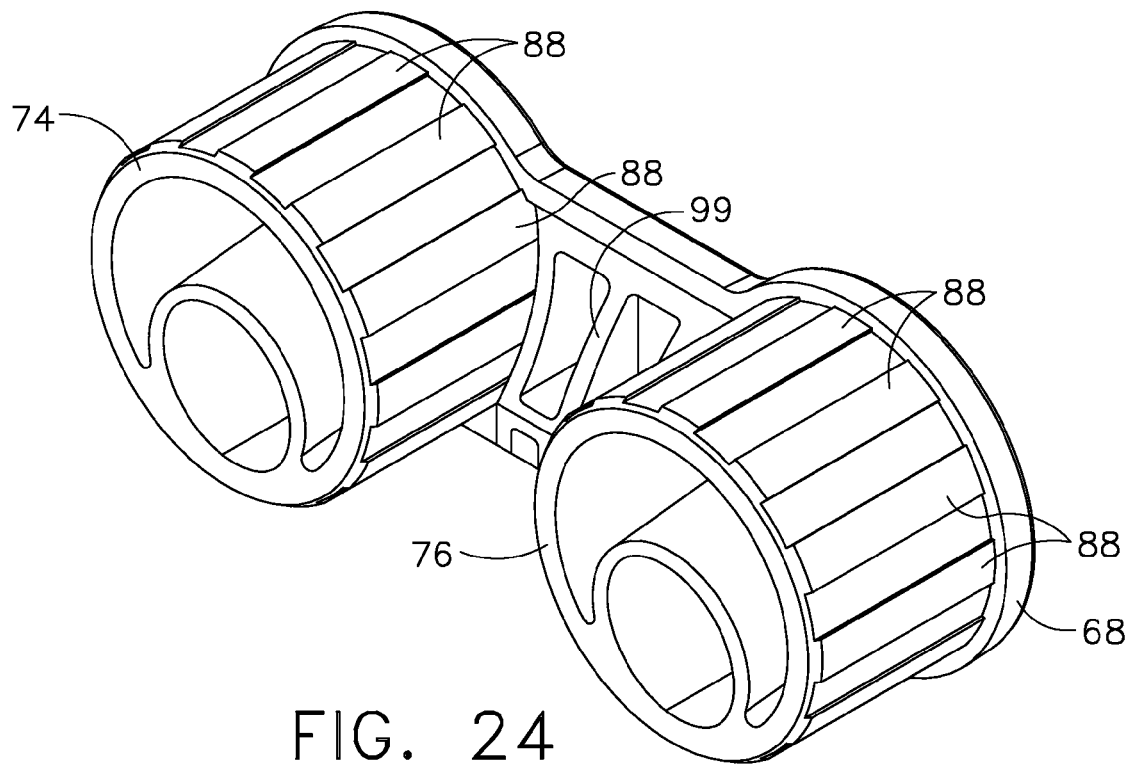
FIG. 24 is a rear perspective view of the round tube end cap.
Figure 28:
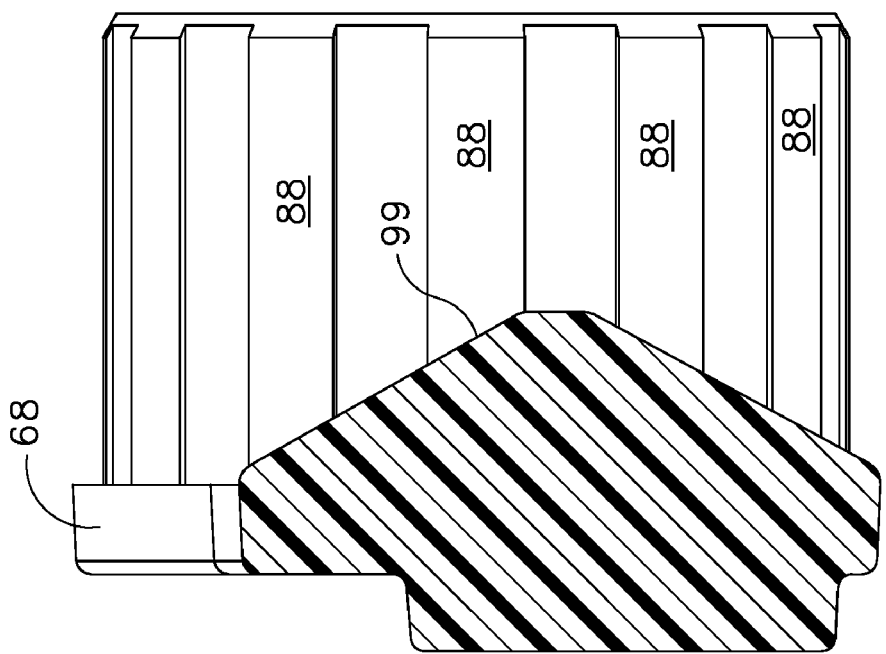
FIG. 28 is a cross-sectional view of the round tube end cap taken along line 28-28 of FIG. 25.

As seen in FIGS. 24 and 28, rib portion 99 extends rearwardly from wall 94, interposed between mounting portions 74 and 76, located not to interfere with tubes 72. Rib portion 99, as illustrated includes spaced apart walls. Depending on the clearances, rib portion 99 may need to be omitted to avoid interference with movement of the pusher base.

Figure 30:
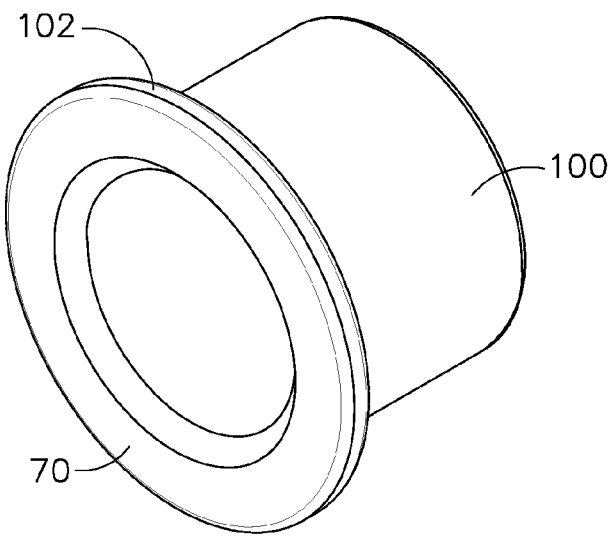
FIG. 30 is a perspective view of the bushing of the end cap of FIG. 23.
Figure 31:
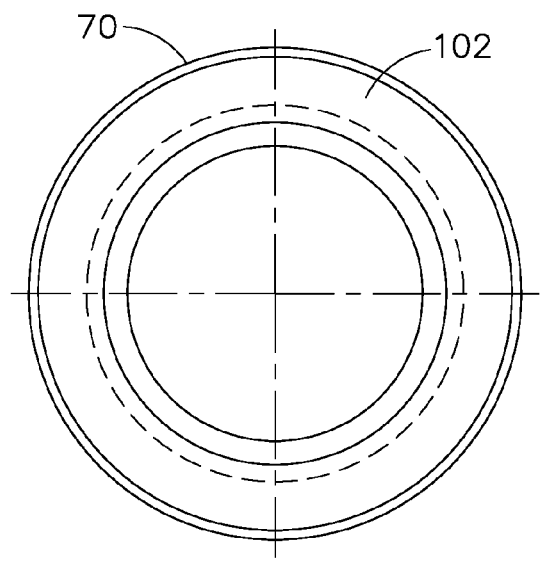
FIG. 31 is a front view of the bushing of the end cap of FIG. 23.
Figure 32:
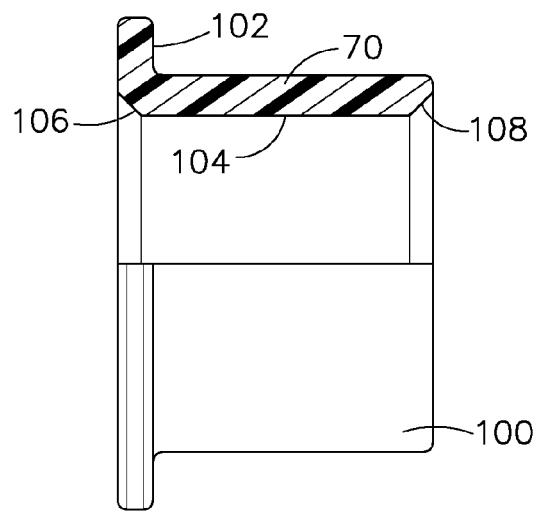
FIG. 32 is a side view of the bushing of the end cap of FIG. 23 in partial cross-section taken along the center line of the bushing.

Referring to FIGS. 30-32, there is shown bushing 70 having a generally cylindrical body portion 100 and a flange 102. Bushing 70 is sized to be disposed in a respective opening 78, 80. Although not seen in FIGS. 30-32, bushing 70 is keyed to openings 78, 80 in order to prevent rotation. Bushing 70 includes centrally disposed cylindrical bore 104, with a chamfer 106, 108 at either end. Bore 104 is sized to receive a respective extension of chain pins 82. It is noted that openings 78 and 80 are spaced apart a distance equal to twice the chain link length or pitch. Bushing 70 is made of Delrin®.

Referring to FIGS. 33-38, there is shown another embodiment of an end cap for a round tube type sortation conveyor according to another aspect of the present invention. End cap 110 is similar to end cap 68, with rearwardly (relative to wall 112) extending cylindrical mounting portions 114 and 116, which include a plurality of spaced apart radially extending ribs 118. Mounting portions 114 and 116 are longer than the corresponding portions of end cap 68, extending about 2.25 inches from the back of wall 112, and include bosses 120 and 122 internal to mounting portions 114 and 116 into which a fastener, such as a screw (not shown), extending through an opening formed through the wall of tube 72, is secured to hold end cap 110 more securely and reliably to the ends of tubes 72. Bosses 120 and 122 may include a preformed opening for receiving a fastener. A self tapping or threading fastener, as well as any other suitable fastener, may be used.

Figure 34:
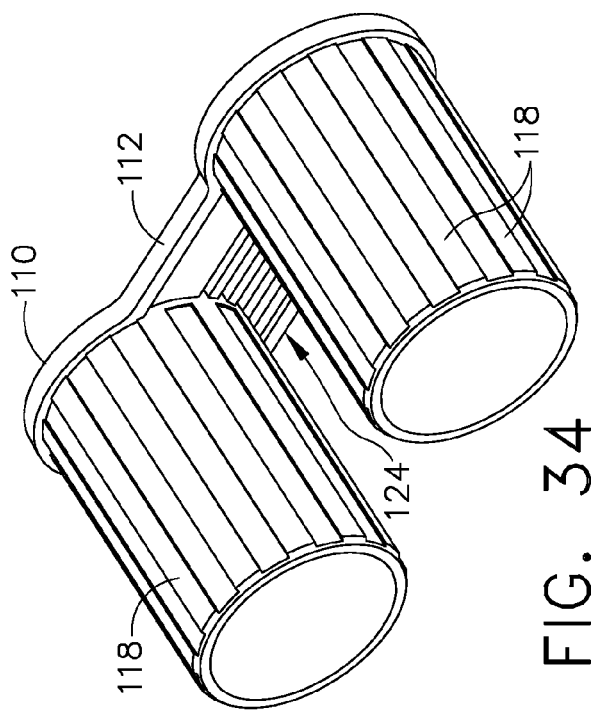
FIG. 34 is a rear perspective view of the end cap of FIG. 33.
Figure 33:
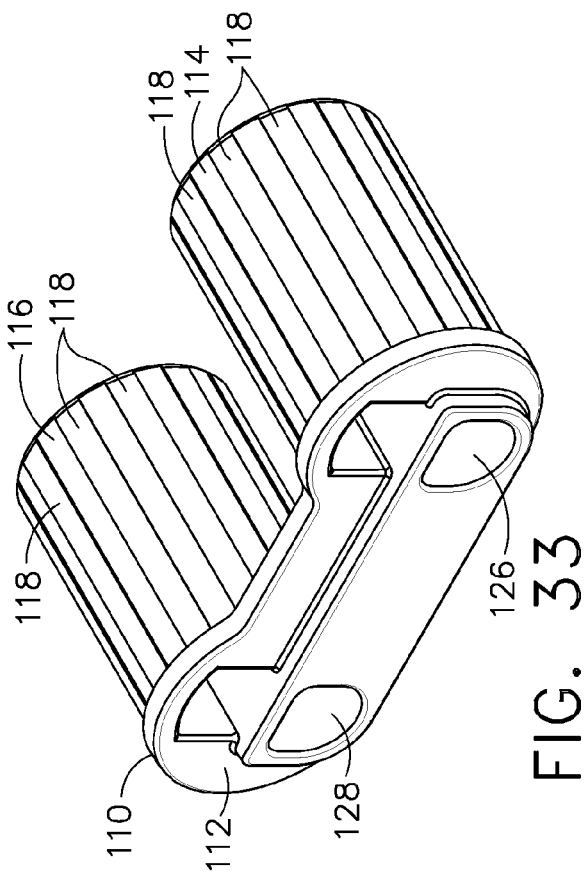
FIG. 33 is a front perspective view of another embodiment of an end cap for a round tube type conveyor according to another aspect of the present invention.
Figure 36:
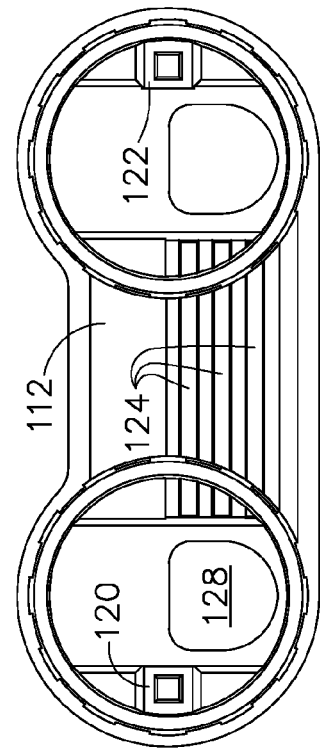
FIG. 36 is a rear view of the end cap of FIG. 33.
Figure 35:
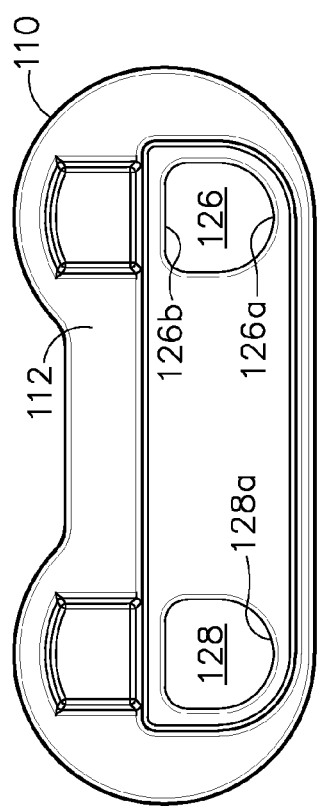
FIG. 35 is a front view of the end cap of FIG. 33.

As seen in FIGS. 34 and 36, the back side of wall 112 includes a plurality of ribs 124, which provide cooling while molding-end cap 110 to avoid distortion, and provides additional stiffness.

End cap 110 includes openings 126 and 128 for receiving bushings 130. Openings 126 and 128, respectively, include generally arcuate portion 126a, 128a. The remaining interior surfaces of openings 126 and 128 are generally flat with rounded corners. This profile keys bushings 130 in the openings to control the orientation of bushings 130. Its geometry makes bushing 130 stiffer in the vertical direction than in the horizontal direction.

Referring to FIGS. 37 and 38, bushing 130 is retained in opening 126 at the front by flange 132 and at the rear by lip 134 extending from the perimeter of the rear of bushing 130 except across the flat upper edge 126b. There is no lip across flat upper edge 126b due to space limitations as well as to make installation of bushing 130 easier. Bushing 130 includes opening 136 at rear.

Figure 39:
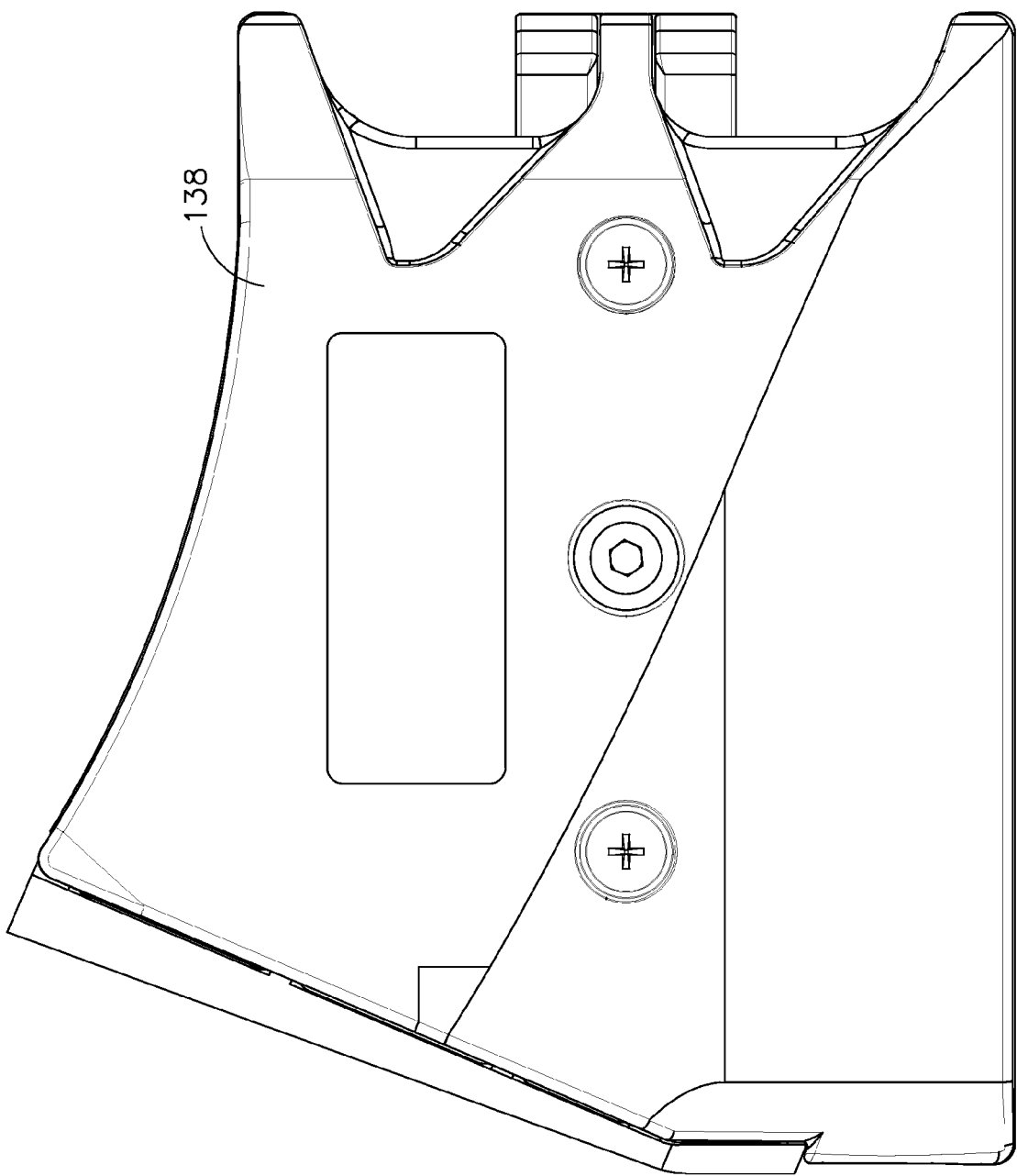
FIGS. 39 and 40 are top views of another embodiment of pusher shoes constructed in accordance with another aspect of the present invention, showing 20° right hand and left hand pusher shoes, respectively.
Figure 40:
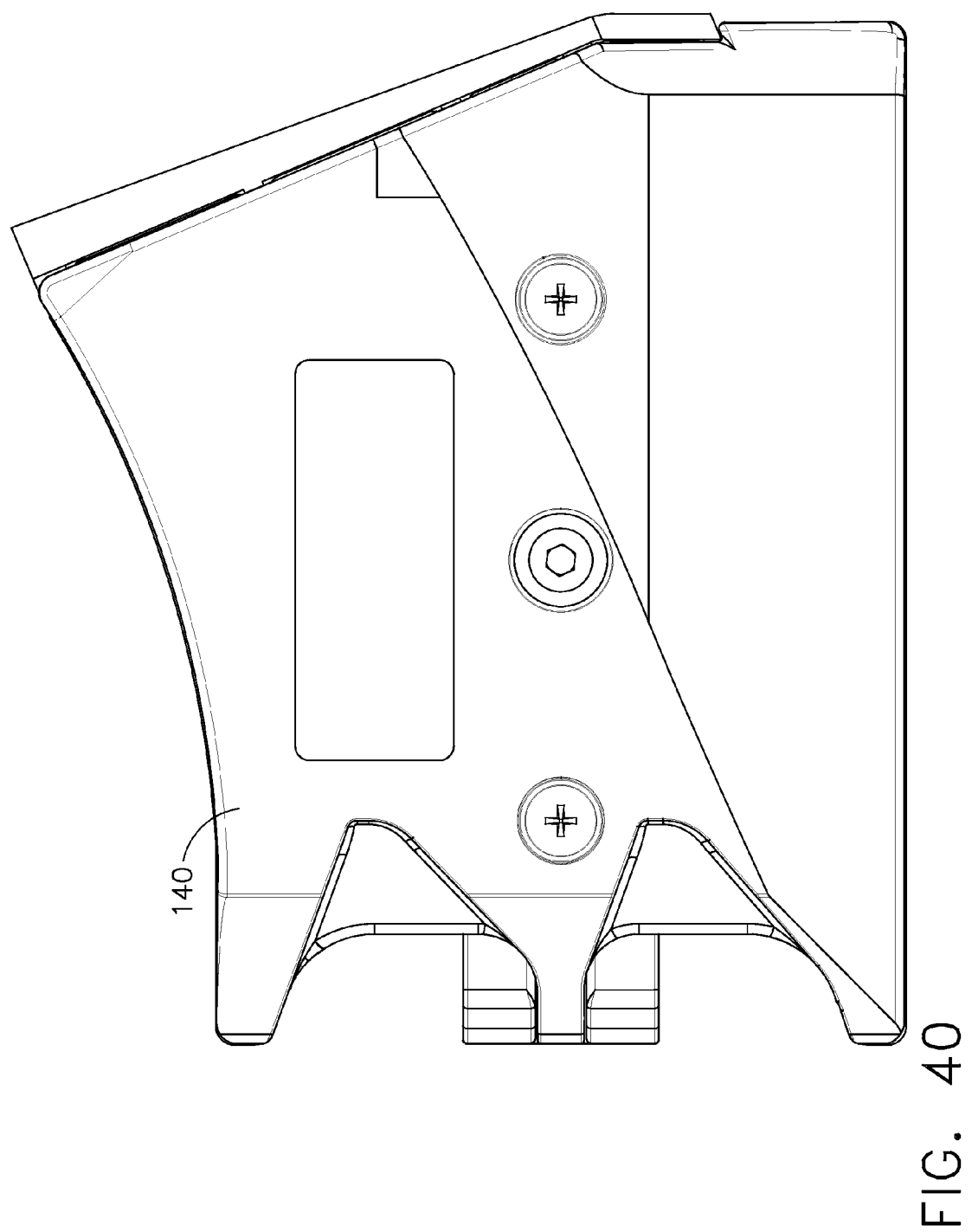
Figure 41:
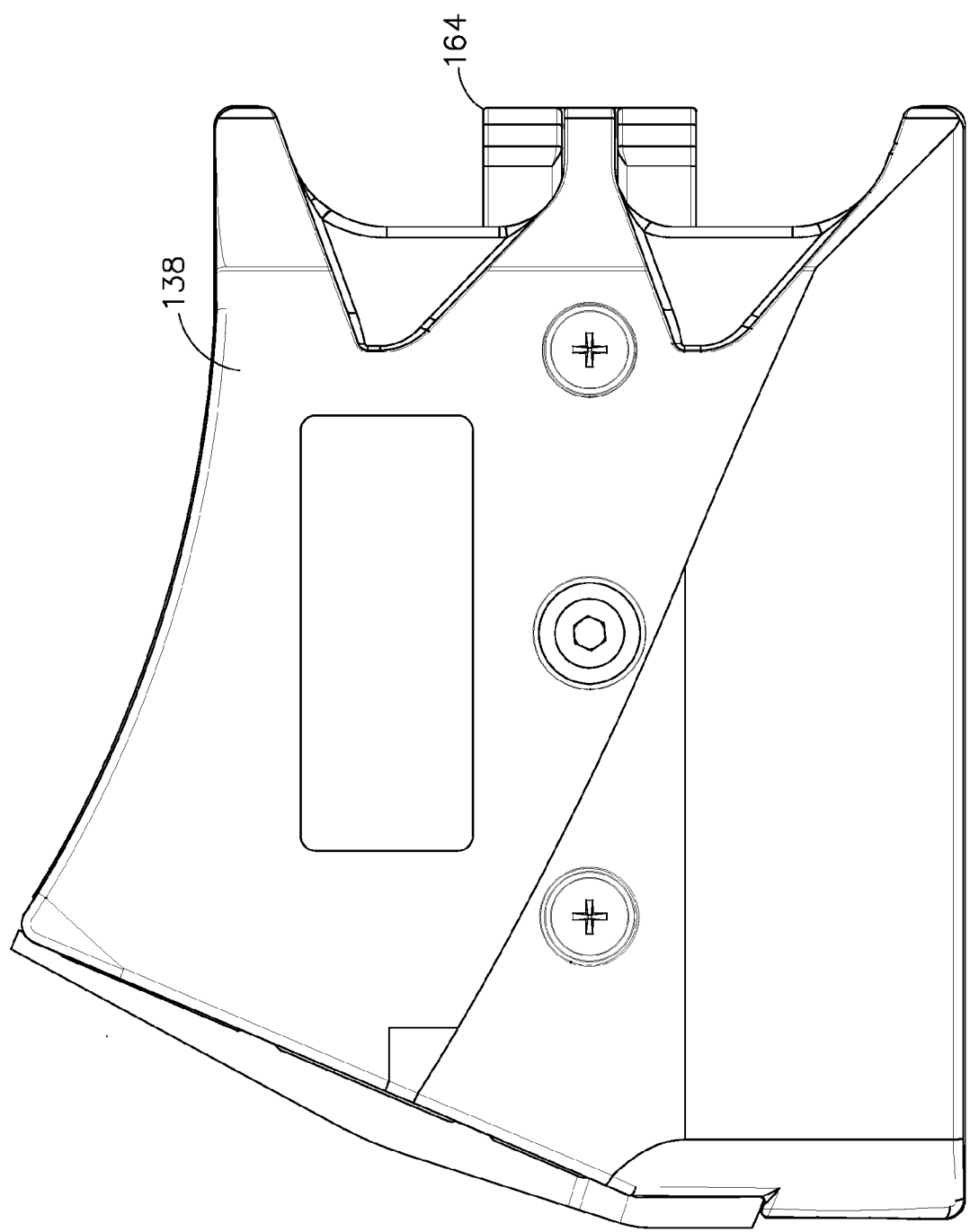
FIGS. 41 and 42 are top views of pusher shoes similar to FIGS. 39 and 40, showing 30° right hand and left hand pusher shoes, respectively.
Figure 42:
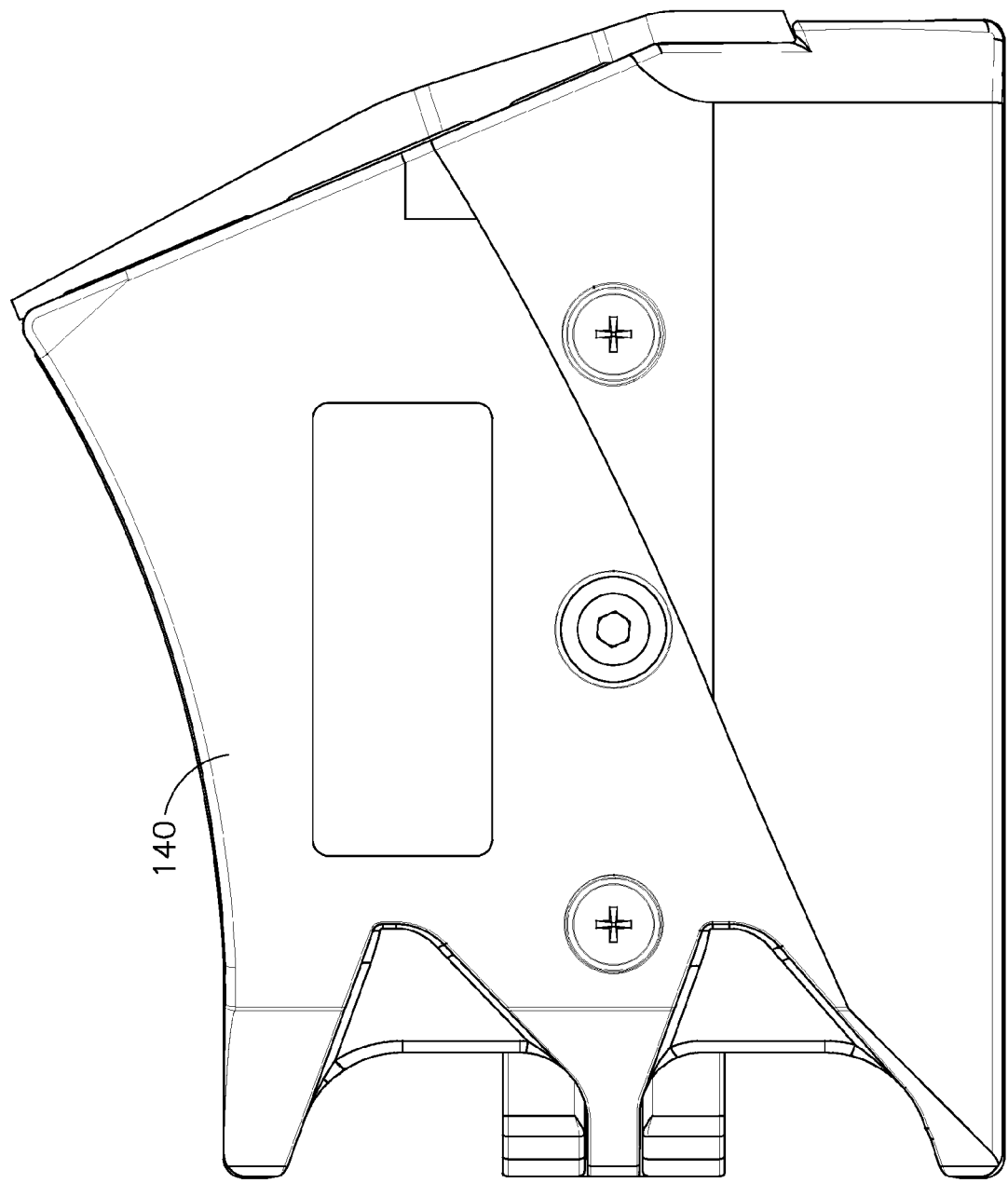
Figure 46:
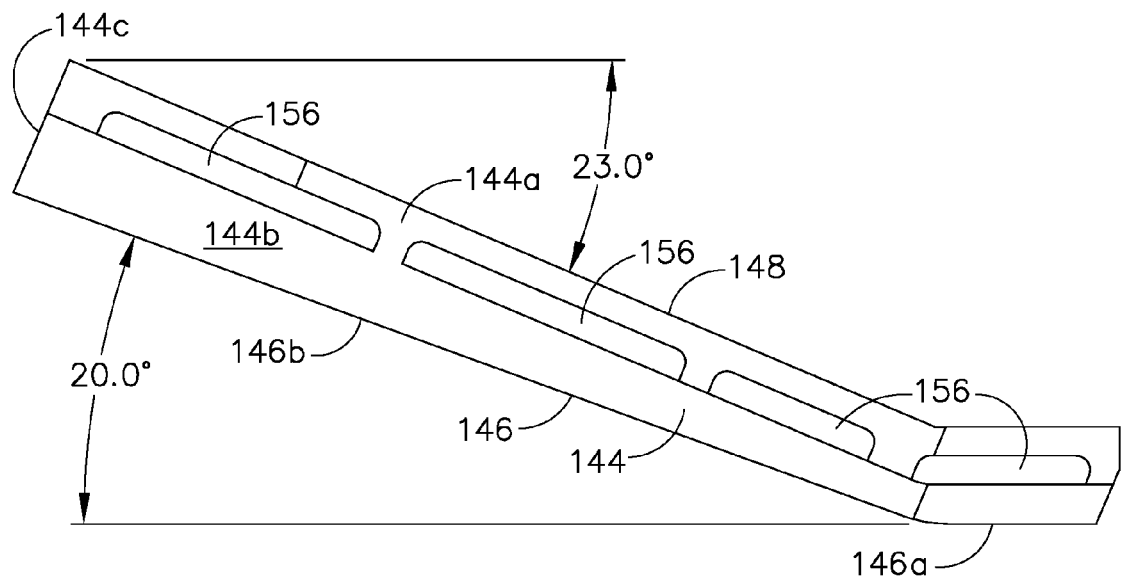
FIG. 46 is a top view of the pusher pad shown in FIG. 39.
Figure 48:
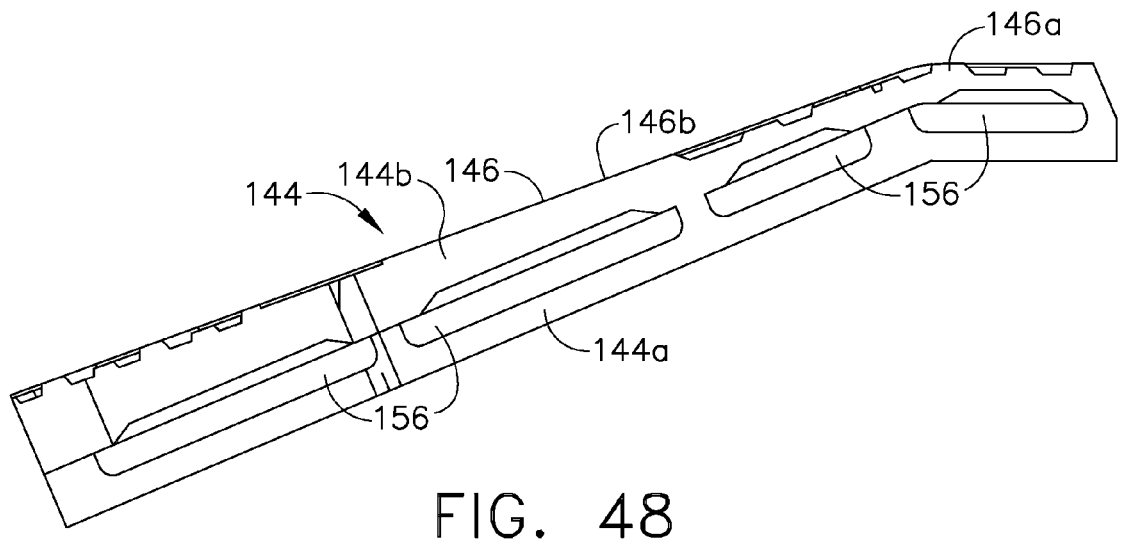
FIG. 48 is a bottom view of the pusher pad shown in FIG. 39.
Figure 47:
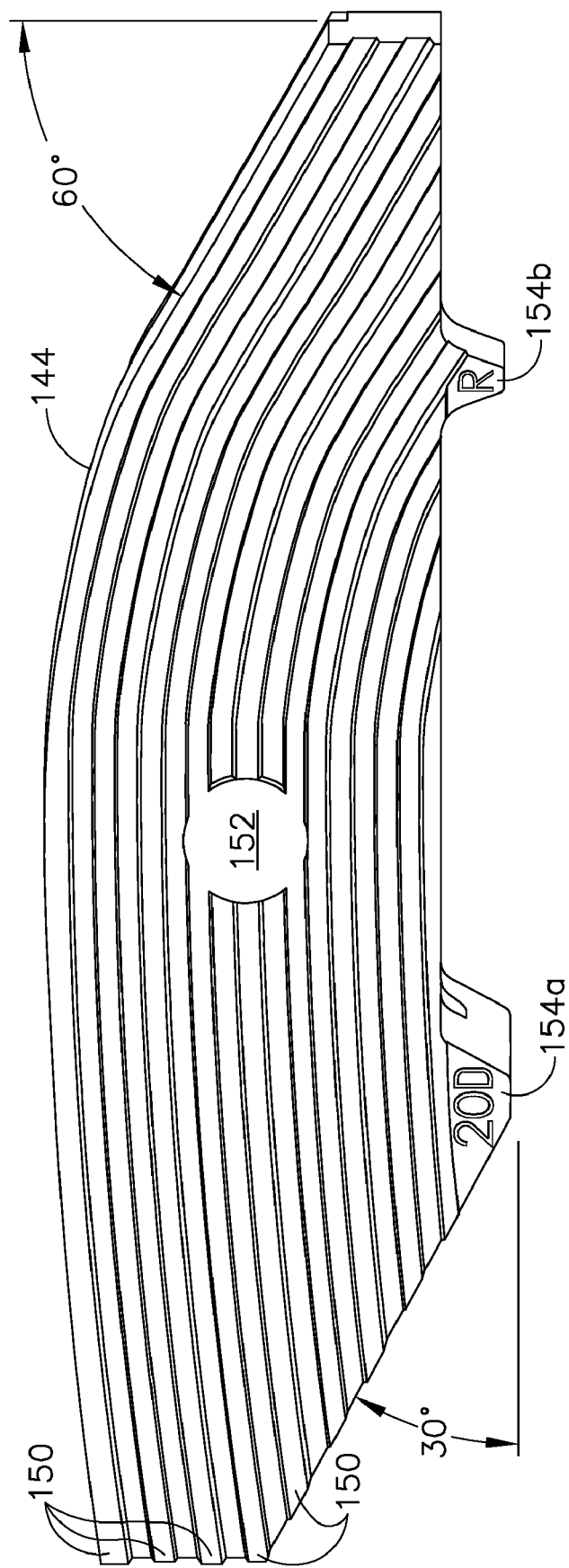
FIG. 47 is a side view of the pusher pad shown in FIG. 39.
Figure 49:
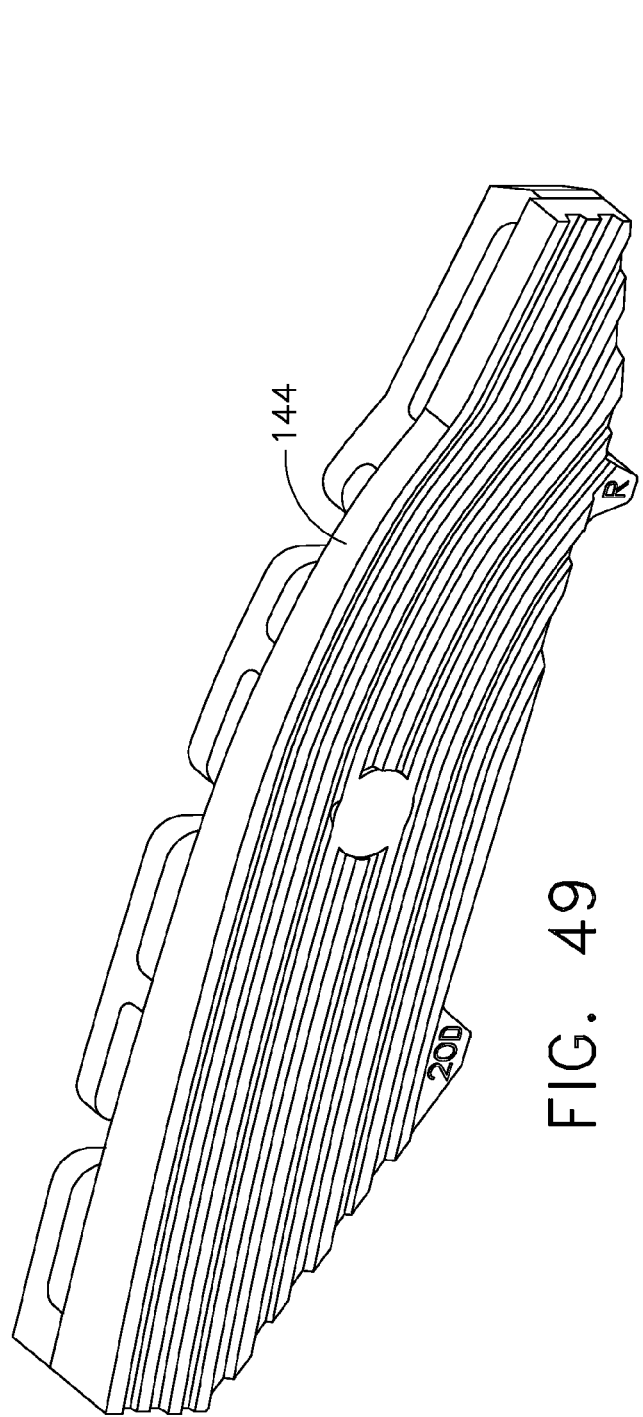
FIG. 49 is a perspective view of the pusher pad shown in FIG. 39.

FIGS. 39-42 illustrate 20° and 30° right and left hand pusher shoes. Since the pusher caps for each of these shoes are similar, with the only differences being that FIGS. 39 and 41 illustrate right hand pusher caps 138 and FIGS. 40 and 42 illustrate left hand pusher caps 140, right hand pusher cap 138 will be described, it being understood that left hand pusher cap 140 has corresponding construction.

Referring also to FIGS. 43-45, pusher shoe 138 includes generally vertical mounting surface 142 with a plurality of tabs 144, each having a respective ridge 144a for securing a pusher pad to mounting surface 142 in the manner previously described.

In the depicted embodiment, portion 142a of mounting surface 142 is formed at an angle of about 23° relative to portion 142b and the cap's longitudinal direction of travel. In this embodiment, the angle of mounting surface 142 does not establish the divert angle. The pusher pads used with pusher cap 138 are configured either to define a 20° or 30° divert angle and mount to a common 23° mounting surface.

Referring to FIGS. 46-50, divert surface 146 of pusher pad 144 includes portion 146b which is disposed at a 20° angle relative to the longitudinal direction of travel of pusher cap 138 and, concomitantly to portion 146a. Pusher pad 144 has a mounting surface 148 disposed at 23° configured to mount to mounting surface 142 of pusher cap 138.

As can be seen, pusher pad 144 is thicker at end 144c as a result of the divergence of the angle of divert surface portion 146a and mounting surface 148. For manufacturing purposes, pusher pad 144 is manufactured as two portions, 144a and 144b, and then joined together. Of course, pusher pad 144 may be made of unitary construction.

Divert surface 146 includes a plurality of spaced apart, raised ribs 150, similar to the pusher pad ribs previously described herein. Every other rib 150 has a height (from base to tip) which is lower than the two adjacent ribs. As a result of the molding process, ribs 150 do not extend into area 152.

Pusher pad 144 includes portions 154a and 154b which extend downwardly below the conveying plane of the sortation conveyor, corresponding with portions 142c and 142d of mounting surface 142. Portions 154a and 154b are illustrated without ribs, instead including indicia indicating the divert angle and direction (right hand). Alternatively, ribs may be included on portions 154a and 154b.

As seen in FIG. 45, pusher cap 138 includes a plurality of ribs formed in the bottom of pusher cap 138 similar to the ribs of pusher caps 2a and 2b. Wall 138d is interrupted by gap 138e which is present to maintain dimensional stability during manufacturing.

Figure 50:
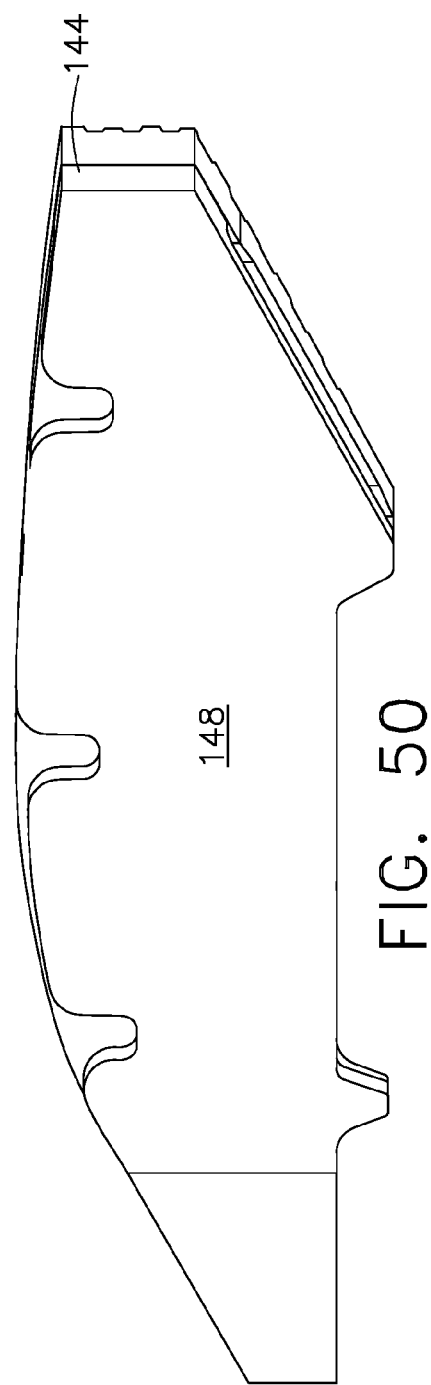
FIG. 50 is a rear view of the pusher pad shown in FIG. 39.
Figure 51:
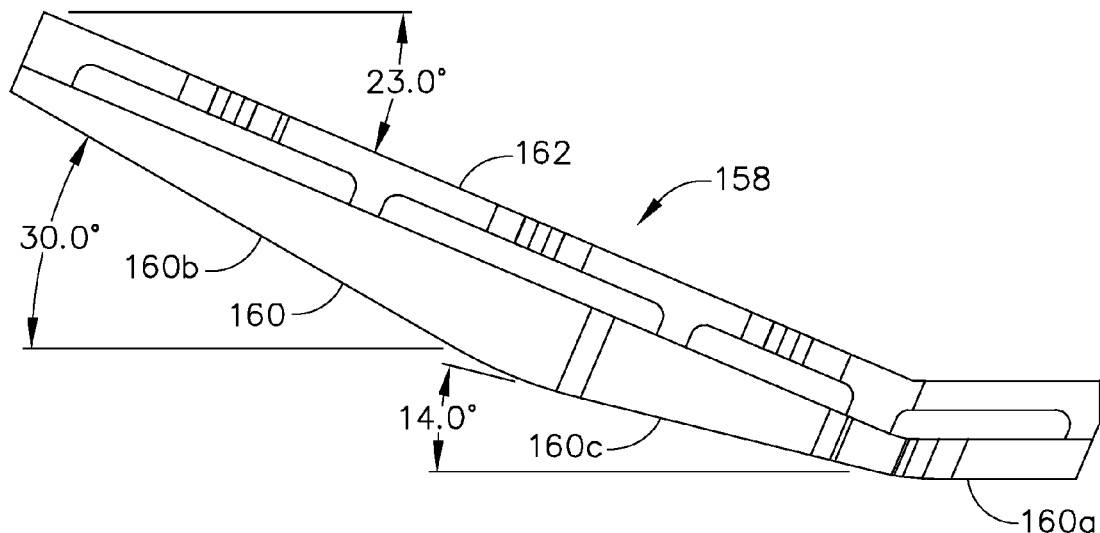
FIG. 51 is a top view of the pusher pad shown in FIG. 41.
Figure 52:
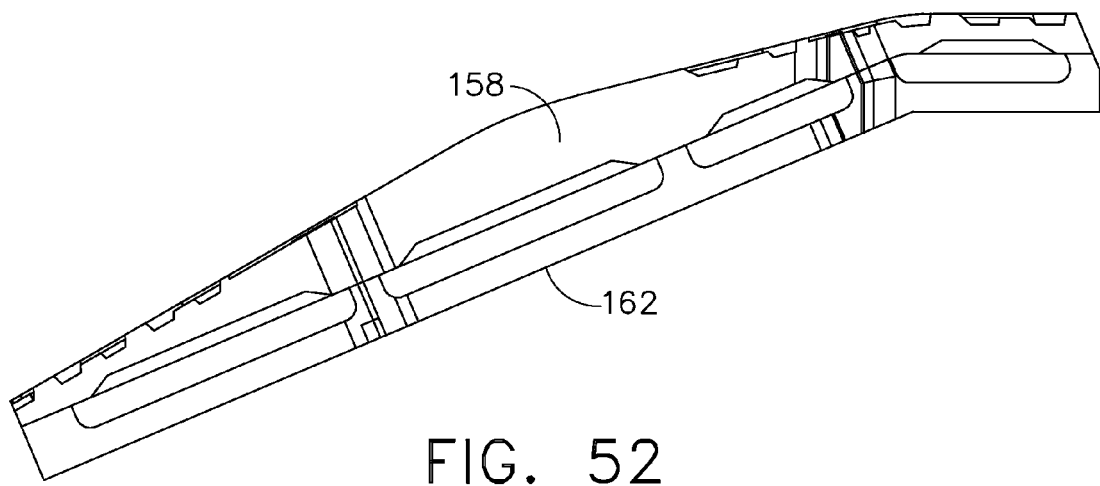
FIG. 52 is a side view of the pusher pad shown in FIG. 41.
Figure 53:
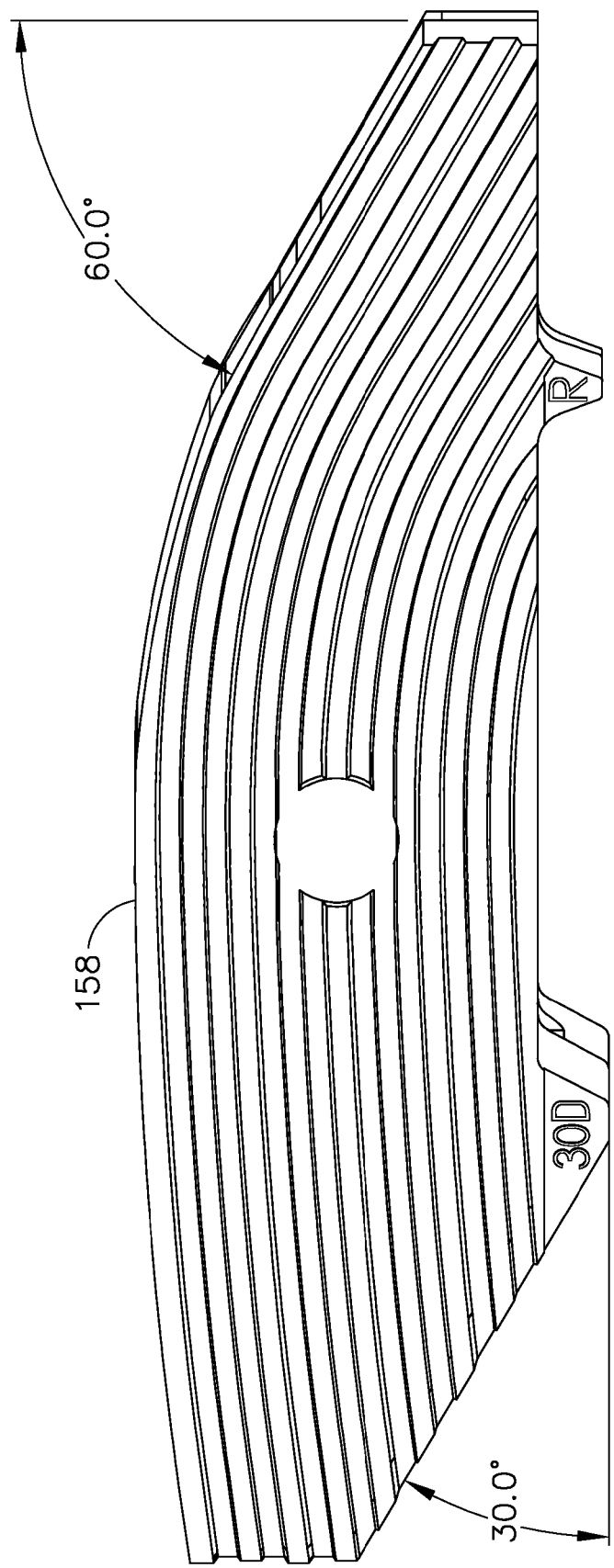
FIG. 53 is a bottom view of the pusher pad shown in FIG. 41.
Figure 54:
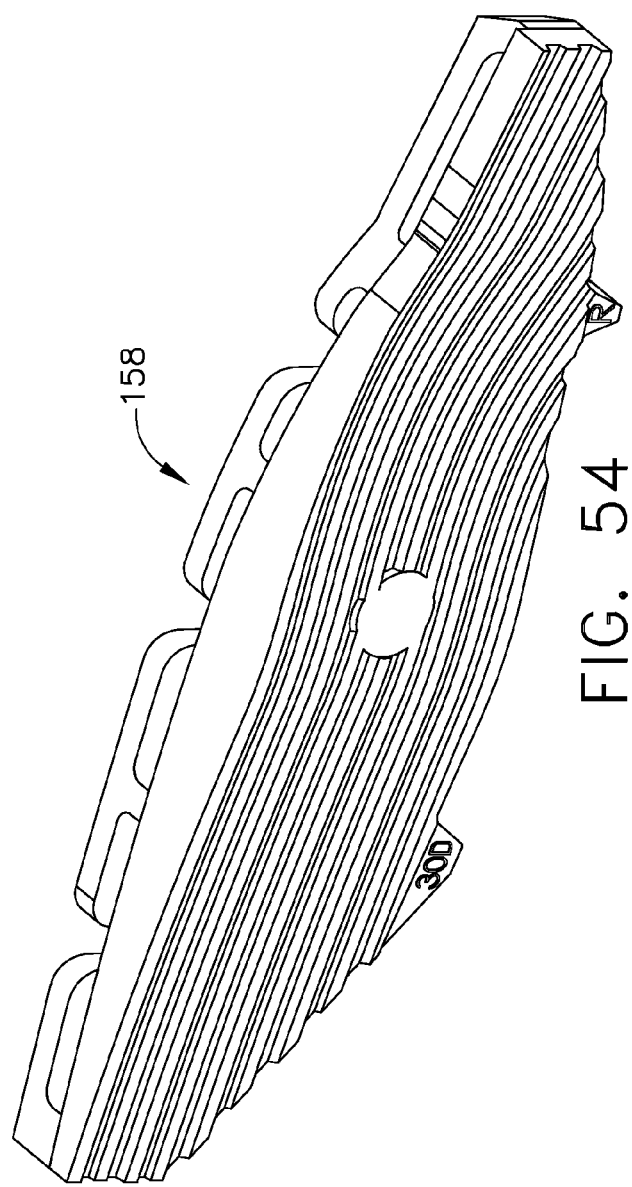
FIG. 54 is a perspective view of the pusher pad shown in FIG. 41.
Figure 55:
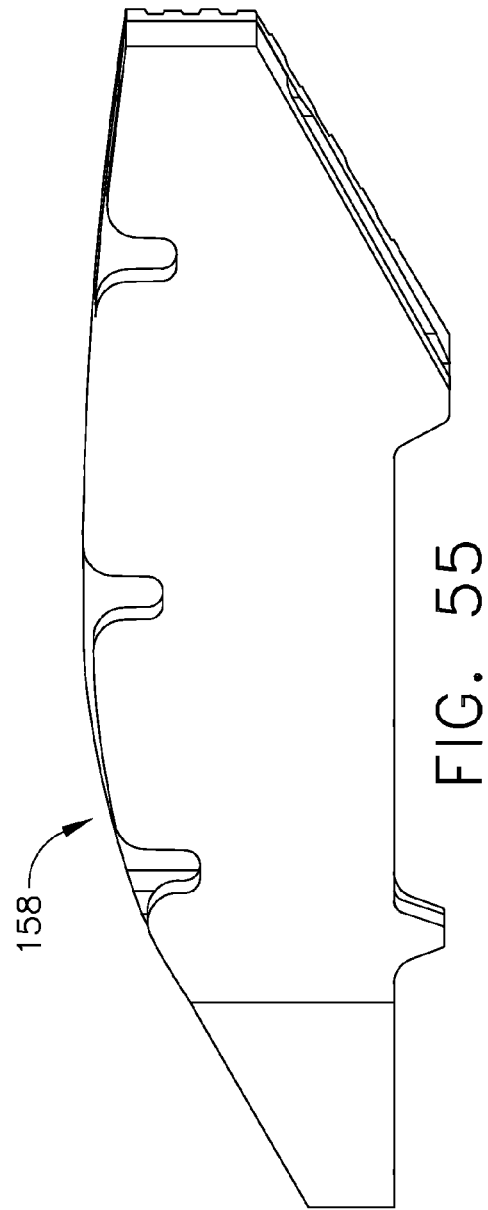
FIG. 55 is a rear view of the pusher pad shown in FIG. 41.

FIG. 50 illustrates the openings of slots 156 which receive tabs 144, and secured thereto as described above.

Referring to FIGS. 51-55, the similarities between pusher pad 158 and pusher pad 144 shown in corresponding view in FIGS. 46-50 are apparent. Pusher pad 158 is a 30° pusher pad having divert surface 160 with portion 160b disposed at a 30° angle relative to the longitudinal direction of travel of pusher cap 138 and, concomitantly to portion 160a. Divert surface 160 also includes portion 160c which is disposed at a 14° angle relative to the longitudinal direction of travel of pusher cap 138 and portion 160a. As can be seen, pusher pad 158 is thickest where portions 160b and 160c meet. Any suitable angle may be used for portion 160c. Alternatively, portion 160b may extend at a 30° angle to meet an extended portion 160a.

Pusher pad 160 has a mounting surface 162 disposed at 23° complementarily configured to mount to mounting surface 142 of pusher cap 138.

The divert angles are not limited to 20° and 30°, and may be any desired angle. Any suitable mounting angle may be used which allows the pusher pad diverting surface to define the desired divert angle. In the depicted embodiment, the mounting angle of the mounting surfaces is larger than the smallest divert angle and smaller than the largest divert angle which is established by the two pusher pad configurations. Alternatively, the mounting angle could be outside of the range of divert angles, with the pusher pad divert surface configured accordingly.

The common mounting surface for multiple divert angles may be utilized independent of the other features of pusher caps 138 and 140, as described below.

Figure 56:
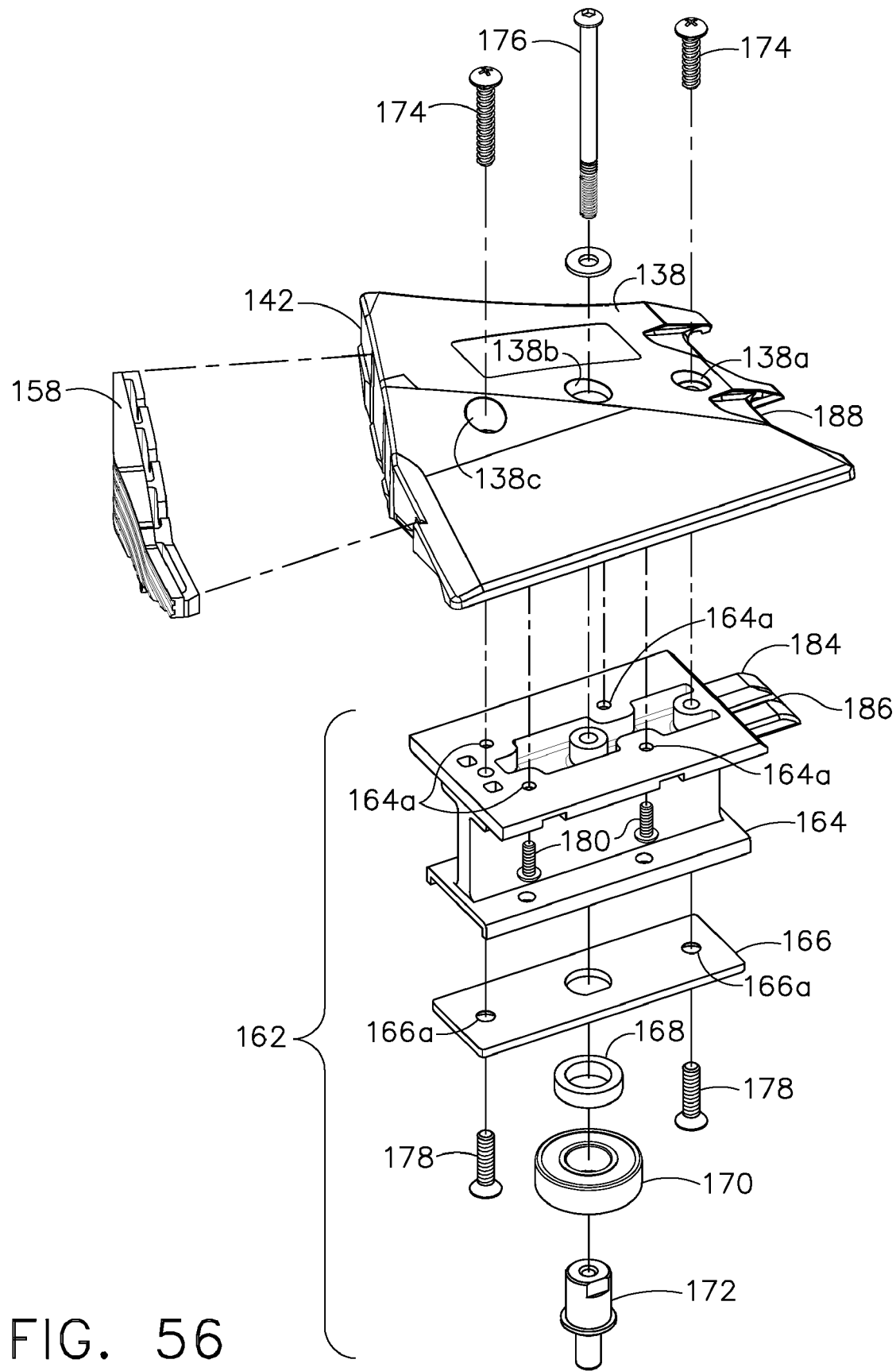
FIG. 56 is an exploded perspective view of the pusher shoe of FIG. 41.
Figure 57:
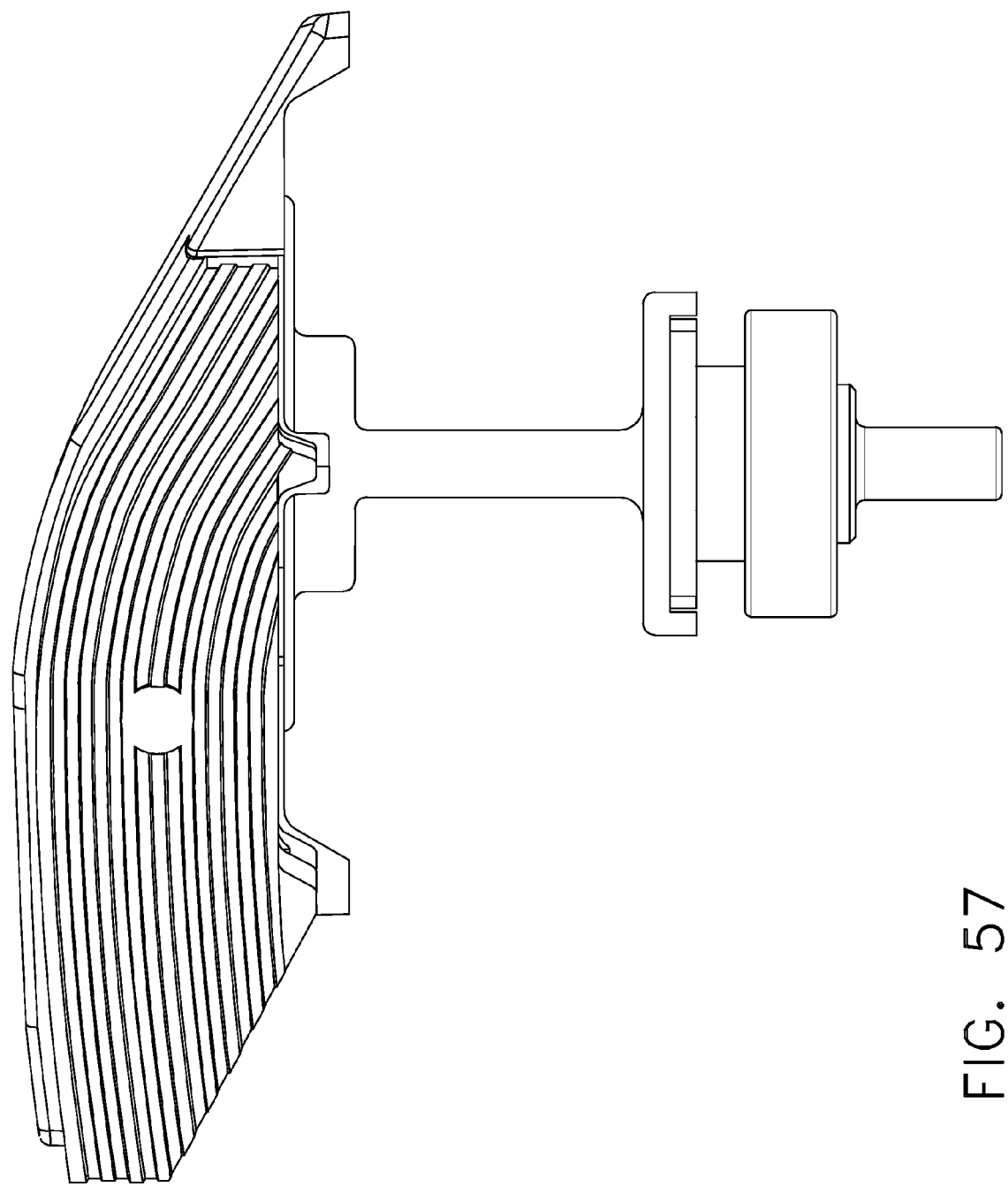
FIG. 57 is a side view of the pusher shoe of FIG. 39.

FIG. 56 is an exploded view of the pusher shoe of FIG. 41, configured for use with the flat slat type conveyor as shown in FIG. 4. Pusher pad 158 is secured to mounting surface 142 of pusher cap 138. Pusher base assembly 162 includes pusher base 164, of unitary construction and configured complementarily to the guide path defined by a slat flight, pusher base plate 166, spacer 168, bearing 170 which is retained and located by pin 172. Two screws 174 extend through holes 138a and 138c to engage pusher base 164. A single bolt 176 extends through center hole 138b of pusher cap 138, through base 164, plate 166, through spacer 168 and bearing 34, threadingly engaging pin 172. Two additional screws 178 extend through the two holes 166a in plate 166, threadingly engaging base 164. Additional screws 180 are inserted through holes 164a of base 164 into holes 182 (see FIG. 45).

Pusher base 164 includes extension 184 with centrally disposed slot 186. Extension 164 is shaped to fit between the leading and trailing slats of a flight as well as between the leading and trailing tubes of a flight. Pusher cap 138 (and 140) includes extension 188 which fits into slot 186. Similar to pusher caps 2a and 2b, surfaces 190f-h terminate in edges 192f-h which are disposed below the conveying plane of the sortation conveyor. Lower surface 184a of extension 184 is generally at the same level as the lower surfaces of edges 192f and 192h. The lower surface of edge 192g is slightly higher to fit into slot 186 atop extension 184.

Recessed surfaces 194a and 194b are formed in surface 190 of pusher cap 138, in between surfaces 190f, 190g and 190h. Recessed surfaces 194a and 194b are steeper than the adjacent portion of the surface 190c from which recessed surfaces 194a and 194b extend, and steeper than surfaces 190f-h. Recessed surfaces terminate at edges 194c and 194d. The locations and relative angles of surfaces 194a-b, surface 190c and 190f-h place recessed surfaces 194a and 194b lower than adjacent portions of surfaces 190c and 190f-h, inboard of edges 192f-h, and inboard of the locations where surfaces 190f-h extend below the conveying surface of the sortation conveyor, in the "cow catcher" configuration described above.

The configuration of recessed surfaces 194a-b, edges 194c-d, surfaces 190f-h, and edges 192f-g allows pusher caps 138 and 140 to be used with either a slat type or tube type sortation conveyor, with the appropriately configured pusher based.

Referring to FIG. 43, surface 190 includes recess 190i, formed as a slight depression in surface 190c. Recess 190i is deep enough to have a label or other material secured therein, such that the depth, at least at the edges, is greater than the thickness of the label or other material. The depth (see FIG. 63) of recess 190I places the label edges below surface 190c, such that packages which may be directed over the top surface 190 are unlikely to catch the edge of the label and peel it away. The label or other material (neither shown) may carry information useful for any desired purpose. For example, the information may be indicia, such as a bar code, which uniquely identifies the particular pusher show.

Figure 58:
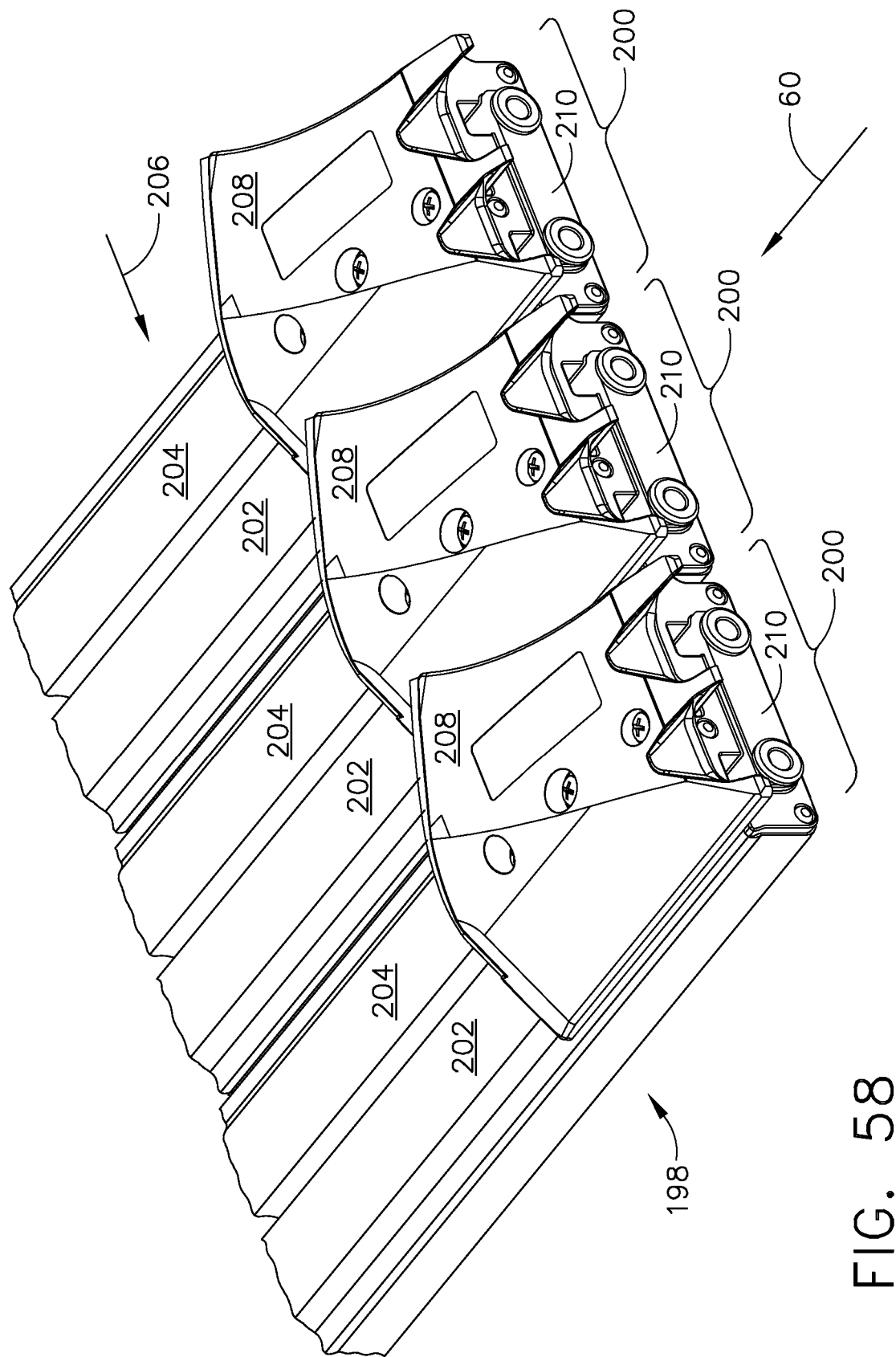
FIG. 58 is a fragmentary perspective view of a sortation conveyor and pusher shoes constructed in accordance with another aspect of the present invention.

FIG. 58 is a fragmentary perspective view of a sortation conveyor and pusher shoes constructed in accordance with another aspect of the present invention. Sortation conveyor, indicated generally at 198, includes a plurality of slat flights 200 comprised of pairs of respective leading slats 202 spaced apart from trailing slats 204 disposed generally parallel to each other, transverse to the direction of travel (indicated by arrow 206) of sortation conveyor 198. Each flight 200 carries a respective pusher shoe 208. Each pair of leading slat 202 and trailing slat 204 are maintained together as a flight 200 by a respective pair of end caps 210 disposed at opposite ends of slats 202 and 204. As described above, each end cap 210 is supported and driven by two spaced apart pins extending from the drive chain (not shown).

Figure 59:
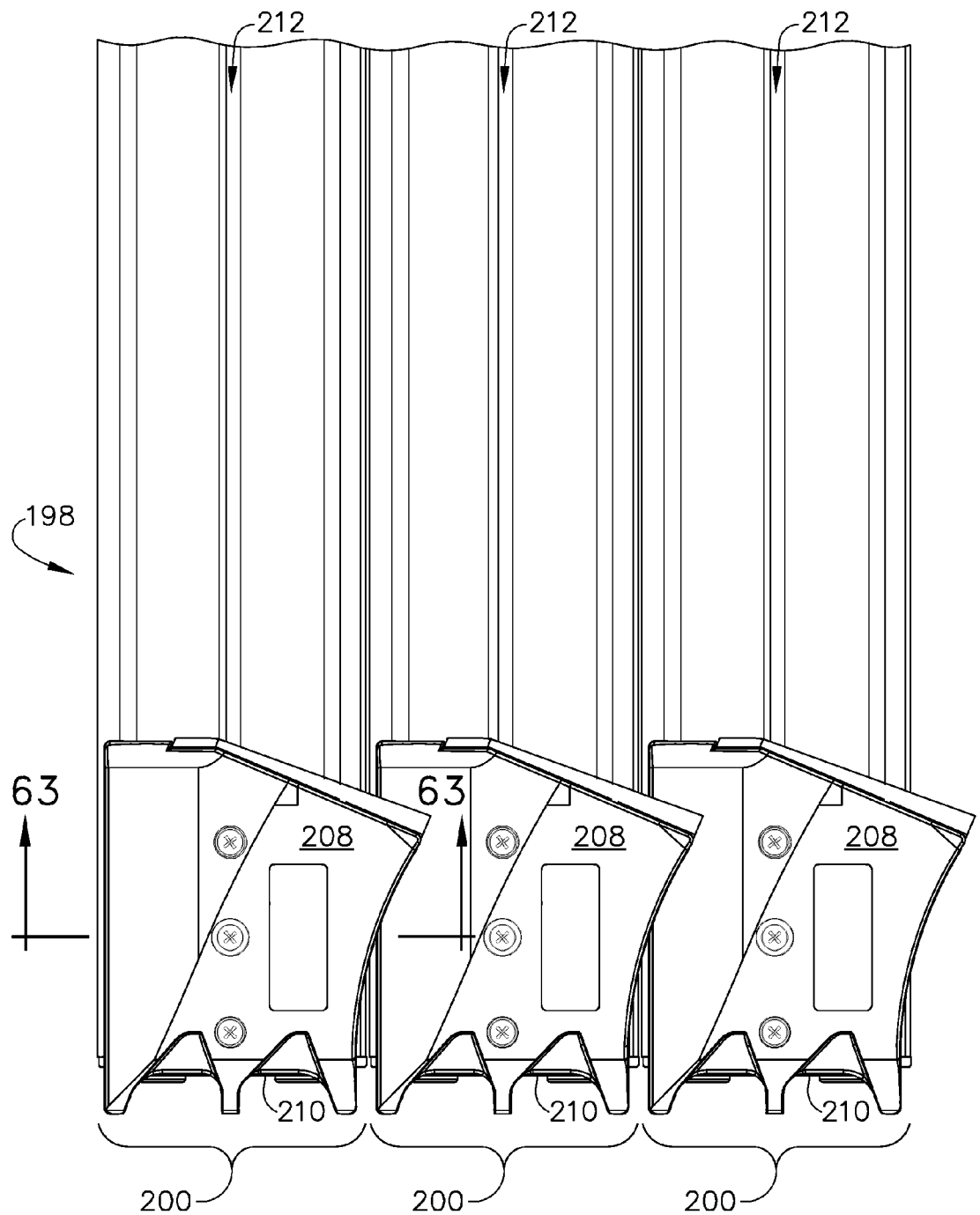
FIG. 59 is a fragmentary plan view of the sortation conveyor and pusher shoes of FIG. 58.

FIG. 59 is a fragmentary plan view of the sortation conveyor and pusher shoes of FIG. 58, showing gaps 212 between within each flight 200 between each leading slat 202 and trailing slat 204, defining a guide path for the pusher base, as described below. When viewed perpendicular to and from above the conveying surface, preferably there is no perpendicular line of sight through gaps 212. Gap 212 is configured to prevent parts of most items being conveyed from extending therethrough, completely or to an undesirable depth.

Figure 60:
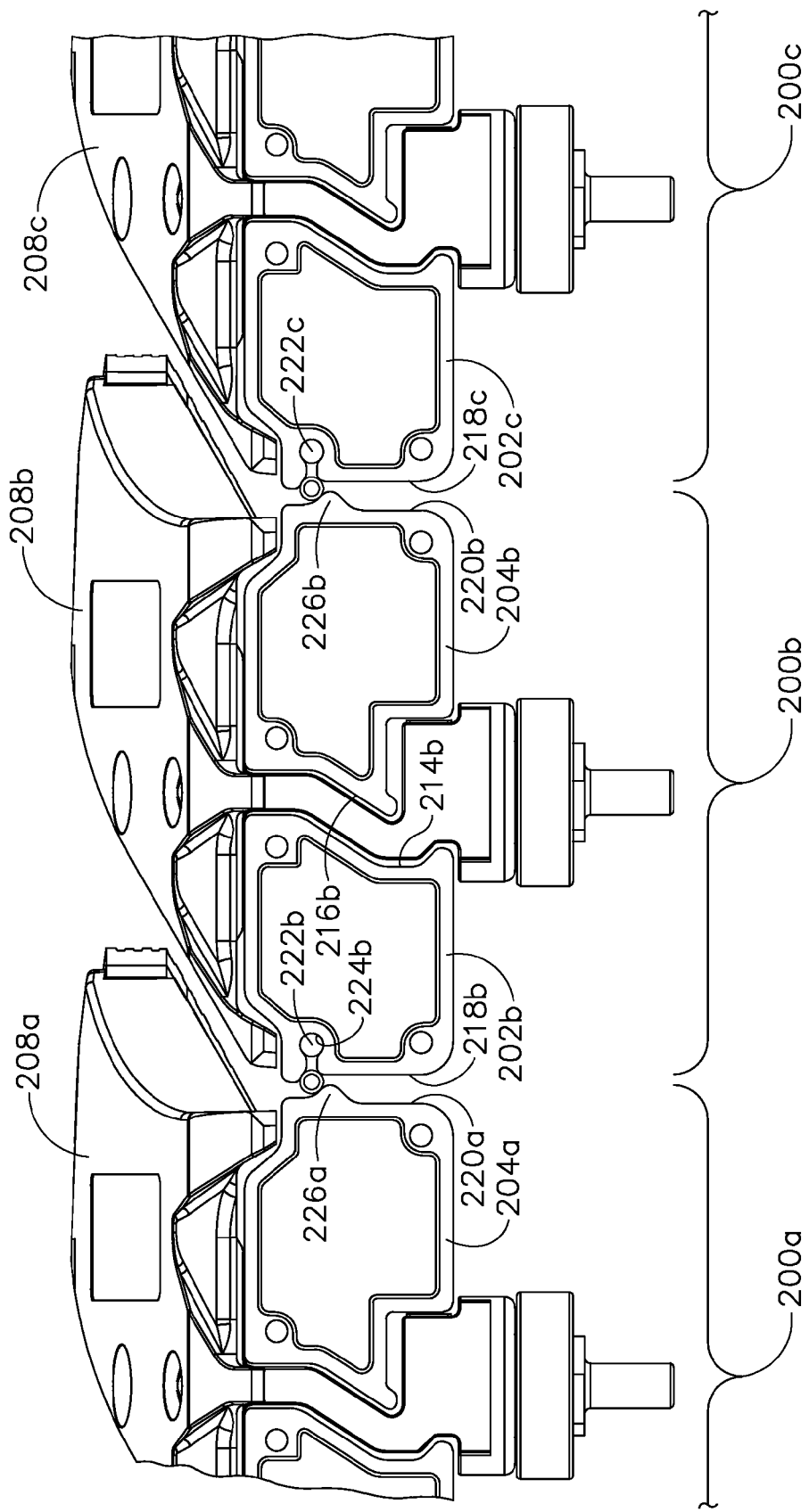
FIG. 60 is a side view of the sortation conveyor and pusher shoes of FIG. 58 taken along arrow 60 of FIG. 58, with the closest end caps removed.
Figure 61:
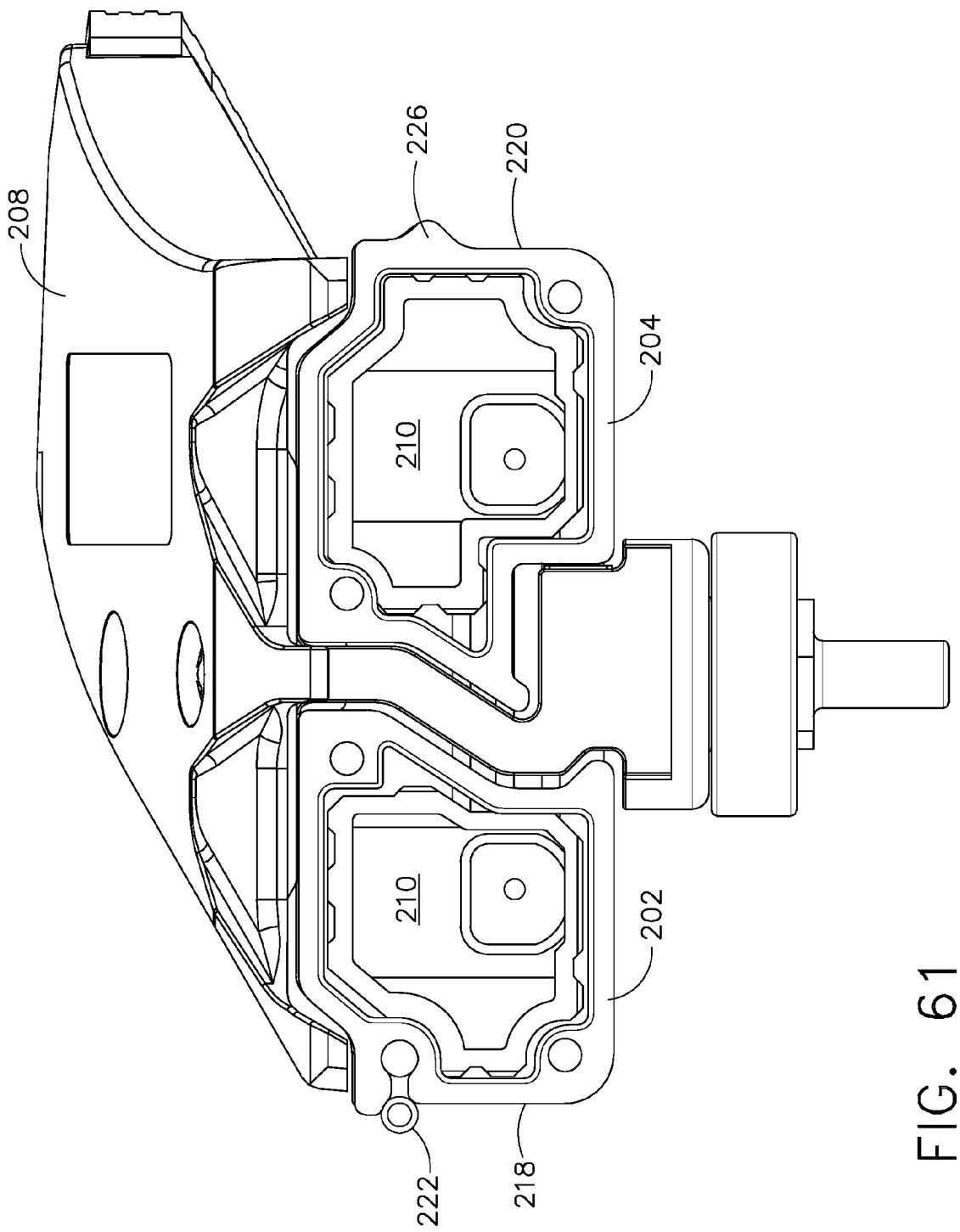
FIG. 61 is a side view of a flight of two slats and a pusher shoe of FIG. 60.

In FIGS. 60 and 61, which are side views of the sortation conveyor and pusher shoes of FIG. 58 taken along arrow 60 of FIG. 58, with the end caps at either end of the slats omitted, revealing the shape of each slat. In FIG. 58, the consecutive flights have been identified as 200a, 200b, and 200c for ease of discussion, with the element numbers ending with the suffix corresponding to that flight's suffix. Within a flight, flight 200b for example, the spaced apart surfaces 214b and 266b of leading slat 202b and trailing slat 204b, respectively, cooperate to form gap 212b, which defines the pusher shoe guide path. Leading surface or edge 218b of leading slat 202b is maintained in a spaced apart relationship from trailing surface or edge 220a of trailing slat 204a of flight 200a. Leading surface 218b preferably includes seal 222b which engages trailing surface 220a of the slat 204a while the adjacent slat flights travel along the upper conveying surface of sortation conveyor 198. Seal 222b may be made of any suitable material, such as extruded from polyurethane. Seal 222b is disposed in groove 224b which extends the length of leading slat 202b. Preferably trailing surface 220a includes seal engaging portion 226a, shown as a rib which extends the length of slat 204a. Seal 222b, groove 224b and rib 226a are located and dimensioned such that there is the desired contact between seal 222b and trailing surface 220a, without presenting any interference throughout the path of flights 200. While flights 200 are traveling through the catenary of the return run downstream of the idler gear at the end of the upper run, seals 222 preferably engage trailing surfaces 220.

Seal 222b may have any suitable configuration for engaging trailing surface 220a and for being held to leading surface 218b. The retention portion of seal 222b may be any suitable configuration. For example, either or both of the bulbous portions of seal 222b may be hollow. Seal 222b may instead be flat rather than having any bulbous portion. Groove 224b may be omitted and seal 222b secured to leading surface 218b by any suitable means, such as by adhesive. Seal 222b may be carried by trailing surface 220a, with the seal retention configuration (depicted in FIGS. 60 and 61 as groove 224) and seal engaging portion 226 configured and located as appropriate.

Figure 62:
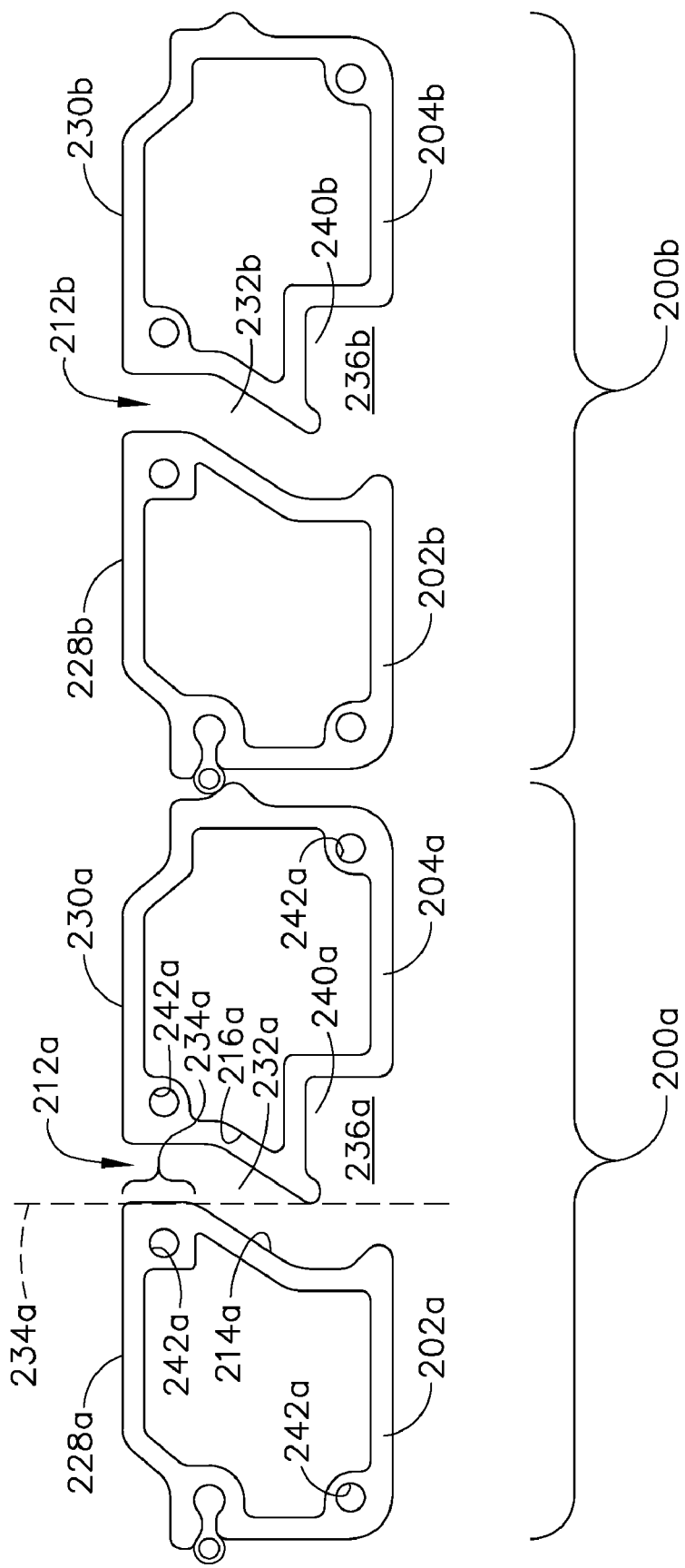
FIG. 62 is a fragmentary side view of adjacent flights of slats and pusher shoes of FIG. 60.

Referring to FIG. 62, there is shown an end view of two adjacent flights 200a and 200b, with the end caps and pusher shoes omitted. Each leading slat 202a and 202b, and each trailing slat 204a and 204b include respective upper surfaces 228 and 230 which, when on the upper run of sortation conveyor 198, define the conveying surface in cooperation with all other flights on the upper run of sortation conveyor 198. Upper surfaces 228 and 230 are preferably flat as illustrated, although any other suitable shape may be used.

Referring to flight 200a, which is exemplary of all flights 200 and slats 202, 204, gap 212a is defined by opposing surfaces 214a and 216a as a result of the spaced apart relationship between leading slat 202a and trailing slat 204a. As illustrated, gap 212a includes offset portion 232a, which offsets the gap along its vertical length from upper surfaces 228a and 230a. In the embodiment depicted, offset portion 232a has an angle of approximately 33°, and provides strength to pusher base 244. As can be seen, a vertical line (dashed line 234a) at the corner of trailing surface 21-a and upper surface 228a (as illustrated, the rearmost portion of trailing surface 214a) extends at least tangent to a portion leading surface 216a. Leading surface 216a may extend forward past line 234a, or if it does not extend to line 234a, the shortfall is preferably small enough to prevent parts of most items being conveyed from extending through gap 212a, completely or to an undesirable depth.

Offset portion 232a may be any suitable shape, including being arcuate, and may start at upper surfaces 228a and 230a, without a vertical portion 234a. Offset portion 232a may be in any suitable direction, whether forward or backward. Gap 212a includes lower portion 236a which receives a complementarily shaped portion of the pusher base. Portion 238a includes recess 240a, which is included to reduce the wall thickness of slat 204a for manufacturing purposes.

Slats 202a and 204a include a plurality of holes 242a at each end for receiving screws which hold end caps 210 to the slats.

Figure 63:
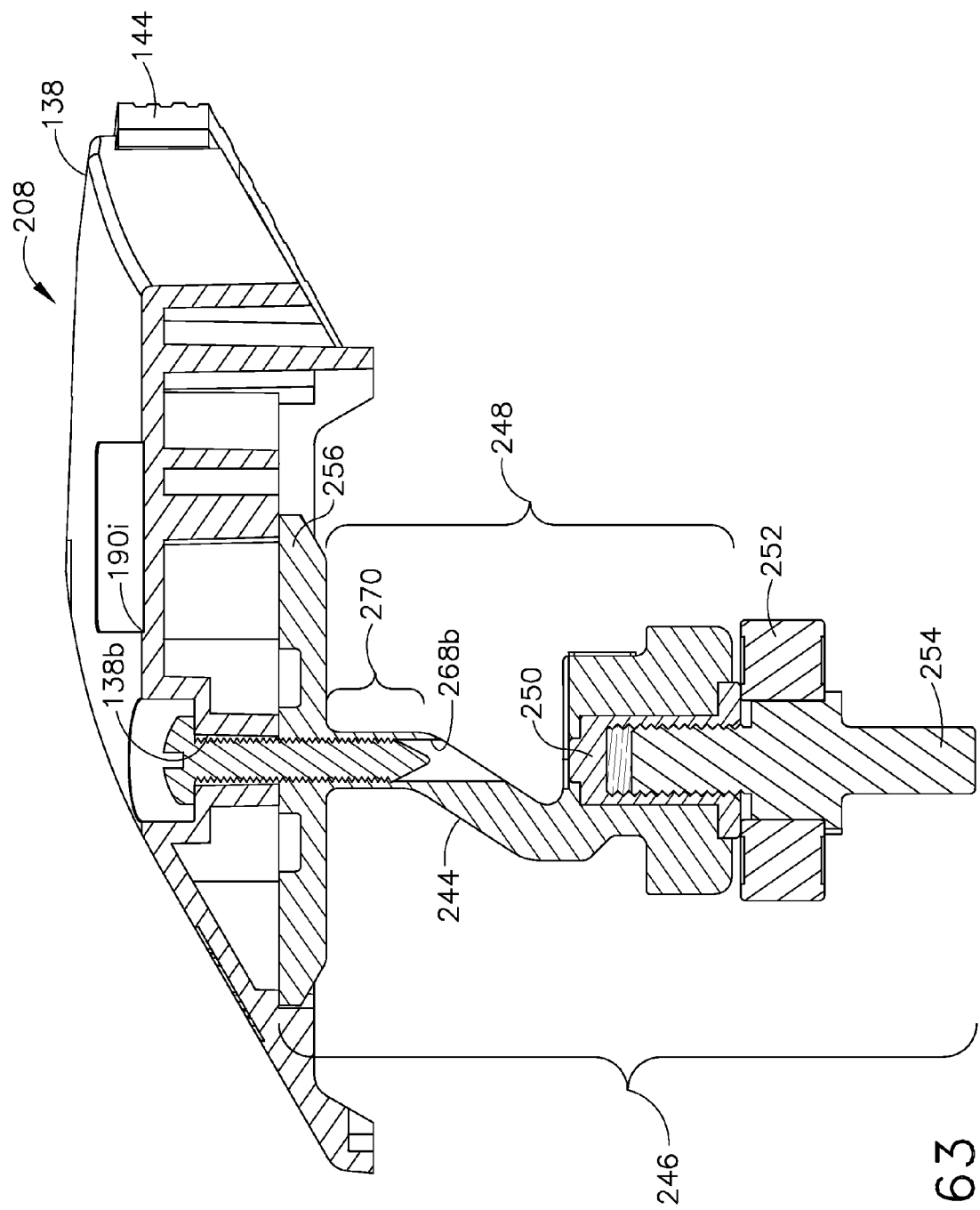
FIG. 63 is a cross-sectional side view of a pusher shoe of FIGS. 58-62 taken along line 63-63 of FIG. 59.

Referring to FIG. 63, which is a cross-sectional side view of a pusher shoe taken along line 63-63 of FIG. 59, pusher shoe 208 12 comprises pusher cap 138 and pusher pad 144. Any suitable pusher cap and pusher pad may be used, as long as it is shaped complementarily to the specific configuration of the slats. The pusher cap may be a right hand, left hand, or double sided configuration, and be configured for any suitable divert angle.

Pusher cap 138 is attached to pusher base 244 of pusher base assembly 246. Pusher base 244 includes guide portion 248 which is configured complementarily to gap 212 and to cooperate with slats 202 and 204 to allow movement transverse to the conveyor direction of travel. Pusher base assembly 246 also includes insert 250, bearing 252, and pin 254.

Figure 65:
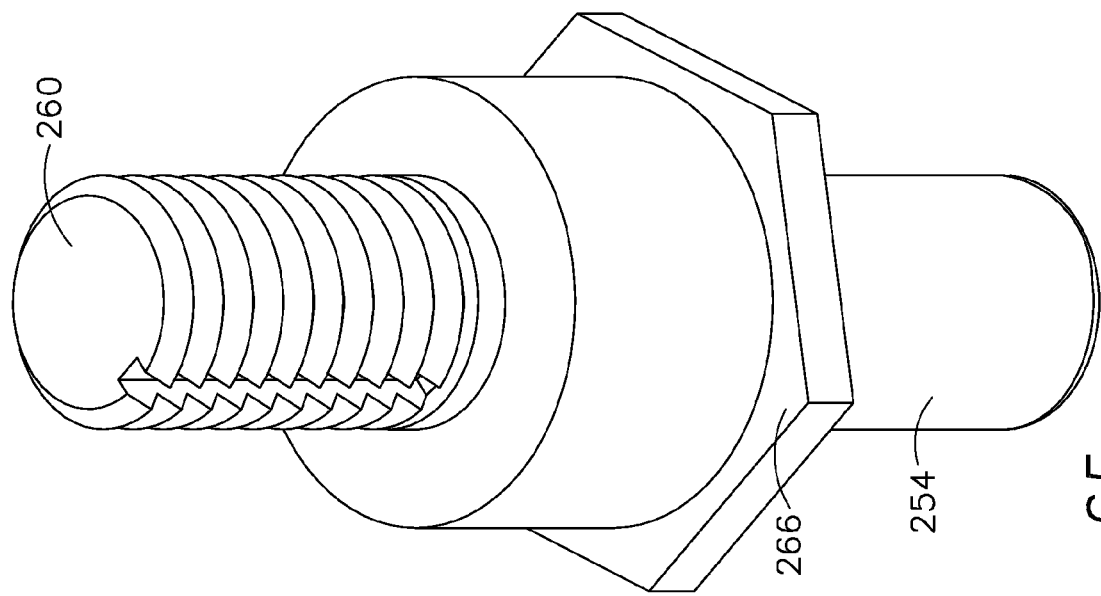
FIG. 65 is an enlarged perspective view of the pin shown in FIG. 63.
Figure 64:
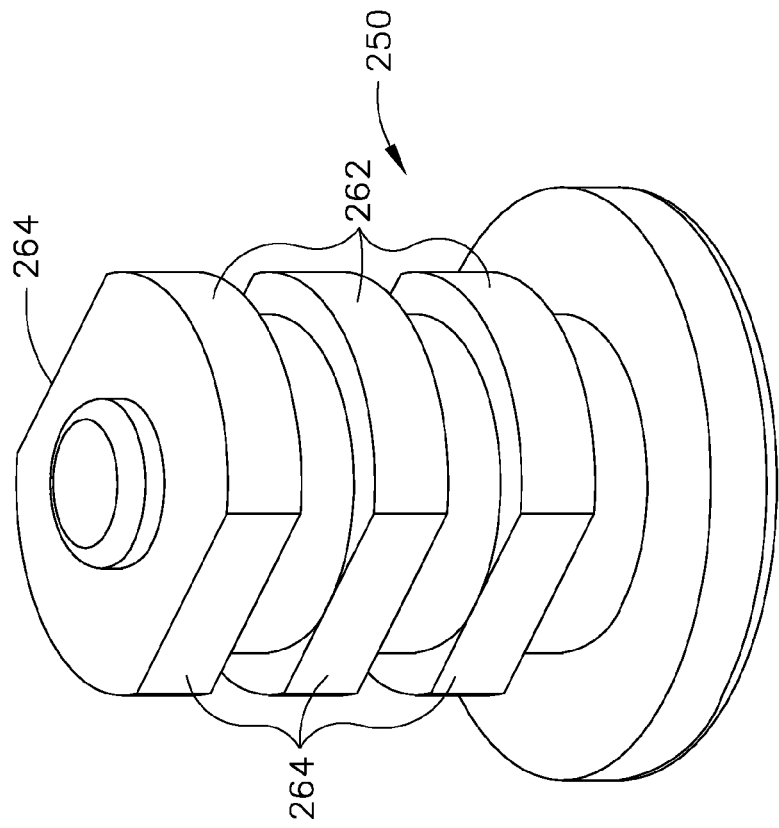
FIG. 64 is an enlarged perspective view of the insert shown in FIG. 63.

Referring also to FIGS. 64 and 65, pusher base 244 includes upper generally planar portion 256 which is configured to have pusher cap 138 mounted thereto, and lower portion 248, which is shaped complementarily to guide path 212. As illustrated, insert 250 is molded integrally with pusher base 244 and includes internal threads which retain threaded end 260 of pin 254. Insert 250 includes a plurality of rings 262, each of which has two oppositely facing flat sides 264. Rings 262 retain insert 250 longitudinally and flat sides 264 prevent rotation, allowing pin 254 to be screwed in. Of course, any suitable configuration may be used.

Pin 254 includes hex flange 266, with the flange portion retaining bearing 252 and the hex portion providing for tightening pin 254 into insert 252. Pin 254 includes a slot in which a nylon or other suitable torque retention substance is disposed. Any suitable torque retention means may be used, such as applying a locking substance to threads 260, omitting the slot.

Pusher base 244 includes holes 268a, 268b and 268c, which receive threaded fasteners (one shown in FIG. 63)

disposed through holes 138*a*, 138*b* and 138*c* in pusher cap 138. Portion 248 includes straight portion 270, which necessitates straight portion 234 of gap 212. Straight portion 270 is included in order to use the threaded fasteners to secure pusher cap 138 to pusher base 244. If the threaded fasteners are omitted, such as with break away pusher caps, straight portions 234 and 270 could be omitted or reduced in length.

Figure 66:
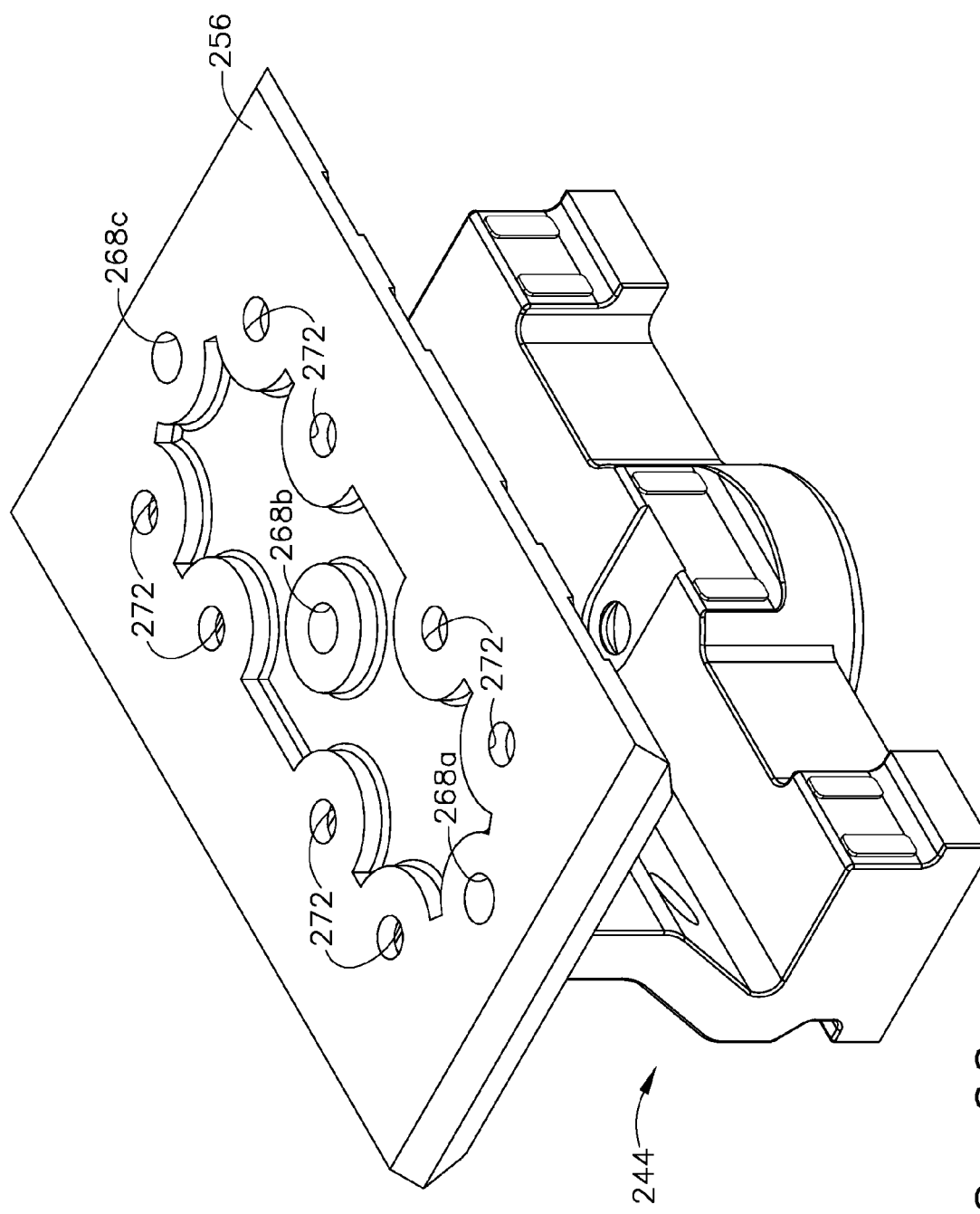
FIG. 66 is a top perspective view of the pusher base shown in FIG. 60.
Figure 67:
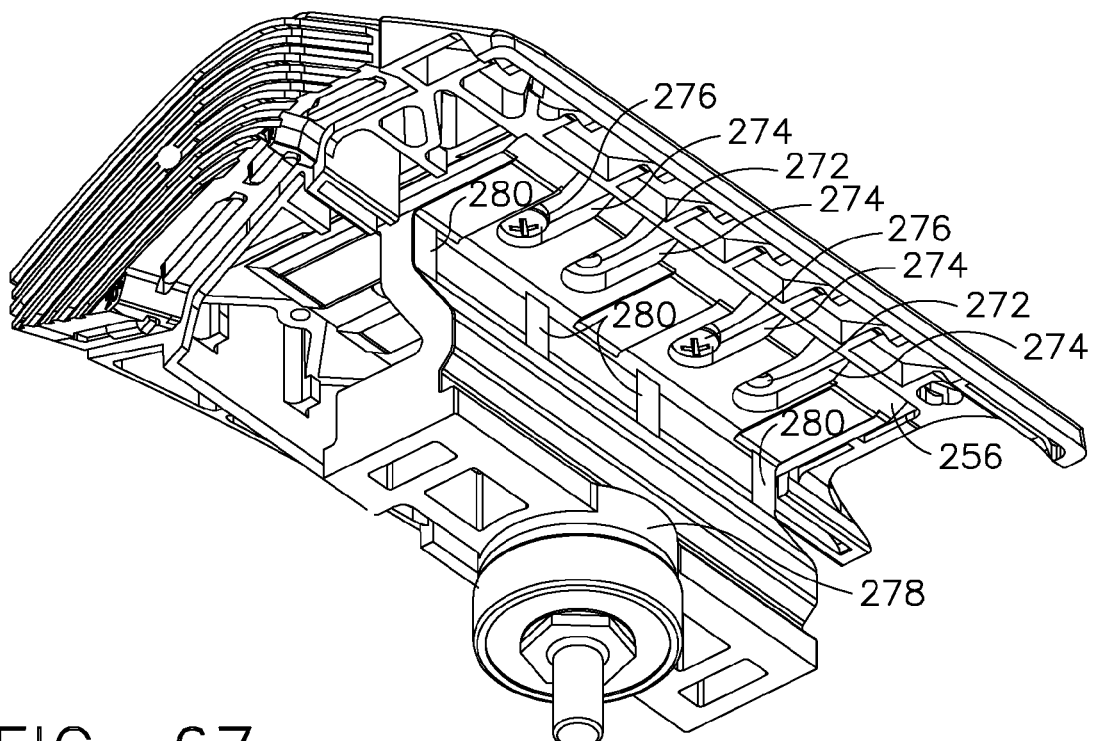
FIG. 67 is a bottom perspective view of the pusher shoe of FIG. 58.
Figure 68:
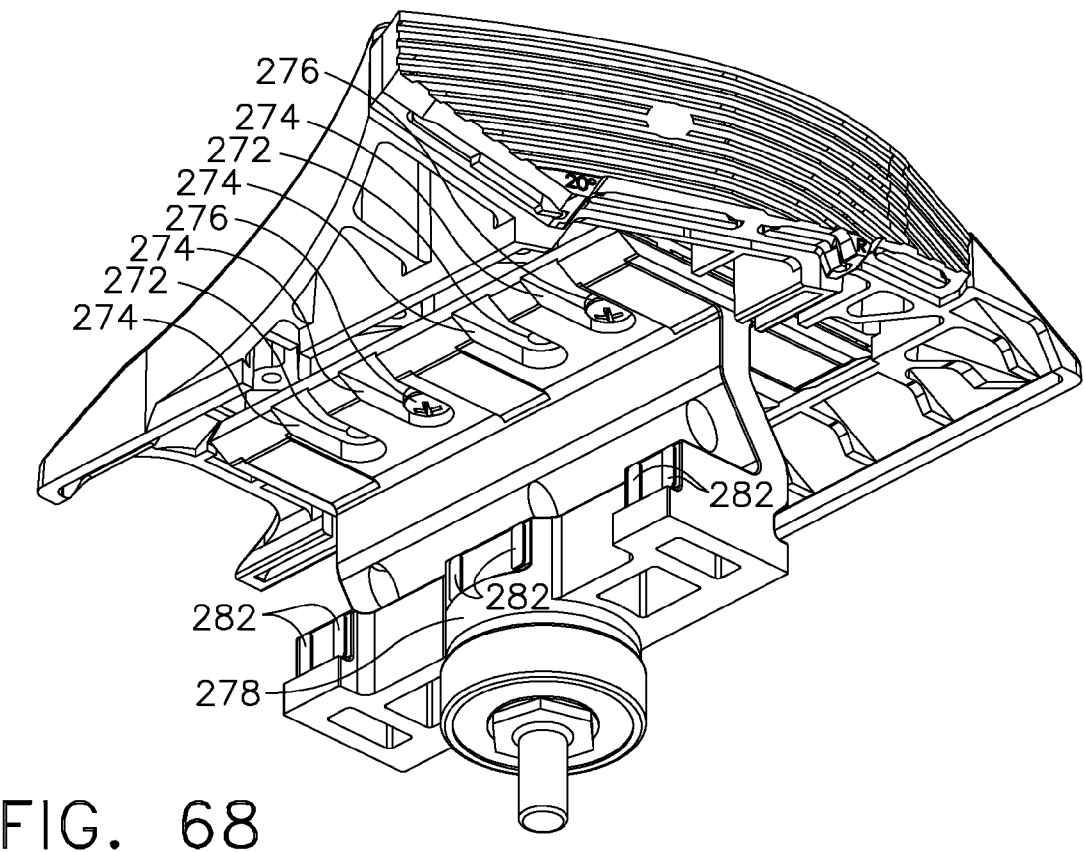
FIG. 68 is a bottom perspective view of the pusher shoe of FIG. 58, from a different angle than FIG. 67.
Figure 69:
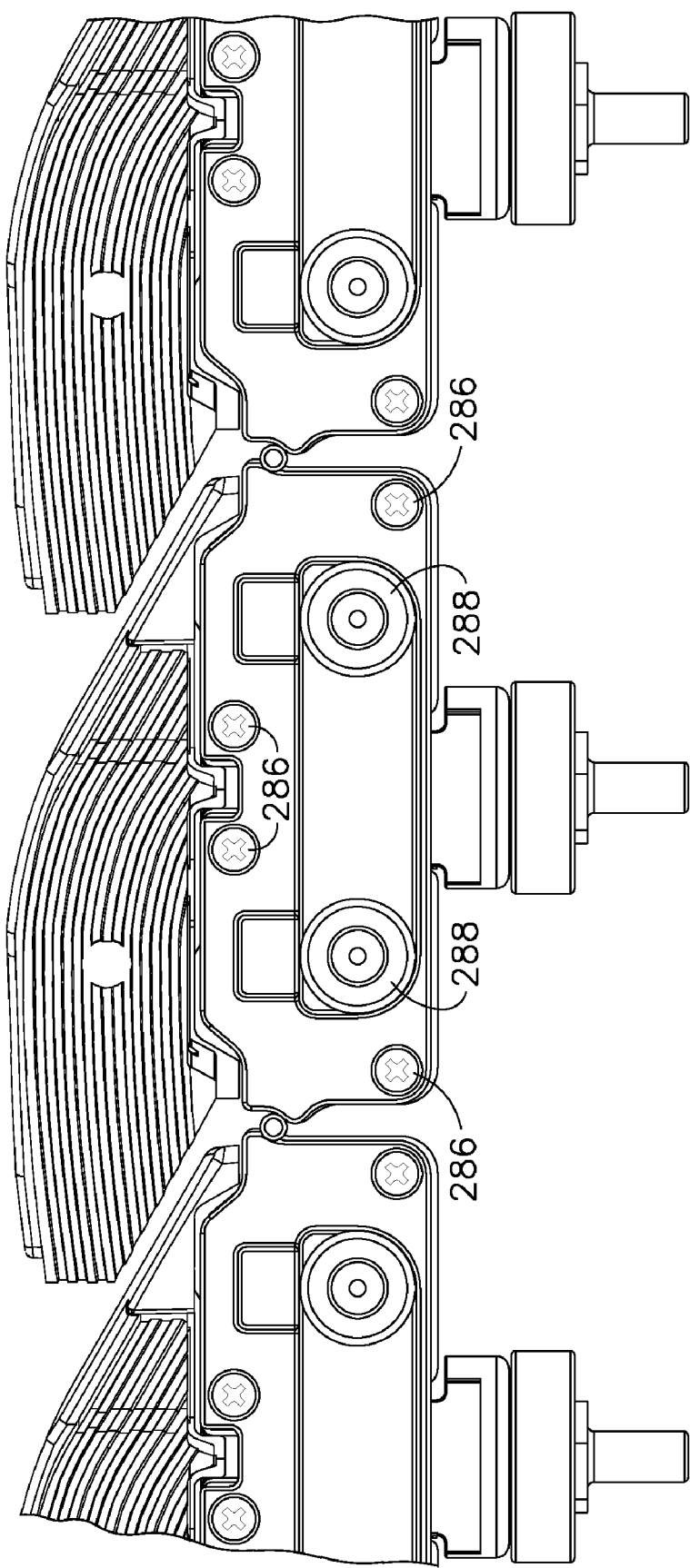
FIG. 69 is a fragmentary side view of slat flights and pusher shoes of FIG. 58.

Referring to FIGS. 66, 67 and 68, upper portion 256 of pusher base 244 includes a plurality of holes 272, each within a respective recess 274. Holes 272 are arranged in pairs of two, with one hole 272 of each of pair aligning with holes 182 of pusher cap 138 (see FIG. 45). Threaded fasteners 276 are disposed through holes 272 and threadingly engage holes 182 to secure pusher cap 138 to pusher base 244, in addition to the threaded fasteners disposed through holes 268*a-c*. The pairing and spacing of holes 272 allow the same pusher base to be used with any mating type of pusher cap, whether right hand or left hand. The height of pusher cap prevents the lower row of holes 182 from being located closer to the bottom edge (as seen in FIG. 45). In order to maintain as great a span between holes 182, the top row of holes 182 are further off center than the lower row of holes 182. This rectangular pattern of holes 182 is shifted off center in one direction for a right hand-pusher cap, and to the opposite direction for a left hand pusher cap. The pairs of holes 272 accommodate both locations.

Lower portion 248 includes boss 278 which surrounds insert 250. A plurality of arcuate recesses (not shown) are formed in boss 278 around insert 250, which reduces the wall thickness to avoid or minimize distortion during molding.

Pusher base 244 includes a plurality of spaced apart raised bearing surfaces 280 and 282. The slats roll forward as pusher shoes 208 are diverted. Bearing surfaces 280 and 282 distribute the loading from pusher base 244 to the slats during the divert. Bearing surfaces 280 and 282 may be made of the same material as pusher base 244 and pusher cap 138, super tough Nylon ST-801, or may be an insert of suitable material. Bearing surfaces 280 and 282 may be impregnated with an additive, such as Teflon or molybdenum disulfate. Of course, the entire pusher base 244 may be impregnated with an additive such as Teflon, or made of a low friction material, to accommodate the sliding motion of the pusher bases.

Referring to FIGS. 69-74, end cap 210 is illustrated having holes 284 through which screws 286 are disposed to threadingly engage holes 242 of slats 202 and 204 to form flights 200. End cap 210 also openings 286 which receive bushings 288. End cap 210 includes two mounting portions 290 and 292, each of which is shaped complementarily to the interior of the respective slat 202 and 204 which receives it, with ribs 294 extending outwardly from mounting portions 290 and 292 to engage the interior of slats 202 and 204. As will be readily apparent, the end caps for one end of slats 202 and 204 are mirror images of the end caps for the other ends, since slat 202 is different from slat 204.

Referring to FIG. 74, bushing 288 is retained in opening 286 at the front by flange 296 and at the rear by lip 298, which extends from the perimeter of bushing 288 except along the flat upper edge, similar to the retention of bushing 130 as described above.

Slats for slat type conveyors may be made of any suitable material, such as extruded anodized aluminum. Tubes for tube type conveyors may be made of any suitable material, such as zinc coated steel.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims submitted with a regular utility application based on this provisional application.

TABLE 1

MATERIAL PROPERTIES OF SUPER TOUGH NYLON

| Physical Properties: | |
| --- | --- |
| Density | 0.0383-0.039 lb/in3 |
| Linear Mold Shrinkage | 1.015-0.018 in/in |
| Mechanical Properties: | |
| Hardness, Rockwell R | 89-112 |
| Tensile Strength, Ultimate | 6530 psi |
| Tensile Strength, Yield | 6000-7500 psi |
| Elongation @ break | 60-210% |
| Tensile Modulus | 261 ksi |
| Flexural Modulus | 125-245 psi |
| Flexural Yield Strength | 9430 psi |
| Compressive Yield Strength | 1900 psi |
| Poisson's Ration | 0.35 |
| Shear Strength | 8400 psi |
| Izod Impact, Notched | 17-20 ft-lb/in |
| Tensile Impact Strength | 280-550 ft-lb/in2 |
| Parts: End Caps and Pusher Caps | |

TABLE 3

MATERIAL PROPERTIES OF SANTOPRENE

| Physical Properties: | |
| --- | --- |
| Density | 0.97 lb/in3 |
| Mechanical Properties: | |
| Hardness, Shore A | 60 |
| Tensile Strength, Ultimate | 1000 psi |
| Elongation @ break | 400% |
| Compressive Set | 23% |
| Parts: All Pusher Pads | |

The invention claimed is:

1. An endless conveyor comprising a plurality of pairs of slats defining an upper conveying surface, said slats configured to convey articles disposed on said upper conveying surface in a forward longitudinal direction, said pairs comprising:

(a) a leading slat and a trailing slat, said leading slat having a trailing surface, said trailing slat having a leading surface; each said leading and trailing slats comprising respective upper surfaces which are generally aligned with each other and define a portion of said upper conveying surface, each said leading and trailing slats comprising respective lower surfaces, said leading and trailing slats having respective lateral lengths which are approximately equal to each other;

(b) a plurality of pusher shoes for diverting the articles, each pusher shoe of said plurality of pusher shoes being carried by a respective pair of said plurality of pairs of slats;

(c) a gap defined between said trailing surface and said leading surface extending transverse to said longitudinal direction from said respective upper surfaces to said respective lower surfaces, said gap extending laterally along a substantial portion of said respective lateral lengths;

(d) said gap comprising an offset portion.

2. The endless conveyor of claim 1, wherein said offset portion is inclined relative to said forward longitudinal direction.

3. The endless conveyor of claim 1, wherein said gap includes vertical portion which is oriented generally perpendicular to said conveying surface, said vertical portion being disposed between said respective upper surfaces and said offset portion.

4. The endless conveyor of claim 1, wherein said a portion of said leading surface extends past a vertical line drawn through where said trailing surface intersects with the upper surface of said leading slat.

* * * * *

UNITED STATES PATENT AND TRADEMARK OFFICE
CERTIFICATE OF CORRECTION

| | | |
|---|---|---|
| PATENT NO. | : 7,857,116 B2 | Page 1 of 1 |
| APPLICATION NO. | : 11/981752 | |
| DATED | : December 28, 2010 | |
| INVENTOR(S) | : Martin Albert Heit et al. | |

It is certified that error appears in the above-identified patent and that said Letters Patent is hereby corrected as shown below:

Add to the Title page, field 62:

(62) Division of application No. 11/068,571, filed on Feb. 28, 2005, now Pat. No. 7,441,646, which is a Continuation of application No. 10/409,749, filed on Apr. 8, 2003, now Pat. No. 6,860,376.

Add to the Title page, field 60:

(60) Provisional application No. 60/445,974, filed on Feb. 7, 2003, Provisional application No. 60/428,366, filed on November 22, 2002, Provisional application No. 60/370,954, filed on Apr. 8, 2002, Provisional application No. 60/371,251, filed on Apr. 8, 2002.

Signed and Sealed this
Third Day of January, 2012

David J. Kappos
*Director of the United States Patent and Trademark Office*